(12) United States Patent
Lim et al.

(10) Patent No.: US 12,499,811 B2
(45) Date of Patent: Dec. 16, 2025

(54) ELECTRONIC DEVICE AND METHOD OF OPERATING SAME

(71) Applicant: Samsung Electronics Co., Ltd., Suwon-si (KR)

(72) Inventors: Kwangho Lim, Suwon-si (KR); Chul Kang, Suwon-si (KR); Seonghoon Choi, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 17/966,389

(22) Filed: Oct. 14, 2022

(65) Prior Publication Data
US 2023/0050737 A1 Feb. 16, 2023

Related U.S. Application Data

(63) Continuation of application No. PCT/KR2022/011899, filed on Aug. 10, 2022.

(30) Foreign Application Priority Data

Aug. 10, 2021 (KR) .................. 10-2021-0105626

(51) Int. Cl.
G09G 3/20 (2006.01)
(52) U.S. Cl.
CPC ... *G09G 3/2096* (2013.01); *G09G 2340/0471* (2013.01); *G09G 2340/0478* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| 10,748,972 B2 | 8/2020 | Chen et al. |
| 2009/0089689 A1* | 4/2009 | Clark .................. G06F 3/1438 715/762 |

(Continued)

FOREIGN PATENT DOCUMENTS

| CN | 108279843 A | 7/2018 |
| CN | 109274828 A | 1/2019 |

(Continued)

OTHER PUBLICATIONS

International Search Report dated Nov. 8, 2022, issued in International Patent Application No. PCT /KR2022/011899.

(Continued)

*Primary Examiner* — Yi Wang
(74) *Attorney, Agent, or Firm* — Jefferson IP Law, LLP

(57) ABSTRACT

An electronic device is provided. The electronic device includes a display, a camera module disposed under the display, and a processor configured to control the display and the camera module, and a memory operably connected to the processor. The memory may store instructions that, when executed, cause the processor to receive display metrics information that is changed according to the state of the display, produce an under-display camera area corresponding to a position of the camera module, based on the changed display metrics information, produce a logical cutout of the under-display camera area, and update the layout of an application to be executed, based on the cutout.

20 Claims, 35 Drawing Sheets

(56) References Cited

U.S. PATENT DOCUMENTS

| | | | |
|---|---|---|---|
| 2015/0007114 A1* | 1/2015 | Poulos | G06F 3/0482 |
| | | | 715/852 |
| 2016/0132074 A1* | 5/2016 | Kim | G06F 1/1652 |
| | | | 345/173 |
| 2019/0244560 A1 | 8/2019 | Lee et al. | |
| 2019/0373229 A1 | 12/2019 | Zhang et al. | |
| 2020/0169680 A1 | 5/2020 | Park et al. | |
| 2021/0043695 A1 | 2/2021 | Wang et al. | |
| 2021/0084236 A1* | 3/2021 | Han | G06V 40/67 |
| 2021/0120112 A1 | 4/2021 | Li | |
| 2021/0167163 A1 | 6/2021 | Jeong et al. | |
| 2021/0174769 A1 | 6/2021 | Jeong et al. | |
| 2022/0030105 A1 | 1/2022 | Zhou | |
| 2022/0269463 A1* | 8/2022 | Yu | G09G 3/035 |
| 2022/0286548 A1 | 9/2022 | Yang et al. | |
| 2023/0164426 A1 | 5/2023 | Xu et al. | |

FOREIGN PATENT DOCUMENTS

| | | |
|---|---|---|
| CN | 110730299 A | 1/2020 |
| CN | 111711718 A | 9/2020 |
| KR | 10-2020-0060118 A | 5/2020 |
| KR | 10-2021-0069289 A | 6/2021 |
| KR | 10-2022-0017583 A | 2/2022 |
| KR | 10-2022-0127967 A | 9/2022 |
| WO | 2021/092887 A1 | 5/2021 |

OTHER PUBLICATIONS

European Search Report dated Sep. 11, 2024, issued in European Application No. 22856204.7.

* cited by examiner

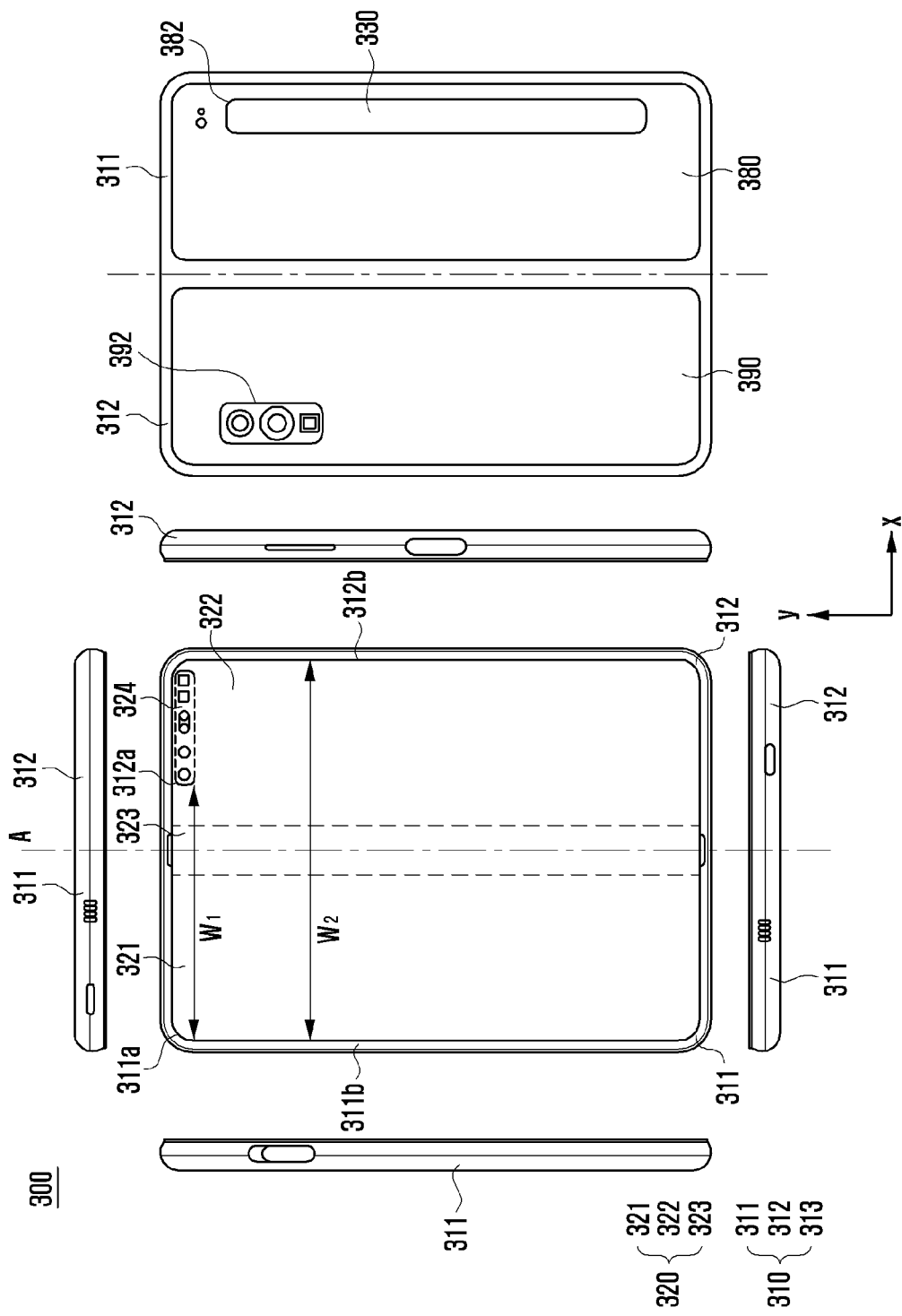

ELECTRONIC DEVICE AND METHOD OF OPERATING SAME

CROSS-REFERENCE TO RELATED APPLICATION(S)

This application is a continuation application, claiming priority under § 365(c), of an International application No. PCT/KR2022/011899, filed on Aug. 10, 2022, which is based on and claims the benefit of a Korean patent application number 10-2021-0105626, filed on Aug. 10, 2021, in the Korean Intellectual Property Office, the disclosure of which is incorporated by reference herein in its entirety.

TECHNICAL FIELD

The disclosure relates to an electronic device and a method of operating the same. More particularly, the disclosure relates to an electronic device including an under-display camera (UDC) and a method of operating the same.

BACKGROUND ART

Electronic devices (e.g., mobile electronic devices) are produced in various sizes depending on functions and user preferences, and may include a large screen touch display for securing wide visibility and convenience of manipulation. An electronic device may include at least one camera module (e.g., an image sensor). For example, an electronic device may include at least one under-display camera (UDC) disposed under (e.g., below) a display. The general electronic device includes a display area and a camera area, and displaying is not performed in the camera area, so a partial area of the display cannot display a screen. On the other hand, an electronic device equipped with a UDC is able to display a screen in the entire area of the display because displaying can be performed even in the camera area (e.g., a UDC area).

The above information is presented as background information only to assist with an understanding of the disclosure. No determination has been made, and no assertion is made, as to whether any of the above might be applicable as prior art with regard to the disclosure.

DISCLOSURE

Technical Problem

The UDC may be disposed under the display, and the display does not have a cutout (e.g., a camera hole) due to application of the UDC. The display operation may be performed in the display that does not have a cutout (e.g., a camera hole). Since displaying a screen and touching the same are also possible in the UDC area (e.g., the camera area), the entire screen including the cutout area can be used. Since there is no physical camera hole in the UDC area, when an application is executed, an icon and/or a user interface of the application may conflict with the UDC area, which may make it difficult to select a menu and execute an application function.

Aspects of the disclosure are to address at least the above-mentioned problems and/or disadvantages and to provide at least the advantages described below. Accordingly, an aspect of the disclosure is to provide an electronic device and a method of operating the same, which can avoid a conflict between a UDC area and an icon and/or a user interface of an application.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a camera module disposed under the display, a processor configured to control the display and the camera module, and a memory operably connected to the processor. The memory may store instructions that, when executed, cause the processor to receive display metrics information that is changed according to the state of the display, produce an under-display camera area corresponding to a position of the camera module, based on the changed display metrics information, produce a logical cutout of the under-display camera area, and update the layout of an application to be executed, based on the cutout.

In accordance with another aspect of the disclosure, a method of operating an electronic device in which at least one camera module is disposed under a display is provided. The method includes display metrics information that is changed according to the state of the display may be received. An under-display camera area corresponding to a position of the camera module may be produced based on the changed display metrics information. A logical cutout of the under-display camera area may be produced. The layout of an application to be executed may be updated based on the cutout.

Advantageous Effects

An electronic device including a UDC according to various embodiments of the disclosure may avoid a conflict between a UDC area and an icon and/or a user interface of an application by adjusting the coordinates of the icon and/or the user interface of the application.

An electronic device including a UDC according to various embodiments of the disclosure may avoid a conflict between a UDC area and an icon and/or a user interface of an application by adjusting the size of the application.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3A is a diagram illustrating a first state (e.g., a flat state or an open state) of an electronic device according to an embodiment of the disclosure;

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
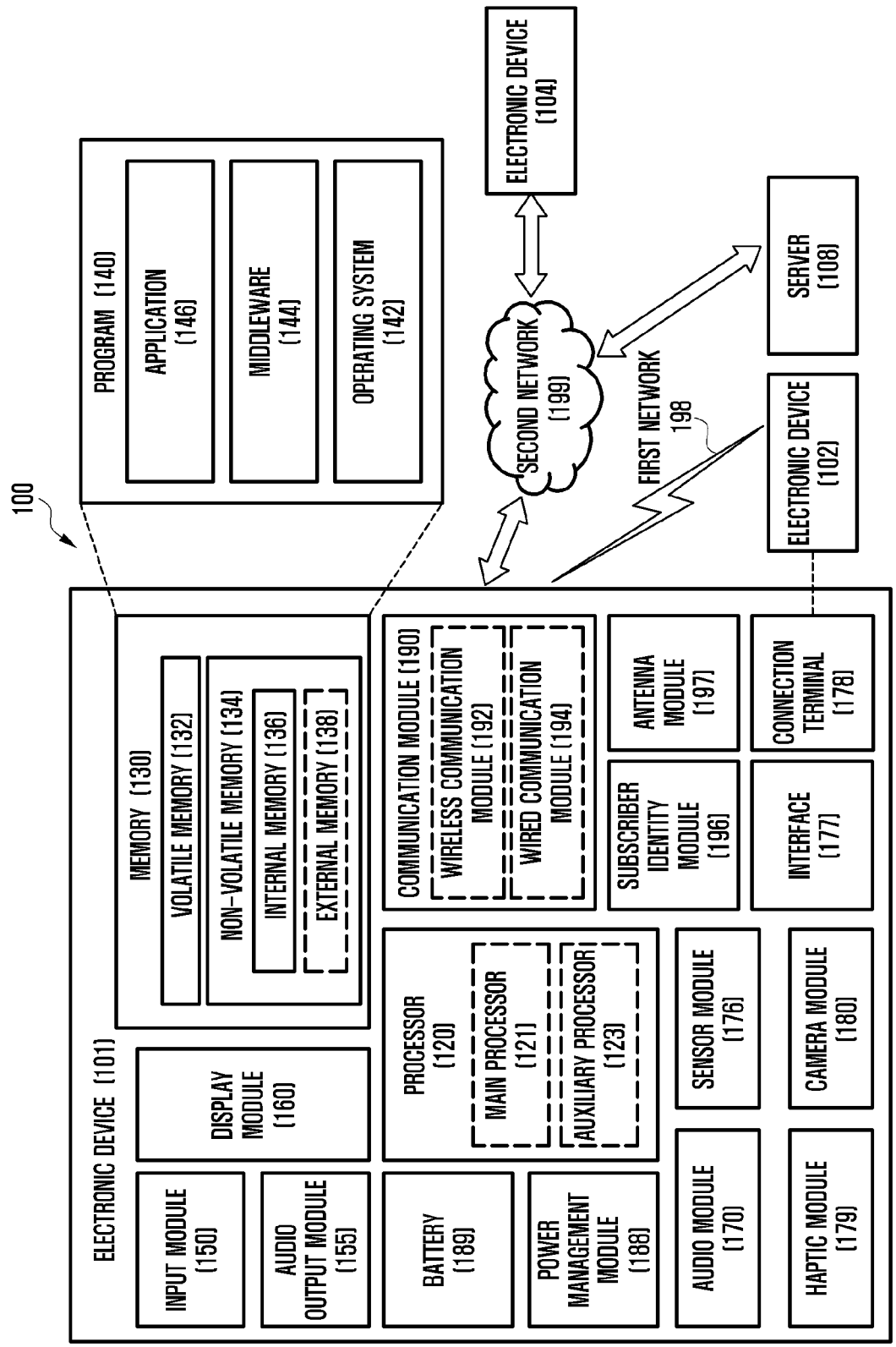
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a display module 160 shown in FIG. 1 may include a flexible display configured to fold or unfold a screen (e.g., a display screen).

According to an embodiment, the display module 160 shown in FIG. 1 may include a flexible display that is slidably disposed to provide a screen (e.g., a display screen).

According to an embodiment, although it has been described that the display module 160 shown in FIG. 1 includes a foldable display or a flexible display, the disclosure is not limited thereto. The display module 160 may include a bar type or plate type display.

Figure 2A:
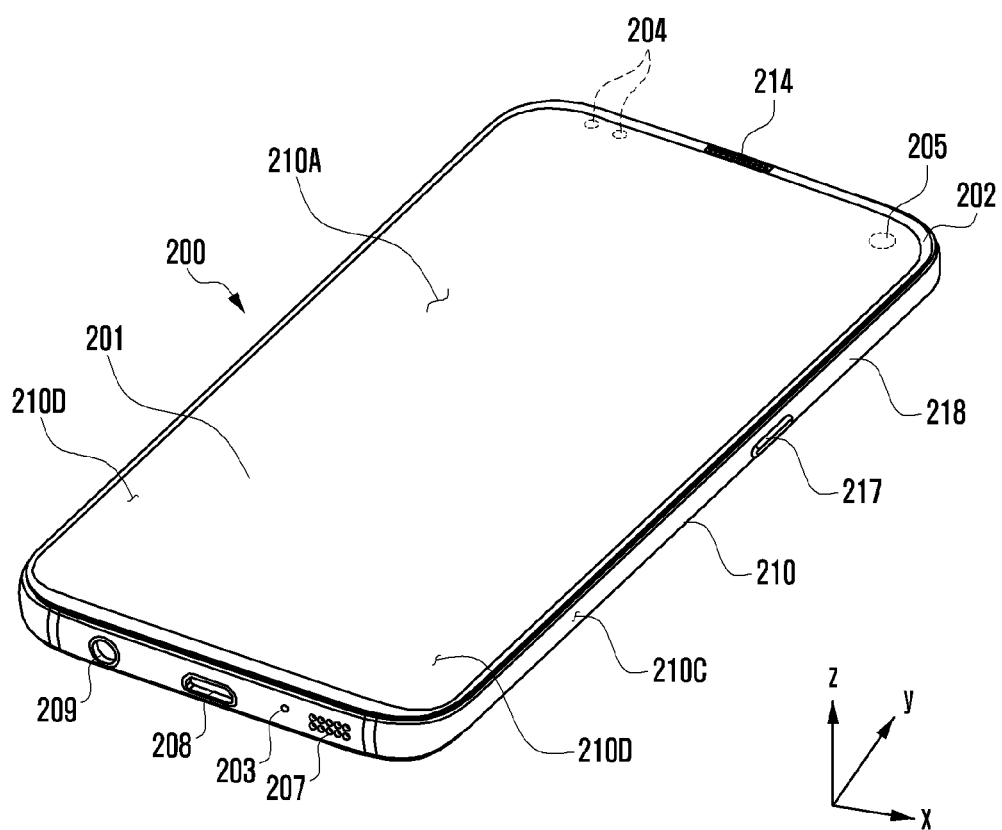
FIG. 2A is a perspective view illustrating a front surface of an electronic device according to an embodiment of the disclosure.

FIG. 2A is a perspective view illustrating a front surface of an electronic device according to an embodiment of the disclosure.

Figure 2B:
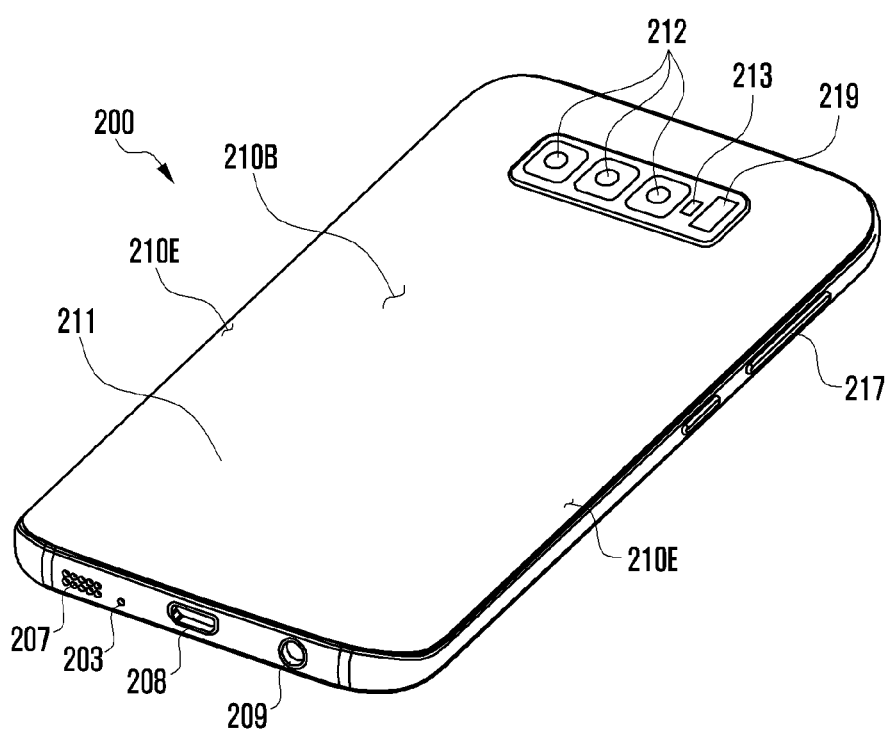
FIG. 2B is a perspective view illustrating a rear surface of an electronic device according to an embodiment of the disclosure.

FIG. 2B is a perspective view illustrating a rear surface of an electronic device according to an embodiment of the disclosure.

Referring to FIGS. 2A and 2B, an electronic device 200 (e.g., the electronic device 101 in FIG. 1) according to various embodiments of the disclosure may include a first surface (or a front surface) 210A, a second surface (or a rear surface) 210B, and a housing 210. A display 201 (e.g., the display module 160 in FIG. 1) may be disposed in a space formed by the housing 210. The housing 210 may include a side surface 210C surrounding the space between the first surface 210A and the second surface 210B. In another embodiment, the housing 210 may refer to a structure that forms part of the first surface 210A, the second surface 210B, and the side surface 210C.

According to an embodiment, the first surface 210A may be formed by a front plate 202 at least a portion of which is substantially transparent (e.g., a glass plate including various coating layers, or a polymer plate).

According to an embodiment, the second surface 210B may be formed by a substantially opaque rear plate 211. The rear plate 211 may be formed of, for example, coated or tinted glass, ceramic, polymer, metal (e.g., aluminum, stainless steel (STS), or magnesium), or a combination of at least two of the above materials. However, the rear plate 211, not limited thereto, may be formed of transparent glass.

According to an embodiment, the side surface 210C may be coupled to the front plate 202 and the rear plate 211 and may be formed by a side bezel structure 218 (or "side member") including metal and/or polymer. In some embodiments, the rear plate 211 and the side bezel structure 218 may be integrally formed and may include the same material (e.g., a metal material such as aluminum).

In an embodiment, the front plate 202 may include two first areas 210D seamlessly extending from the first surface 210A to be bent toward the rear plate 211. The two first areas 210D may be disposed at both ends of a long edge of the front plate 202.

In an embodiment, the rear plate 211 may include two second areas 210E seamlessly extending from the second surface 210B to be bent toward the front plate 202. In some embodiments, the front plate 202 (or the rear plate 211) may include only one of the first areas 210D (or the second areas 210E). In some embodiments, some of the first areas 210D or second areas 210E may not be included. In embodiments, when viewed from the side of the electronic device 200, the side bezel structure 218 may have a first thickness (or width) on the side surface that does not include the first areas 210D or the second areas 210E, and a second thickness, which is less than the first thickness, on the side surface including the first areas 210D or the second areas 210E.

According to an embodiment, the electronic device 200 may include at least one or more of a display 201 (e.g., the display module 160 in FIG. 1), a sound input device 203 (e.g., the input module 150 in FIG. 1), sound output devices 207 and 214 (e.g., the sound output module 155 in FIG. 1), sensor modules 204 and 219 (e.g., the sensor module 176 in FIG. 1), camera modules 205 and 212 (e.g., the camera module 180 in FIG. 1), a flash 213, a key input device 217, an indicator (not shown), and connectors 208 and 209. In some embodiments, the electronic device 200 may exclude at least one of the elements (e.g., the key input device 217) or further include other elements.

According to an embodiment, the display 201 (e.g., the display module 160 in FIG. 1) may be visible through the upper portion of the front plate 202. In some embodiments, at least a portion of the display 201 may be visible through the front plate 202 configuring the first surface 210A and the first area 210D of the side surface 210C. The display 201 may be combined with a touch sensing circuit, a pressure sensor capable of measuring the intensity (pressure) of a touch, and/or a digitizer that detects a magnetic field type stylus pen, or may be disposed adjacent thereto. In some embodiments, at least a portion of the sensor modules 204 and 219, and/or at least a portion of the key input device 217 may be disposed in the first area 210D and/or the second area 210E.

In some embodiments, at least one or more of the sensor module 204, the camera module 205 (e.g., an image sensor), the audio module 214, and a fingerprint sensor may be included on a rear surface of the screen display area of the display 201.

According to an embodiment, the sound input device 203 may include a microphone. In some embodiments, the sound input device 203 may include a plurality of microphones arranged to sense the direction of a sound. The sound output devices 207 and 214 may include sound output devices 207 and 214. The sound output devices 207 and 214 may include an external speaker 207 and a receiver for a call (e.g., an audio module 214). In some embodiments, the sound input device 203 (e.g., a microphone), the sound output devices 207 and 214, and the connectors 208 and 209 may be disposed in the inner space of the electronic device 200, and may be exposed to the external environment through at least one hole formed in the housing 210. In some embodiments, the hole formed in the housing 210 may be used in common for the sound input device 203 (e.g., a microphone) and the sound output devices 207 and 214. In some embodiments, the sound output devices 207 and 214 may include a speaker (e.g., a piezo speaker) that operates without a hole formed in the housing 210.

According to an embodiment, the sensor modules 204 and 219 (e.g., the sensor module 176 in FIG. 1) may generate electrical signals or data values corresponding to the internal operation state of the electronic device 200 or an external environmental state. The sensor modules 204 and 219 may include, for example, a first sensor module 204 (e.g., a proximity sensor) disposed on the first surface 210A of the housing 210, and/or a second sensor module 219 (e.g., an HRM sensor) and/or a third sensor module (not shown) (e.g., a fingerprint sensor) disposed on the second surface 210B of the housing 210. For example, the fingerprint sensor may be disposed on the first surface 210A (e.g., the display 201) and/or the second surface 210B of the housing 210. The electronic device 200 may further include at least one of sensor modules (not shown) such as a gesture sensor, a gyro sensor, an atmospheric pressure sensor, a magnetic sensor, an acceleration sensor, a grip sensor, a color sensor, an IR (infrared) sensor, a biometric sensor, a temperature sensor, a humidity sensor, or an illuminance sensor.

According to an embodiment, the camera modules 205 and 212 may include a first camera module 205 disposed on the first surface 210A of the electronic device 200, and a second camera module 212 disposed on the second surface 210B. A flash 213 may be disposed around the camera modules 205 and 212. The camera modules 205 and 212 may include one or more lenses, an image sensor, and/or an image signal processor. The flash 213 may include, for example, a light-emitting diode or a xenon lamp.

In an embodiment, the first camera module 205 may be disposed under the display panel of the display 201 by an under-display camera (UDC) type. In some embodiments, two or more lenses (wide-angle and telephoto lenses) and image sensors may be disposed on one side of the electronic device 200. In some embodiments, a plurality of first camera modules 205 may be disposed on the first surface (e.g., the surface on which a screen is displayed) of the electronic device 200 by the under-display camera (UDC) type.

In an embodiment, the key input device 217 may be disposed on the side surface 210C of the housing 210. In another embodiment, the electronic device 200 may exclude some or all of the above-mentioned key input devices 217, and the excluded key input devices 217 may be implemented in other forms such as soft keys or the like on the display 201. In another embodiment, the key input device 217 may be implemented using a pressure sensor included in the display 201.

In an embodiment, the connectors 208 and 209 may include a first connector hole 208 capable of accommodating a connector for transmitting and receiving power and/or data to and from an external electronic device (e.g., a universal serial bus (USB) connector), and/or a second connector hole 209 (or an earphone jack) capable of accommodating a connector for transmitting and receiving audio signals to and from an external electronic device. The first connector hole 208 may include a port of USB type A or a port of USB type C. In the case where the first connector hole 208 supports USB type C, the electronic device 200 (e.g., the electronic device 101 in FIG. 1) may support USB power delivery (PD) charging.

In an embodiment, some camera modules 205 of the camera modules 205 and 212 and/or some sensor modules 204 of the sensor modules 204 and 219 may be disposed to be visible through the display 201. As another example, in the case where the camera module 205 is disposed by the under-display camera (UDC) type, the camera module 205 may not be visible to the outside.

In an embodiment, the camera module 205 may be disposed to overlap the display area, and a screen may also be displayed in the display area corresponding to the camera module 205. Some sensor modules 204 may be disposed in the internal space of the electronic device to execute their functions without being visually exposed through the front plate 202.

FIG. 3A is a diagram illustrating a first state (e.g., a flat state or an open state) of an electronic device according to an embodiment of the disclosure.

Figure 3B:
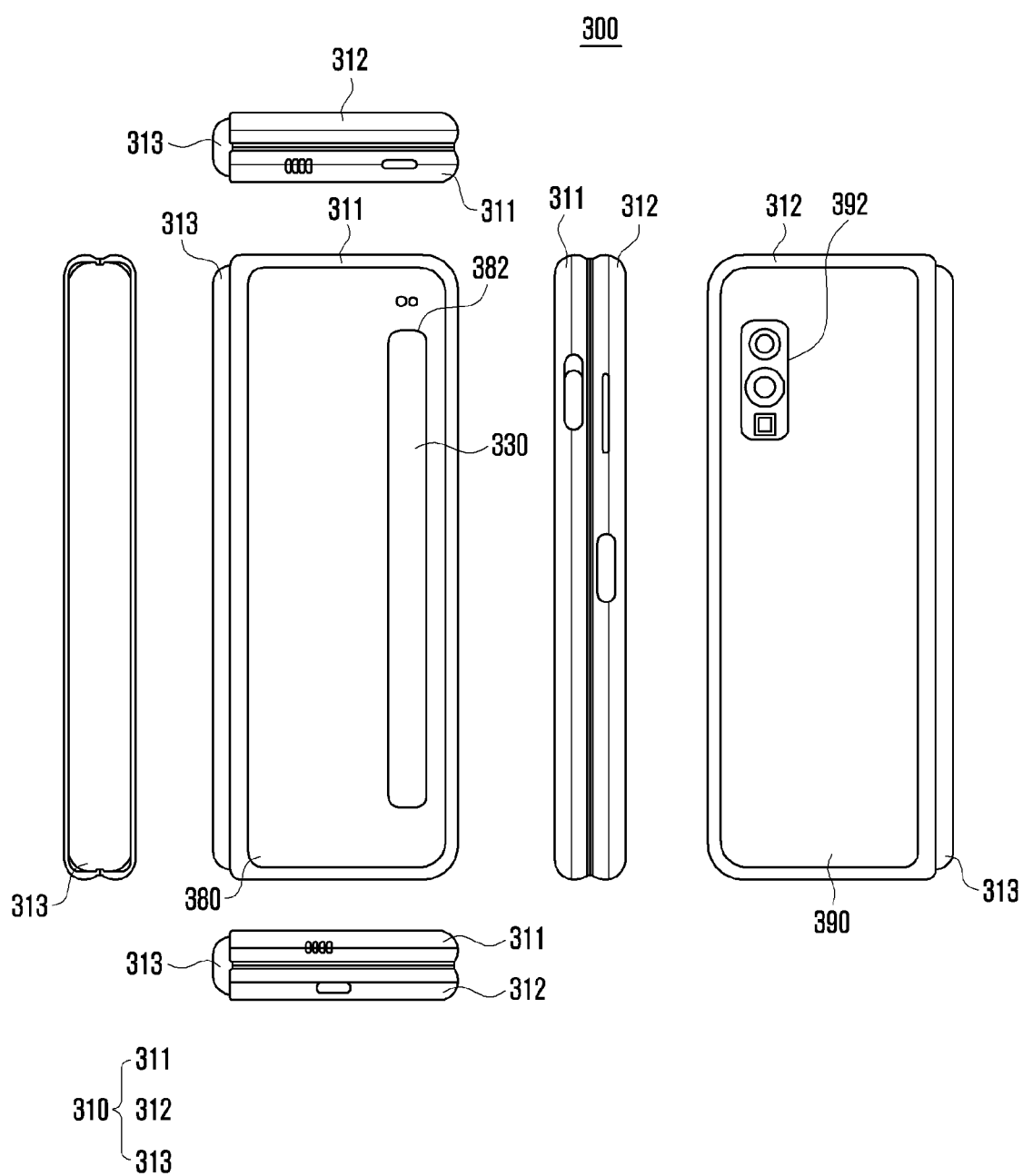
FIG. 3B is a diagram illustrating a second state (e.g., a folded state or a closed state) of an electronic device according to an embodiment of the disclosure.

FIG. 3B is a diagram illustrating a second state (e.g., a folded state or a closed state) of an electronic device according to an embodiment of the disclosure.

Referring to FIGS. 3A and 3B, an electronic device 300 (e.g., the electronic device 101 in FIG. 1) may include a housing 310 and a display 320 disposed in a space formed by the housing 310. In an embodiment, the display 320 may include a flexible display or a foldable display.

The surface on which the display 320 is disposed may be defined as a first surface or a front surface of the electronic device 300 (e.g., the surface on which a screen is displayed when unfolded). In addition, a surface opposite the front surface may be defined as a second surface or a rear surface of the electronic device 300. In addition, a surface surrounding the space between the front surface and the rear surface may be defined as a third surface or a side surface of the electronic device 300. For example, a folding area 323 of the electronic device 300 may be folded or unfolded in a first direction (e.g., the x-axis direction) about the folding axis (e.g., the axis A).

In another embodiment, the housing 310 may include a first housing structure 311, a second housing structure 312 including a sensor area 324, and a hinge cover 313. In addition, the housing 310 may include a first rear cover 380 and a second rear cover 390. The housing 310 of the electronic device 300 is not limited to the shape and configuration shown in FIGS. 3A and 3B, and may be implemented by a combination and/or configuration of other shapes or components. For example, the first housing structure 311 and the first rear cover 380 may be integrally formed, and the second housing structure 312 and the second rear cover 390 may be integrally formed.

In an embodiment, the first housing structure 311 and the second housing structure 312 may be disposed on both sides of the folding axis A, and have an overall symmetrical shape about the folding axis A. The angle or distance between the first housing structure 311 and the second housing structure 312 may vary depending on whether the electronic device 300 is in an unfolded state (e.g., a first state), a folded state (e.g., a second state), or an intermediate state (e.g., a third state).

In an embodiment, although the second housing structure 312, unlike the first housing structure 311, further includes a sensor area 324 in which various sensors (e.g., an illuminance sensor, an iris sensor, and/or an image sensor) are disposed, the remaining areas, excluding the same, may be symmetrical with each other.

In an embodiment, at least one sensor (e.g., a camera module, an illuminance sensor, an iris sensor, and/or an image sensor) may be disposed under the display and/or the bezel area, as well as the sensor area 324.

In an embodiment, the first housing structure 311 and the second housing structure 312 may form a recess to receive the display 320 together. In the illustrated embodiment, due to the sensor area 324, the recess may have two or more different widths in the direction (e.g., the x-axis direction) perpendicular to the folding axis A.

For example, the recess may have a first width W1 between a first portion 311a of the first housing structure 311 and a first portion 312a of the second housing structure 312 formed at the periphery of the sensor area 324 in the second housing structure 312. The recess may have a second width W2 formed between a second portion 311b of the first housing structure 311 and a second portion 312b of the second housing structure 312.

For example, the second portion 311b of the first housing structure 311 may be formed parallel to the folding axis A of the first housing structure 311. The second portion 312b of the second housing structure 312 may be formed parallel to the folding axis A without falling within the sensor area 324 of the second housing structure 312. In this case, the second width W2 may be formed to be greater than the first width W1. In other words, the first portion 311a of the first housing structure 311 and the first portion 312a of the second housing structure 312, which are asymmetrical to each other, may form a first width W1 of the recess. The second portion 311b of the first housing structure 311 and the second portion 312b of the second housing structure 312, which are symmetrical to each other, may form a second width W2 of the recess.

In an embodiment, the first portion 312a and the second portion 312b of the second housing structure 312 may have different distances from the folding axis A. The widths of the recess are not limited to the illustrated examples. In various embodiments, the recess may have a plurality of widths by the shape of the sensor area 324 or asymmetrical-shaped portions of the first housing structure 311 and the second housing structure 312.

In an embodiment, at least portions of the first housing structure 311 and the second housing structure 312 may be formed of a metal material or a non-metal material having a selected magnitude of stiffness to support the display 320.

In an embodiment, the sensor area 324 may be formed to have a predetermined area adjacent to one corner of the second housing structure 312. However, the disposition, shape, and size of the sensor area 324 are not limited to the illustrated example. For example, In an embodiment, the sensor area 324 may be provided at another corner of the second housing structure 312 or any area between the top and bottom corners.

In an embodiment, components for executing various functions embedded in the electronic device 300 may be exposed to the front surface of the electronic device 300 through the sensor area 324 or through one or more openings provided in the sensor area 324. In various embodiments, the components may include various types of sensors. The sensor may include, for example, at least one of an illuminance sensor, a front camera (e.g., the camera module), a receiver, or a proximity sensor.

The first rear cover 380 may be disposed on one side of the folding axis A on the rear surface of the electronic device 300, and have a substantially rectangular periphery that is surrounded by the first housing structure 311. Similarly, the second rear cover 390 may be disposed on the other side of the folding axis A on the rear surface of the electronic device 300, and have a periphery surrounded by the second housing structure 312.

In the illustrated embodiment, the first rear cover 380 and the second rear cover 390 may have a substantially symmetrical shape with respect to the folding axis A. However, the first rear cover 380 and the second rear cover 390 do not necessarily have a substantially symmetrical shape, and In an embodiment, the electronic device 300 may have a first rear cover 380 and a second rear cover 390 in various shapes. In an embodiment, the first rear cover 380 may be integrally formed with the first housing structure 311, and the second rear cover 390 may be integrally formed with the second housing structure 312.

In an embodiment, the first rear cover 380, the second rear cover 390, the first housing structure 311, and the second housing structure 312 may provide a space in which various components (e.g., a printed circuit board or a battery) of the electronic device 300 may be disposed. In an embodiment, one or more components may be disposed on or visually exposed through the rear surface of the electronic device 300. For example, at least a portion of a sub-display 330 may be visually exposed through the first rear area 382 of the first rear cover 380. In an embodiment, one or more components or sensors may be visually exposed through the second rear area 392 of the second rear cover 390. In various embodiments, the sensors may include an illuminance sensor, a proximity sensor, and/or a rear camera.

In an embodiment, the hinge cover 313 may be disposed between the first housing structure 311 and the second housing structure 312, and may be configured to cover internal components (e.g., a hinge structure). The hinge cover 313 may cover a portion where the first housing structure 311 and the second housing structure 312 come into contact with each other by unfolding and folding the electronic device 300.

In an embodiment, the hinge cover 313 may be covered by portions of the first housing structure 311 and the second housing structure 312 or may be exposed to the outside according to the operation state (flat state or folded state) of the electronic device 300. In an embodiment, when the electronic device 300 is in the flat state, the hinge cover 313 may be covered by the first housing structure 311 and the second housing structure 312 to not be exposed. In an embodiment, when the electronic device 300 is in the folded state (e.g., in the fully folded state), the hinge cover 313 may be exposed to the outside between the first housing structure 311 and the second housing structure 312. In an embodiment, in the intermediate state in which the first housing structure 311 and the second housing structure 312 are folded with a certain angle, a portion of the hinge cover 313 may be exposed to the outside between the first housing structure 311 and the second housing structure 312. In this case, the exposed area may be smaller than that in the fully folded state. In an embodiment, the hinge cover 313 may include a curved surface.

The display 320 may be disposed in a space formed by the housing 310. For example, the display 320 may be seated on a recess formed by the housing 310 and may constitute most of the front surface of the electronic device 300.

Accordingly, the front surface of the electronic device 300 may include the display 320, and a partial area of the first housing structure 311 and a partial area of the second housing structure 312, which are adjacent to the display 320. In addition, the rear surface of the electronic device 300 may include a first rear cover 380, a partial area of the first housing structure 311 adjacent to the first rear cover 380, a second rear cover 390, and a partial area of the second housing structure 312 adjacent to the second rear cover 390.

The display 320 may indicate a display in which at least a partial area thereof can be transformed into a flat or curved surface. In an embodiment, the display 320 may include a folding area 323, a first area 321 disposed on one side of the folding area 323 (e.g., on the left side in FIG. 3A), and a second area 322 disposed on the other side thereof (e.g., on the right side in FIG. 3A).

In an embodiment, the display 320 may include a top-emission or bottom-emission type organic light emitting diode (OLED) display. The OLED display may include a low temperature color filter (LTCF) layer, window glass (e.g., ultra-thin glass (UTG) or a polymer window), and an optical compensation film (OCF). Here, a polarizing film (or polarizing layer) may be replaced with the LTCF layer of the OLED display.

The areas of the display 320 are divided by way of example, and the display 320 may be divided into a plurality of (e.g., two or more) areas depending on a structure or function. In an embodiment, although the display 320 may be divided into areas by the folding area 323 or the folding axis A extending parallel to the y-axis, In an embodiment, the display 320 may divided into areas, based on another folding area (e.g., a folding area parallel to the x-axis) or another folding axis (e.g., a folding axis parallel to the x-axis).

In an embodiment, the first area 321 and the second area 322 may have an overall symmetrical shape with respect to the folding area 323.

Hereinafter, the operation of the first housing structure 311 and the second housing structure 312 and respective areas of the display 320 according to the operation state (e.g., the flat state and the folded state) of the electronic device 300 will be described.

In an embodiment, when the electronic device 300 is in the flat state (e.g., the state in FIG. 3A), the first housing structure 311 and the second housing structure 312 may be disposed to form an angle of 180 degrees and to be directed in the same direction. The surface of the first area 321 and the surface of the second area 322 of the display 320 may form about 180 degrees with each other and may be directed in substantially the same direction (e.g., in a direction to the front of the electronic device). The folding area 323 may form the same plane as the first area 321 and the second area 322.

In an embodiment, when the electronic device 300 is in the folded state (e.g., the state in FIG. 3B), the first housing structure 311 and the second housing structure 312 may be disposed to face each other. For example, the surface of the first area 321 and the surface of the second area 322 of the display 320 may form a narrow angle (e.g., between 0 degrees and 10 degrees) to face each other. At least a portion of the folding area 323 may form a curved surface having a certain curvature.

In an embodiment, when the electronic device 300 is in the intermediate state, the first housing structure 311 and the second housing structure 312 may be disposed at a certain angle with each other. For example, the surface of the first area 321 and the surface of the second area 322 of the display 320 may form an angle greater than that in the folded state and less than that in the flat state. The folding area 323 may be configured as a curved surface in which at least a portion thereof has a certain curvature, and the curvature may be less than that in the folded state.

Electronic devices according to various embodiments may include electronic devices in a bar type, a foldable type, a rollable type, a sliding type, and a wearable type, and electronic devices such as tablet PCs and/or notebook PCs. The electronic devices 101, 200, and 300 according to various embodiments are not limited to the above-described examples, and may include other various electronic devices.

Figure 4:
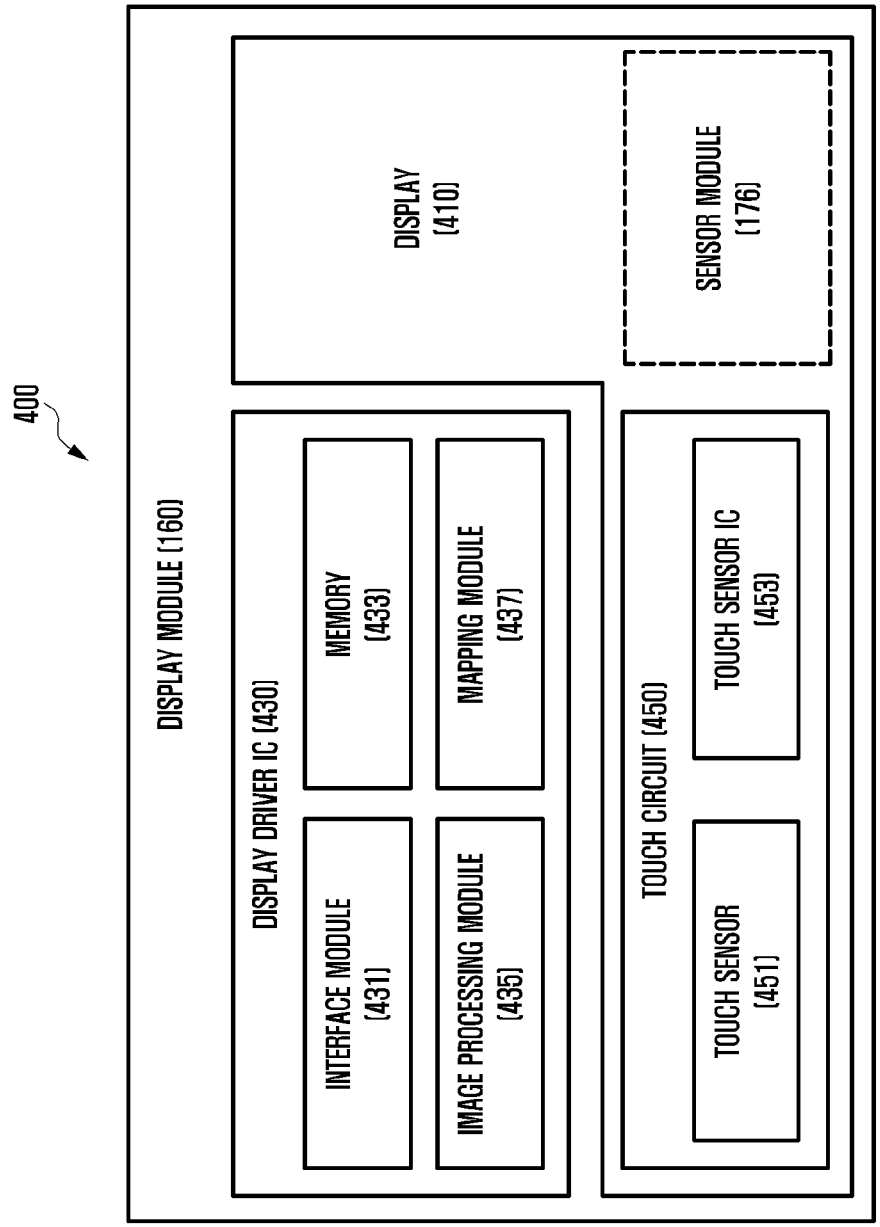
FIG. 4 is a block diagram of a display module of an electronic device according to an embodiment of the disclosure.

FIG. 4 is a block diagram of a display module of an electronic device according to an embodiment of the disclosure.

Referring to FIG. 4, an electronic device may include a display module 160 (e.g., a display device) which may include a display 410 (e.g., the display 201 in FIG. 2A or the display 320 in FIG. 3A), a display driver integrated circuit (IC) 430 (hereinafter, referred to as a "display driver IC (DDI) 430") to control the display 410, and a touch circuit 450.

The DDI 430 may include an interface module 431, a memory 433 (e.g., a buffer memory), an image processing module 435, and/or a mapping module 437.

According to an embodiment, the DDI 430 may receive image data or image information including an image control signal corresponding to a command for controlling the image data from another element of the electronic device 400 (e.g., the electronic device 101 in FIG. 1, the electronic device 200 in FIG. 2A, or the electronic device 300 in FIG. 3A) through the interface module 431.

According to another embodiment, the image information may be received from a processor (e.g., the processor 120 in FIG. 1) (e.g., the main processor 121 in FIG. 1) (e.g., an application processor) or a coprocessor (e.g., the auxillary processor 123 in FIG. 1) (e.g., a graphic processing unit) that operates independently of the function of the main processor 121.

According to an embodiment, the DDI 430 may communicate with a touch circuit 450 or a sensor module 176 (e.g., the camera module 205 in FIG. 2A or the camera module disposed in the sensor area 324 in FIG. 3A) through the interface module 431. In addition, the DDI 430 may store at least some of the received image information in the memory 433. For example, the DDI 430 may store at least some of the received image information in the memory 433 in units of frames.

According to an embodiment, the image processing module 435 may perform pre-processing or post-processing of at least some of the image data (e.g., adjusting resolution, brightness, or size), based on at least the characteristics of the image data or the characteristics of the display 410.

According to an embodiment, the mapping module 437 may generate a voltage value or a current value corresponding to the image data pre-processed or post-processed through the image processing module 435. In an embodiment, the generation of the voltage value or the current value may be performed based on, for example, at least some of properties of the pixels of the display 410 (e.g., an arrangement of pixels (a red green blue (RGB) stripe or pentile structure), a size of each sub-pixel, and deterioration of pixels).

In an embodiment, since at least some of the pixels of the display 410 may be driven based on at least some of the voltage value or the current value, visual information (e.g., text, images, or icons) corresponding to the image data may be displayed through the display 410.

According to an embodiment, the display module 160 may include a touch circuit 450. The touch circuit 450 may include a touch sensor 451 and a touch sensor IC 453 for controlling the same.

In an embodiment, the touch sensor IC 453 may control the touch sensor 451 to detect a touch input or a hovering input to a specific position of the display 410. For example, the touch sensor IC 453 may detect a touch input or a hovering input by measuring a change in a signal (e.g., voltage, quantity of light, resistance, or quantity of electric charge) at a specific position of the display 410. The touch sensor IC 453 may provide information (e.g., position, area, pressure, or time) about the detected touch input or hovering input to the processor (e.g., the processor 120 in FIG. 1).

According to an embodiment, at least a part (e.g., the touch sensor IC 453) of the touch circuit 450 may be included as a part of the DDI 430 or display 410.

According to an embodiment, at least a part (e.g., the touch sensor IC 453) of the touch circuit 450 may be included as a part of another element (e.g., the auxilary processor 123) disposed outside the display module 160.

According to an embodiment, the display module 160 may further include a sensor module 176 and/or a control circuit for the sensor module 176. The sensor module 176 may include at least one sensor (e.g., a camera module, an illumination sensor, a fingerprint sensor, an iris sensor, a pressure sensor, and/or an image sensor). In this case, the at least one sensor or the control circuit therefor may be embedded in a part (e.g., the display 410 or the DDI 430) of the display module 160 or a part of the touch circuit 450.

According to an embodiment, in the case where the sensor module 176 includes a camera module (e.g., an image sensor) (e.g., the camera module 510 in FIG. 5), the camera module (e.g., the image sensor) (e.g., the camera module 510 in FIG. 5) may be disposed under (e.g., below) the display 410 by an under-display camera (UDC) type.

According to an embodiment, in the case where the sensor module 176 embedded in the display module 160 includes an illuminance sensor, the illuminance sensor may detect an exposure amount of ultraviolet (UV) light according to external light exposure of the display.

According to an embodiment, in the case where the sensor module 176 embedded in the display module 160 includes a biometric sensor (e.g., a fingerprint sensor), the biometric sensor may obtain biometric information (e.g., a fingerprint image) associated with a touch input through a partial area of the display 410.

According to an embodiment, in the case where the sensor module 176 embedded in the display module 160 includes a pressure sensor, the pressure sensor may obtain pressure information associated with a touch input through a partial area or the entire area of the display 410.

According to an embodiment, the touch sensor 451 or the sensor module 176 may be disposed between pixels of the pixel layer of the display 410 or above or below the pixel layer.

As another example, the sensor module 176 may be disposed in a bezel area of an electronic device (e.g., the electronic device 101 in FIG. 1).

Figure 5:
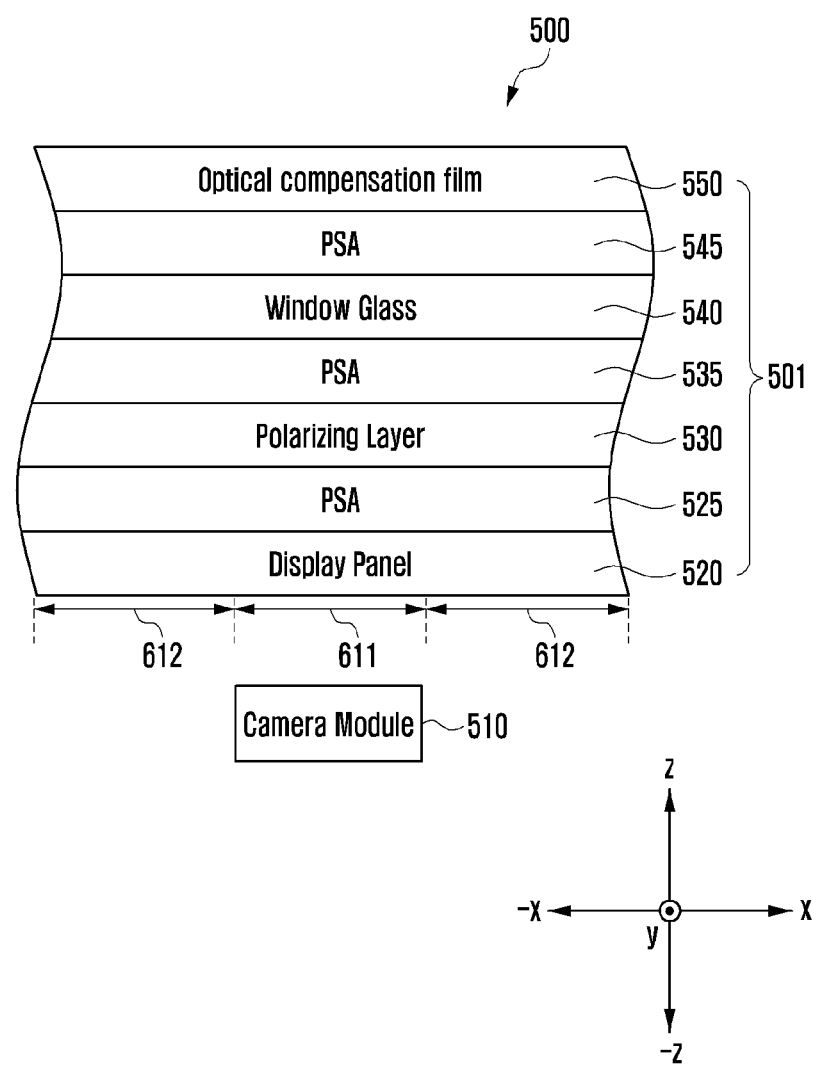
FIG. 5 is a diagram illustrating a display and a camera module (e.g., an image sensor) according to an embodiment of the disclosure.

FIG. 5 is a diagram illustrating a display and a camera module (e.g., an image sensor) according to an embodiment of the disclosure.

Figure 6:
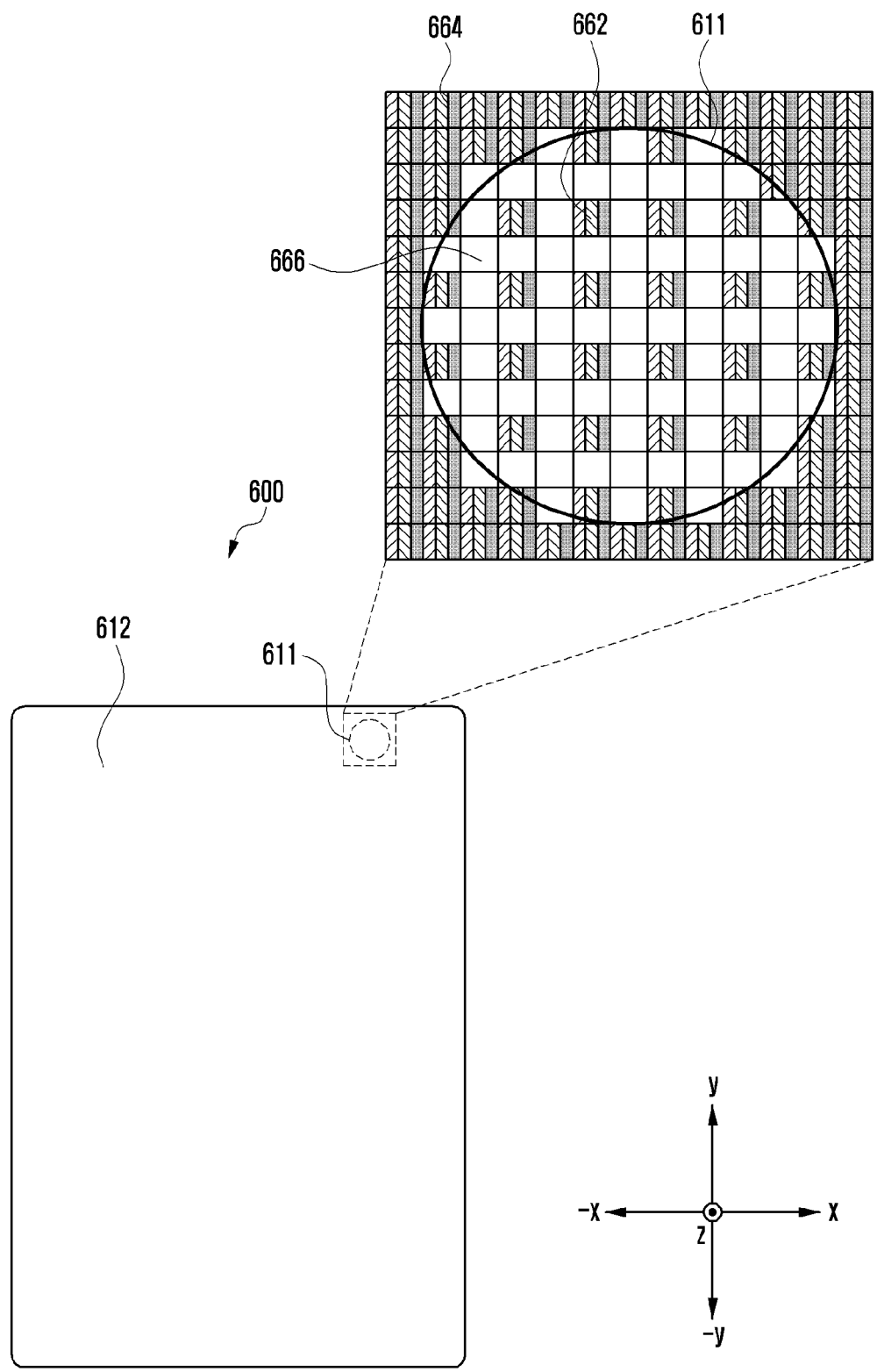
FIG. 6 is a diagram illustrating shapes of pixels disposed in a first area (e.g., a UDC area) and a second area (e.g., an active area) of a display according to an embodiment of the disclosure.

FIG. 6 is a diagram illustrating shapes of pixels disposed in a first area (e.g., a UDC area) and a second area (e.g., an active area) of a display according to an embodiment of the disclosure.

Referring to FIGS. 5 and 6, electronic devices 500 and 600 according to various embodiments of the disclosure may include a display 501 and a camera module 510 (e.g., the camera module 205 in FIG. 2A or the camera module disposed in the sensor area 324 in FIG. 3A).

According to an embodiment, the display 501 may include a display panel 520, a polarizing layer 530 (e.g., a polarizing film), and window glass 540 (e.g., ultra-thin glass (UTG) or a polymer window), and an optical compensation film (OCF) 550. The optical compensation film 550 may be disposed to correspond to the entire surface of the polarizing layer 530 and the window glass 540.

In another embodiment, in the case where the display 501 is a flexible display, the window glass 540 may be ultra-thin glass (UTG) or a polymer window.

According to an embodiment, the camera module 510 (or an image sensor) may be disposed under (e.g., below) the display 501 by an under-display camera (UDC) type. For example, the camera module 510 may be disposed under (e.g., below) the display panel 520.

In an embodiment, at least one camera module 510 may be disposed under the display panel 520. The disclosure is not limited thereto, and a plurality of camera modules 510 may be disposed under the display panel 520.

In an embodiment, the display panel 520 may include a first area 611 (e.g., an under-display camera (UDC) area) corresponding to the camera module 510 and a second area 612 (e.g., an active area).

In an embodiment, pixels 662 may be disposed in the first area 611 (e.g., the UDC area), as well as the second area 612 (e.g., the active area), of the display panel 520 to display images.

FIG. 6 illustrates that the first area 611 (e.g., the UDC area) is disposed in the upper right portion of the electronic device 500 by way of example. The first area 611 (e.g., the UDC area), not limited thereto, may also be disposed in the upper center, upper left portion, center, right middle portion, left middle portion, lower right portion, lower center, or lower left portion of the electronic device 500, and the first area 611 (e.g., the UDC area) is not limited to a specific position.

In an embodiment, the polarizing layer 530 may be disposed on the display panel 520 (e.g., in the z-axis direction). The polarizing layer 530 may polarize the incident light and output the same. The polarizing layer 530 may polarize the light incident on the display panel 520 to prevent deterioration of display quality due to light reflection.

In an embodiment, the display 501 may be configured without the polarizing layer 530.

In an embodiment, the window glass 540 may be disposed on the display panel 520 or the polarizing layer 530. An optical compensation film 550 may be disposed on the window glass 540. The optical compensation film 550 may have a protection film function of protecting the window glass 540 and a phase difference film function of preventing rainbow color spots due to application of the polarizing layer 530.

It is illustrated that one optical compensation film 550 is disposed on the window glass 540. The disclosure is not limited thereto, and a plurality of optical compensation films may be disposed on the window glass 540. In addition, one optical compensation film 550 may be disposed on the window glass 540, and a protective layer (or a coating layer) may be disposed on the optical compensation film 550.

The optical compensation film 550 may have a protective film function or a shock absorption function in addition to the optical compensation function. Therefore, the thicker optical compensation film 550 is preferable in terms of the protective film function or the shock absorption function. However, in the case of a foldable phone, the thickness of the optical compensation film 550 should be considered because folding features are important, and in this proposal, the optical compensation film 550 may be configured to have a thickness of, for example, about 20 to 100 μm.

A first adhesive member 525 may be formed between the display panel 520 and the polarizing layer 530 to bond the display panel 520 and the polarizing layer 530. A second adhesive member 535 may be formed between the polarizing layer 530 and the window glass 540 to bond the polarizing layer 530 and the window glass 540. A third adhesive member 545 may be formed between the window glass 540 and the optical compensation film 550 to bond the window glass 540 and the optical compensation film 550.

The first to third adhesive members 525, 535, and 545 may include an optical clear adhesive (OCA), a pressure sensitive adhesive (PSA), a heat-responsive adhesive, a general adhesive, or a double-sided tape. In order to facilitate attachment and detachment of the optical compensation film 550 disposed on the window glass 540, the adhesive strength of the third adhesive member 545 may be configured to be lower (or weaker) than those of the first adhesive member 525 and the second adhesive member 535.

According to an embodiment, the display panel 520 and the polarizing layer 530 may be integrally formed. According to an embodiment, a color filter formed of red green blue (RGB) pigments which have a polarization function may be disposed on the pixels of the display panel 520, thereby excluding the polarizing layer 530. Even in the case where a color filter with a polarization function is applied, the optical compensation film 550 may be disposed on the window glass 540. For example, a light reflection blocking layer (e.g., a black pixel define layer (BPDL)) capable of preventing reflection of external light may be provided inside the display panel 520.

According to an embodiment, in order to prevent deterioration of the performance of the camera module 510 due to the refractive index, the polarizing layer 530 disposed on the display panel 520 may include openings obtained by perforating the position corresponding to the camera module 510 (e.g., a lens). In an embodiment, the polarizing layer 530 may be processed to be transparent or to not have a polarization property at the position corresponding to the camera module 510. In an embodiment, the layers (e.g., the display panel 520) or touch panel without openings may include a coating capable of index matching in order to minimize the refractive index difference.

The display panel 520 may be an organic light emitting diode (OLED) panel, a liquid crystal display (LCD), or a quantum dot light-emitting diode (QLED) panel. The display panel 520 may include a plurality of pixels to display an image, and one pixel may include a plurality of sub-pixels. In an embodiment, one pixel may be configured as a red sub-pixel, a green sub-pixel and a blue sub-pixel in three colors. In an embodiment, one pixel may be configured as a red sub-pixel, a green sub-pixel, a blue sub-pixel, and a white sub-pixel in four colors. In an embodiment, one pixel may be configured by an RGBG pentile type including one red sub-pixel, two green sub-pixels, and one blue sub-pixel.

According to various embodiments, the display 501 may include a control circuit (not shown). According to an embodiment, the control circuit may include a flexible printed circuit board (FPCB) that electrically connects the main printed circuit board and the display panel 520, and a DDI (e.g., the display driver IC 430 in FIG. 4) mounted on the FPCB. In an embodiment, at least one side of the display panel 520 may extend, and the DDI 430 may be disposed in the extended portion in a COP (chip-on-panel or chip-on-plastic) type.

According to an embodiment, the display 501 may further include a touch panel (e.g., the touch circuit 450 in FIG. 4). According to an embodiment, the display 501 may operate as an in-cell type or on-cell type touch display depending on the arrangement position of the touch panel. In the case where the display operates as an in-cell type, on-cell type, or add-on type touch display, the control circuit may include a touch display driver IC (TDDI). In an embodiment, the display 501 may include a sensor module (e.g., the sensor module 176 in FIG. 4).

In an embodiment, in the entire area of the display panel 520, the remaining portion excluding the first area 611 (e.g., the UDC area) corresponding to the camera module 510 may be the second area 612 (e.g., the active area).

The camera module 510 must secure transmittance in consideration of the quality of images to be captured because it is disposed under the display panel 520 in an under-display camera (UDC) type. To this end, the density of pixels 662 disposed in the first area 611 (e.g., the UDC area) and the density of pixels 664 disposed in the second area 612 (e.g., the active area) may be configured to be different from each other.

In an embodiment, the number of pixels 662 disposed in the first area 611 (e.g., the UDC area) may be disposed to be smaller than the number of pixels 664 disposed in the second area 612 (e.g., the active area) by ½, ⅓, ¼, ⅕, or ⅙. The pixels 662 may be disposed in the area corresponding to ½, ⅓, ¼, ⅕, or ⅙ area of the total area of the first area 611 (e.g., the UDC area), and the remaining areas may be configured as empty areas 666 (or non-pixel areas) without pixels. The disclosure is not limited thereto, and a ratio of pixels 662 disposed in the first area 611 (e.g., the UDC area) may vary.

Referring again to FIG. 6, the pixels 662 of the first area 611 (e.g., the UDC area) are arranged regularly. However, the disclosure is not limited thereto, and the pixels 662 disposed in the first area 611 (e.g., the UDC area) may be arranged at irregular intervals. In addition, it is illustrated that the first area 611 (e.g., the UDC area) has a circular shape by way of example. The disclosure is not limited thereto, and the first area 611 (e.g., the UDC area) may be formed in an elliptical or polygonal shape.

Figure 7:
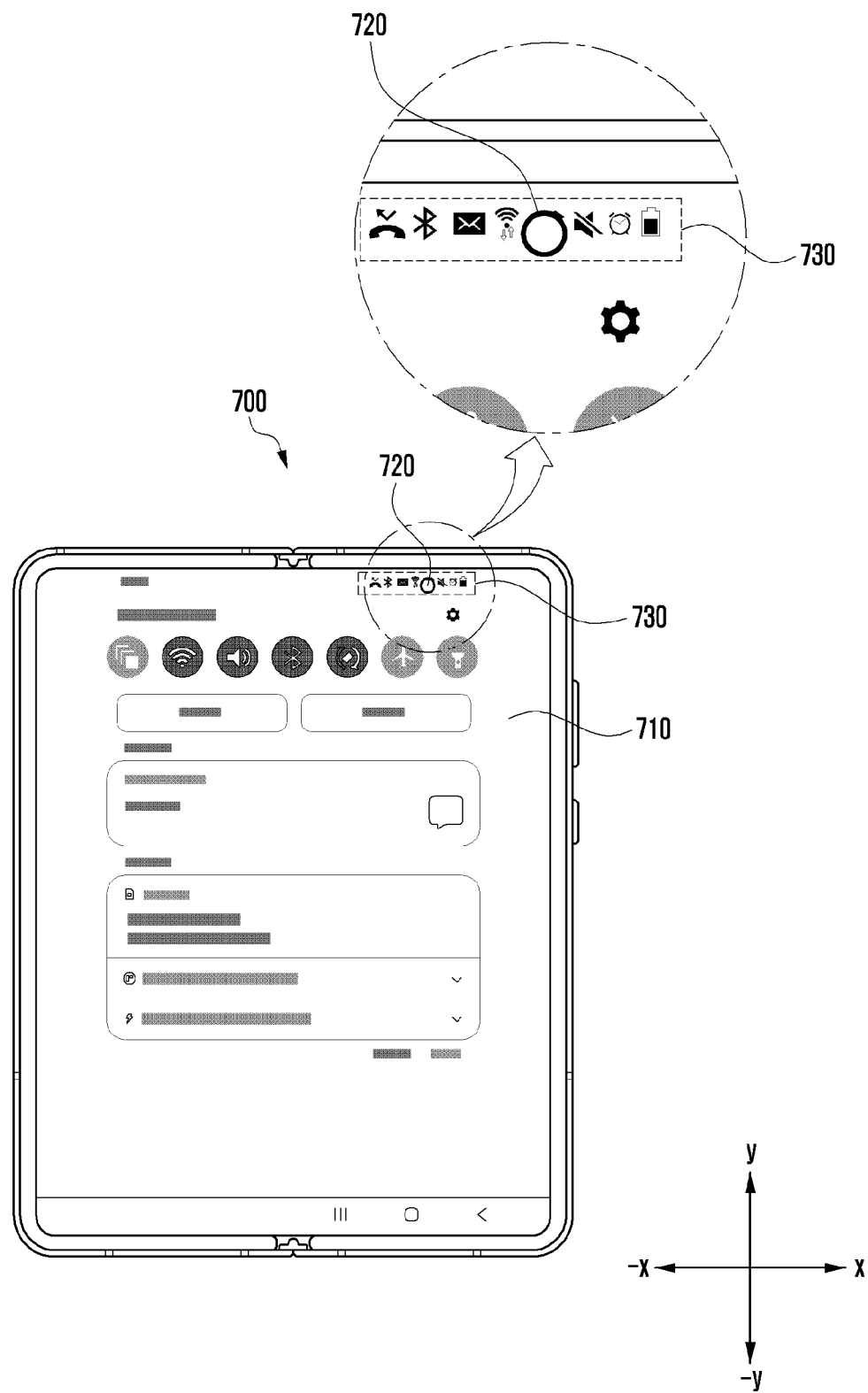
FIG. 7 is a diagram illustrating a conflict between a cutout of a UDC (under-display camera) and an icon when a display of an electronic device according to an embodiment of the disclosure.

FIG. 7 is a diagram illustrating a conflict between a cutout of an UDC (under-display camera) and an icon when a display of an electronic device according to an embodiment of the disclosure.

Figure 8:
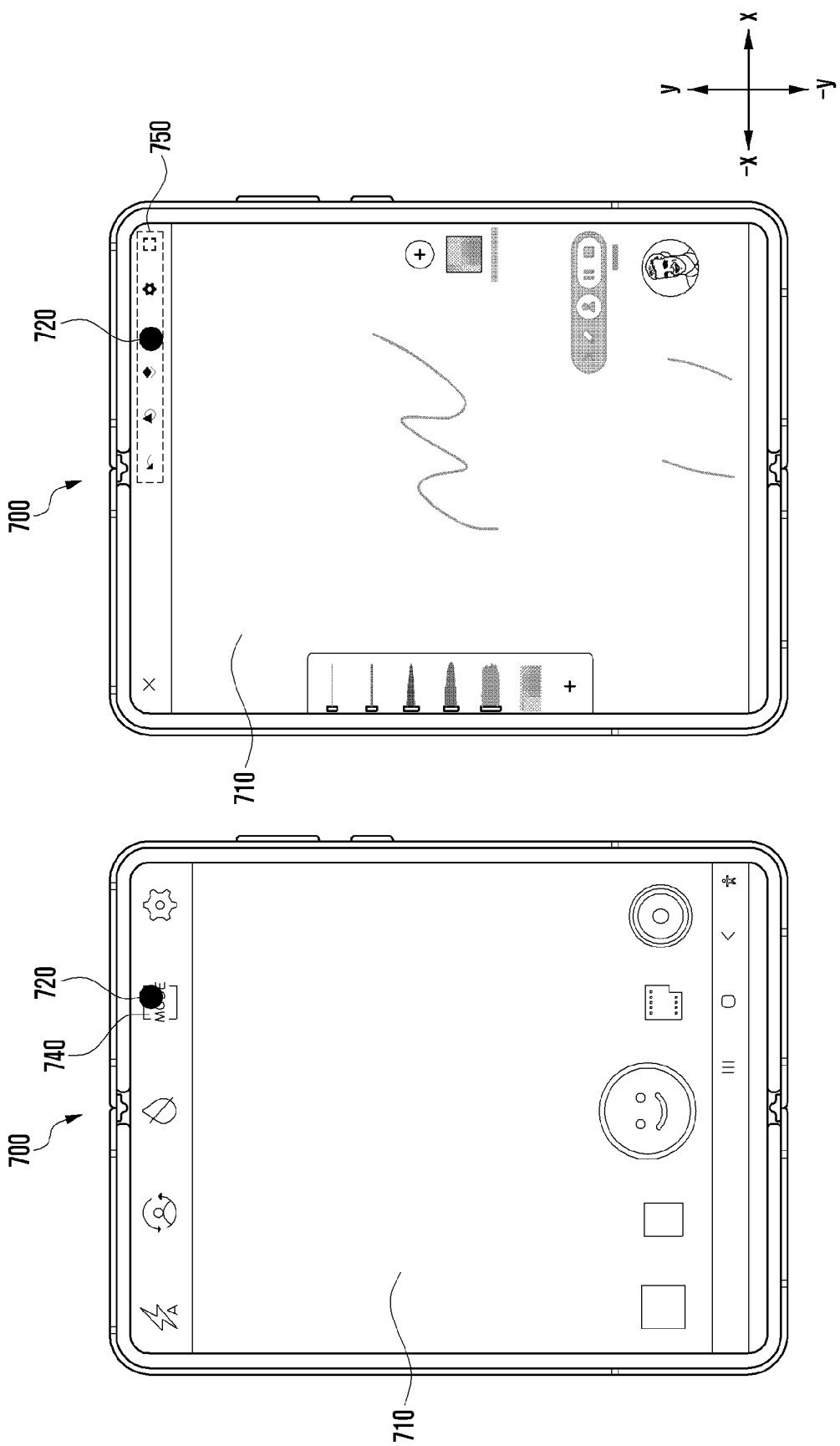
FIG. 8 is a diagram illustrating a conflict between a cutout of a UDC (under-display camera) and an icon when a camera of an electronic device according to an embodiment of the disclosure.

FIG. 8 is a diagram illustrating a conflict between a cutout of an UDC (under-display camera) and an icon when a camera of an electronic device according to an embodiment of the disclosure.

Referring to FIGS. 7 and 8, an electronic device 700 according to a comparative example may include a display 710 and a camera module (e.g., the camera module 510 in FIG. 5) disposed under (e.g., below) the display 710. For example, the camera module (e.g., the camera module 510 in FIG. 5) may be disposed in an under-display camera (UDC) type. A cutout 720 of the camera module (e.g., the camera module 510 in FIG. 5) may be formed, and an image may be displayed on the cutout 720 as well. For example, the cutout 720 of the camera module (e.g., the camera module 510 in FIG. 5) may conflict with (e.g., may be displayed to overlap) at least some of the icons 730 (e.g., objects, state information, and function menus) of applications driven in the electronic device. Since the cutout 720 of the camera module (e.g., the camera module 510 in FIG. 5) overlaps at least some of the icons 730, some of the icons 730 may be hidden or selection of the icons may be interfered, so there is a demand to avoid the cutout 720 and the icons 730.

In addition, when the camera module (e.g., the camera module 510 in FIG. 5) of the electronic device 700 is driven, the cutout 720 may conflict with a user interface 740 (e.g., objects, state information, and function menus) of a camera application. For example, the cutout 720 may conflict with (e.g., may be displayed to overlap) all or part of the user interface 740 in a camera application (e.g., a third-party camera application) operating the camera module (e.g., the camera module 510 in FIG. 5), so there is a demand to avoid the cutout 720 and the user interface 740. In addition, since all or part of the function menu 750 of an application may conflict with (e.g., may be displayed to overlap) the cutout 720, there is a demand to avoid the cutout 720 and the function menu 750 of the user interface.

Figure 9:
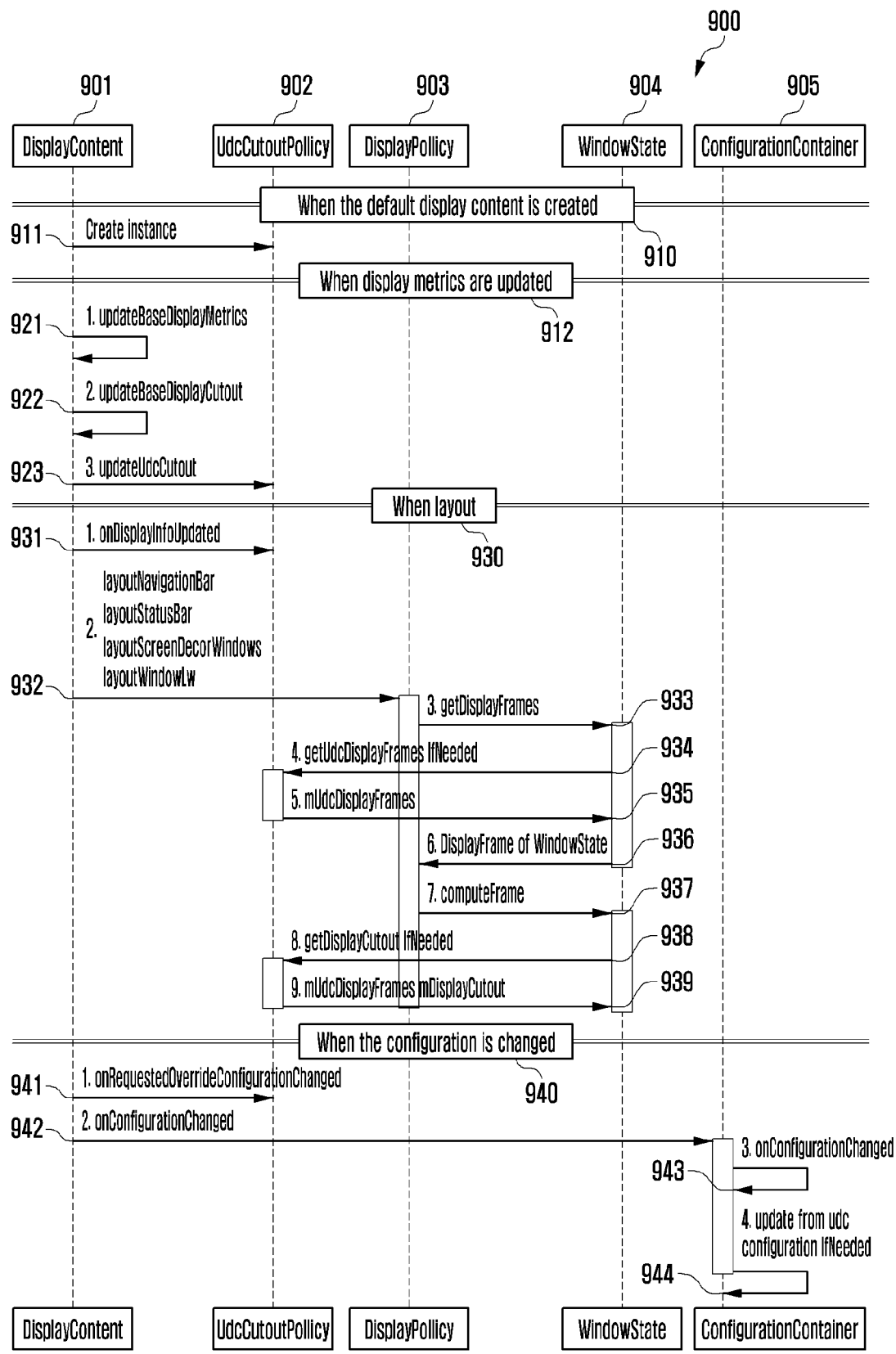
FIG. 9 is a diagram illustrating an electronic device and a method of operating the same according to an embodiment of the disclosure.

FIG. 9 is a diagram illustrating an electronic device and a method of operating the same according to an embodiment of the disclosure.

Referring to FIG. 9, an electronic device 900 according to various embodiments of the disclosure may include a display content controller 901, a UDC cutout policy controller 902, and a display policy controller 903, a window state controller 904, and a configuration container controller 905. At least some of the elements illustrated in FIG. 9 may be changed depending on a platform included in the electronic device 900 based on an embodiment. According to an embodiment, the display content controller 901, the UDC cutout policy controller 902, the display policy controller 903, the window state controller 904, and the configuration container controller 905 may be included in a processor (e.g., the processor 120 in FIG. 1).

The display content controller 901 may abstract the form of a physical display into a logical display.

The UDC cutout policy controller 902 may produce a UDC cutout. The UDC cutout policy controller 902 may enable avoidance of a UDC cutout when the display policy controller 903 lays out an application.

The display policy controller 903 may lay out respective windows of one or more applications displayed on a logical display.

The window state controller 904 may abstract the window of the application to be displayed on the screen.

The configuration container controller 905 may configure the area of the application.

In another embodiment, the electronic device 900 according to various embodiments of the disclosure may operate to avoid a conflict between a UDC cutout and an object of an application (e.g., an icon and/or a user interface).

In operation 910, the processor (e.g., the processor 120 in FIG. 1) may identify that there is content to be output through the display (e.g., the display 410 in FIG. 4 or the display 501 in FIG. 5).

In operation 911, the display content controller 901 may produce an instance for a cutout (e.g., the cutout 720 in FIGS. 7 and 8) of the UDC using the UDC cutout policy controller 902.

In operation 912, the processor (e.g., the processor 120 in FIG. 1) may update display metrics information (e.g., display cutout information) and the cutout of the UDC.

In an embodiment, in operation 912, operations 921, 922, and 923 may be performed. For example, the display cutout and the UDC cutout may be distinguished to be displayed.

For example, as the shape of the display (e.g., the display 410 in FIG. 4 or the display 501 in FIG. 5) of the electronic device 900 is changed, the processor (e.g., the processor 120 in FIG. 1) may receive changed display metrics information. If the electronic device 900 switches from a folded state to a flat state or from a flat state to a folded state, the size and cutout of the display (e.g., the display 410 in FIG. 4 or the display 501 in FIG. 5) may be changed, so that the changed display metrics information may be received.

In operation 921, the processor (e.g., the processor 120 in FIG. 1) may update the size and shape (e.g., a folded state, a flat state, a landscape mode, and a portrait mode) of the display (e.g., the display 410 in FIG. 4 or the display 501 in FIG. 5), based on the display metrics information. For example, the display content controller 901 may update the size and shape (e.g., a folded state, a flat state, a landscape mode, and a portrait mode) of the display (e.g., the display 410 in FIG. 4 or the display 501 in FIG. 5), based on the display metrics information.

In operation 922, the processor (e.g., the processor 120 in FIG. 1) may update the cutout on the display (e.g., the display 410 in FIG. 4 or the display 501 in FIG. 5), based on the display metrics information. For example, the display content controller 901 may update the cutout on the display (e.g., the display 410 in FIG. 4 or the display 501 in FIG. 5), based on the display metrics information.

In operation 923, the processor (e.g., the processor 120 in FIG. 1) may produce a cutout (e.g., the cutout 720 in FIGS. 7 and 8) of the UDC.

Figure 13:
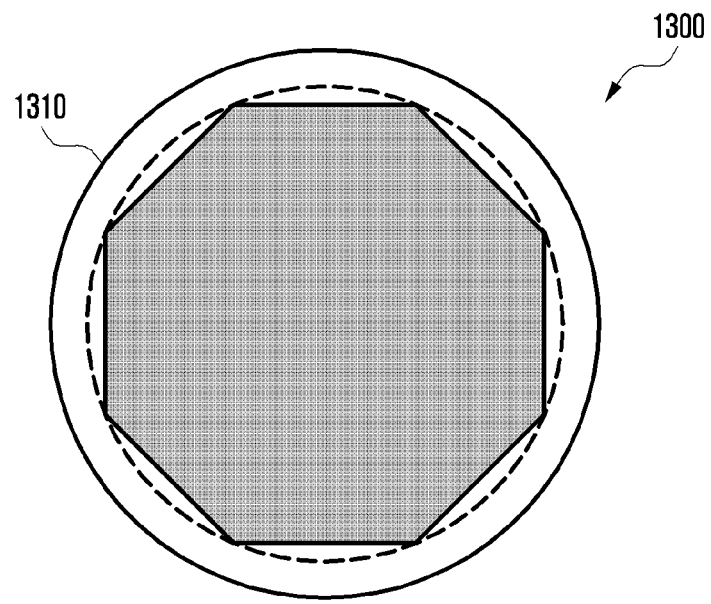
FIG. 13 is a diagram illustrating a UDC cutout based on display metrics information according to an embodiment of the disclosure.

Referring to FIG. 13, a cutout 1310 of the UDC may be produce based on the arrangement of the camera module 1300. The cutout 1310 of the UDC may be updated depending on the shape of the electronic device 900. For example, the display content controller 901 may produce a cutout (e.g., the cutout 720 in FIGS. 7 and 8) of the UDC. It may indicate the position of a physical camera hole on the display. It may indicate the position of a cutout (e.g., the cutout 720 in FIGS. 7 and 8) of the UDC with respect to the under-display camera.

In an embodiment, the processor (e.g., the processor 120 in FIG. 1) may convert information on the physical camera hole into information on the logical camera hole (e.g., the position or size). A method of representing information on the logical camera hole may vary depending on a platform included in the electronic device 900. For example, the Android platform may represent the information on the logical camera hole as vector information (e.g., a vector path). The processor (e.g., the processor 120 in FIG. 1) may produce information on the logical camera hole as a software object. The form of the object may vary depending on a platform included in the electronic device 900. For example, the Android platform may produce a cutout object.

In operation 930, the processor (e.g., the processor 120 in FIG. 1) may lay out the application on the display (e.g., the display 410 in FIG. 4 or the display 501 in FIG. 5). For example, the processor (e.g., the processor 120 in FIG. 1) may lay out the application by arranging a status bar and a navigation bar of the application.

In operation 931, the processor (e.g., the processor 120 in FIG. 1 or the display content controller 901) may update display information, based on metrics information.

In operation 932, the processor (e.g., the processor 120 in FIG. 1) may update the screen, based on display metrics information. The screen of the application may be updated according to a change in the size of the display (e.g., the display 410 in FIG. 4 or the display 501 in FIG. 5) and the position of the camera hole. When the size of the display (e.g., the display 410 in FIG. 4 or the display 501 in FIG. 5) is changed, the layout of the application may be updated according to the changed size of the display (e.g., the display 410 in FIG. 4 or the display 501 in FIG. 5). For example, the processor (e.g., the processor 120 in FIG. 1) may update the layout of a navigation bar of the application, based on the metrics information. The processor (e.g., the processor 120 in FIG. 1) may update the layout of a status bar of the application, based on the metrics information. For example, the display content controller 901 may update the layout of a navigation bar, the layout of a status bar, and the layout of screen decor windows.

In operation 933, the processor (e.g., the processor 120 in FIG. 1) may obtain a display frame. For example, the display policy controller 903 may obtain a display frame.

In operation 934, the processor (e.g., the processor 120 in FIG. 1) may change the display frame when it is necessary to avoid the cutout (e.g., the cutout 720 in FIGS. 7 and 8) of the UDC. For example, the window state controller 904 may change the display frame when it is necessary to avoid the cutout (e.g., the cutout 720 in FIGS. 7 and 8) of the UDC.

In operation 935, the processor (e.g., the processor 120 in FIG. 1) may change the UDC display frame. For example, the UDC cutout policy controller 902 may change the UDC display frame.

In operation 936, the processor (e.g., the processor 120 in FIG. 1) may change the display frame. For example, the window state controller 904 may change the display frame.

In operation 937, the processor (e.g., the processor 120 in FIG. 1) may produce a display frame. For example, the display policy controller 903 may produce a display frame.

In operation 938, the processor (e.g., the processor 120 in FIG. 1) may obtain display cutout information according to the production of the display frame. For example, the UDC cutout policy controller 902 may obtain display frame information from the window state controller 904, based on operation 937.

In operation 939, the processor (e.g., the processor 120 in FIG. 1) may produce a cutout (e.g., the cutout 720 in FIGS. 7 and 8) of the UDC according to the production of the display frame. For example, the UDC cutout policy controller 902 may produce a cutout (e.g., the cutout 720 in FIGS. 7 and 8) of the UDC according to the production of the display frame.

In operation 940, the processor (e.g., the processor 120 in FIG. 1) may change the layout of the application to avoid the cutout (e.g., the cutout 720 in FIGS. 7 and 8).

In operation 941, the processor (e.g., the processor 120 in FIG. 1) may change the size and/or position of the application in order to avoid the cutout (e.g., the cutout 720 in FIGS. 7 and 8). For example, the UDC cutout policy controller 902 may change the size and/or position of the application to avoid the cutout (e.g., the cutout 720 in FIGS. 7 and 8).

In operation 942, if it is necessary to change the size and/or position of the application, the display content controller 901 may transmit a command (onConfigurationChanged) for changing the size and/or position of the application to the configuration container controller 905.

In operation 943, the configuration container controller 905 may change the size and/or position of the application.

In operation 944, if it is necessary to change the size and/or position of the application, the configuration container controller 905 may change the size and/or position of the application in order to avoid the cutout (e.g., the cutout 720 in FIGS. 7 and 8) of the UDC. For example, operations 943 and 944 may be sequentially performed. The disclosure is not limited thereto, and operations 943 and 944 may be performed together.

Figure 10:
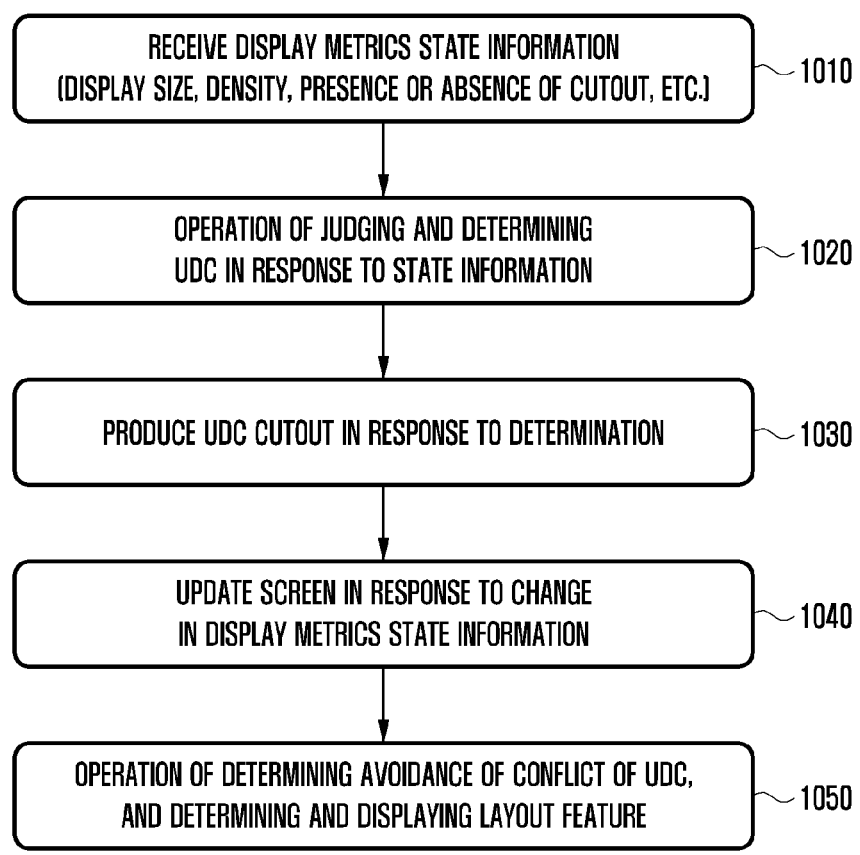
FIG. 10 is a diagram illustrating a method of operating an electronic device according to an embodiment of the disclosure.

FIG. 10 is a diagram illustrating a method of operating an electronic device according to an embodiment of the disclosure.

Referring to FIG. 10, display metrics information may be stored in a memory (e.g., the memory 130 in FIG. 1) of an electronic device (e.g., the electronic device 101 in FIG. 1, the electronic device 200 in FIGS. 2A and 2B, the electronic device 300 in FIGS. 3A and 3B. or the electronic device 900 in FIG. 9) according to various embodiments of the disclosure. For example, the display metrics information may include information on the size of a display (e.g., the display 410 in FIG. 4 or the display 501 in FIG. 5), the density of pixels, and/or the presence or absence of a cutout.

In operation 1010, the processor (e.g., the processor 120 in FIG. 1) may receive the display metrics information stored in the memory (e.g., the memory 130 in FIG. 1).

In operation 1020, the processor (e.g., the processor 120 in FIG. 1) may determine whether or not there is a UDC (e.g., the camera module 510 in FIG. 5) under the display (e.g., the display 410 in FIG. 4 or the display 501 in FIG. 5), based on the display metrics information, and perform an operation according to the presence of the UDC.

In operation 1030, if the processor (e.g., the processor 120 in FIG. 1) determines that there is a UDC, the processor (e.g., the processor 120 in FIG. 1) may produce a cutout (e.g., the cutout 720 in FIGS. 7 and 8) of the UDC. The screen may be updated based on a change in the display metrics information.

For example, the change in the display metrics information may include a change in the screen display mode of a bar type electronic device (e.g., the electronic device 200 in FIGS. 2A and 2B) from a landscape mode to a portrait mode. For example, the change in the display metrics information may include a change in the screen display mode of a bar type electronic device (e.g., the electronic device 200 in FIGS. 2A and 2B) from a portrait mode to a landscape mode. For example, the change in the display metrics information may include a change of a foldable electronic device (e.g., the electronic device in FIGS. 3A and 3B) from a first state (e.g., a flat state or an open state) to a second state (e.g., a folded state or a closed state). For example, the change in the display metrics information may include a change of a foldable electronic device (e.g., the electronic device in FIGS. 3A and 3B) from a second state (e.g., a folded state or a closed state) to a first state (e.g., a flat state or an open state).

In an embodiment, since the UDC type display does not have a camera hole, the UDC may be invisible when the display is viewed from the outside. The processor (e.g., the processor 120 in FIG. 1) may produce a virtual cutout (e.g., the cutout 720 in FIGS. 7 and 8) that does not physically exist.

In operation 1040, the processor (e.g., the processor 120 in FIG. 1) may update a screen displayed on the display (e.g., the display 410 in FIG. 4 or the display 501 in FIG. 5), based on the display metrics information and the cutout (e.g., the cutout 720 in FIGS. 7 and 8).

In operation 1050, the processor (e.g., the processor 120 in FIG. 1) may perform a conflict avoidance operation for the cutout (e.g., the cutout 720 in FIGS. 7 and 8) of the UDC. For example, the processor (e.g., the processor 120 in FIG. 1) may perform a conflict avoidance operation to prevent icons (e.g., the icons 730 in FIG. 7 and/or a user interface (e.g., the user interface 740 in FIG. 8), or the function menu 750 of the application) of an application displayed on the screen from conflicting with the cutout (e.g., the cutout 720 in FIGS. 7 and 8) of the UDC.

Figure 11A:
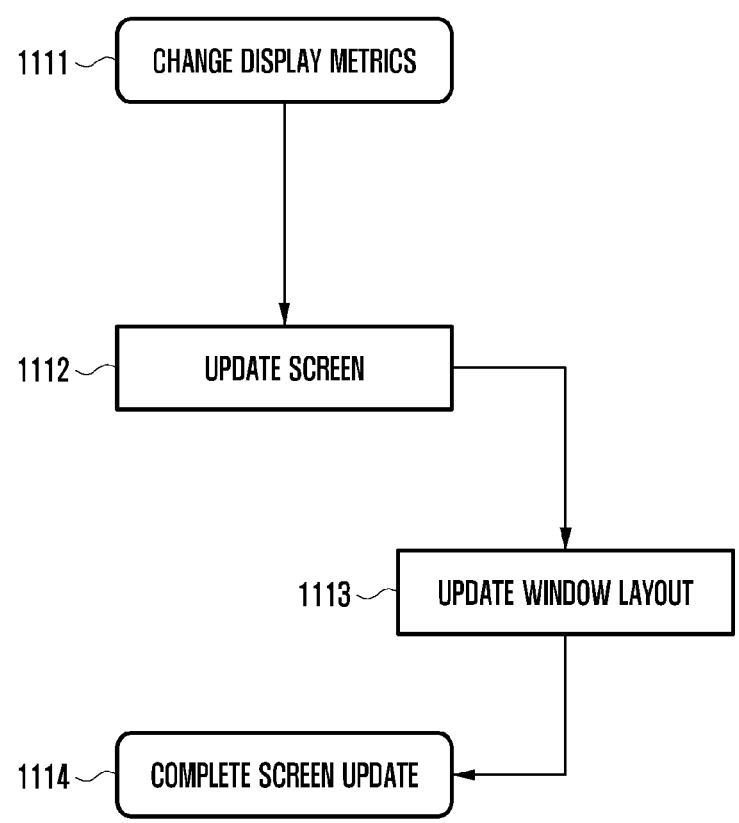
FIG. 11A is a diagram illustrating a method of operating an electronic device in the case where avoidance of a UDC is not applied to an electronic device according to an embodiment of the disclosure.

FIG. 11A is a diagram illustrating an operation method in the case where avoidance of a UDC is not applied to an electronic device according to an embodiment of the disclosure.

Referring to FIG. 11A, in operation 1111, a processor (e.g., the processor 120 in FIG. 1) may receive display metrics information. In addition, the processor (e.g., the processor 120 in FIG. 1) may receive a change in the display metrics information. For example, the processor (e.g., the processor 120 in FIG. 1) may receive information on whether the state of a display (e.g., the display 410 in FIG. 4 or the display 501 in FIG. 5) has been changed.

In operation 1112, the processor (e.g., the processor 120 in FIG. 1) may update a screen displayed on the display (e.g., the display 410 in FIG. 4 or the display 501 in FIG. 5) according to a change in the state of the display (e.g., the display 410 in FIG. 4 or the display 501 in FIG. 5).

In operation 1113, the processor (e.g., the processor 120 in FIG. 1) may update the window layout of one or more applications according to the screen update. For example, the size and position of a window of each application may be updated according to the screen update.

In operation 1114, updating of the screen displayed on the display (e.g., the display 410 in FIG. 4 or the display 501 in FIG. 5) may be completed.

Figure 11B:
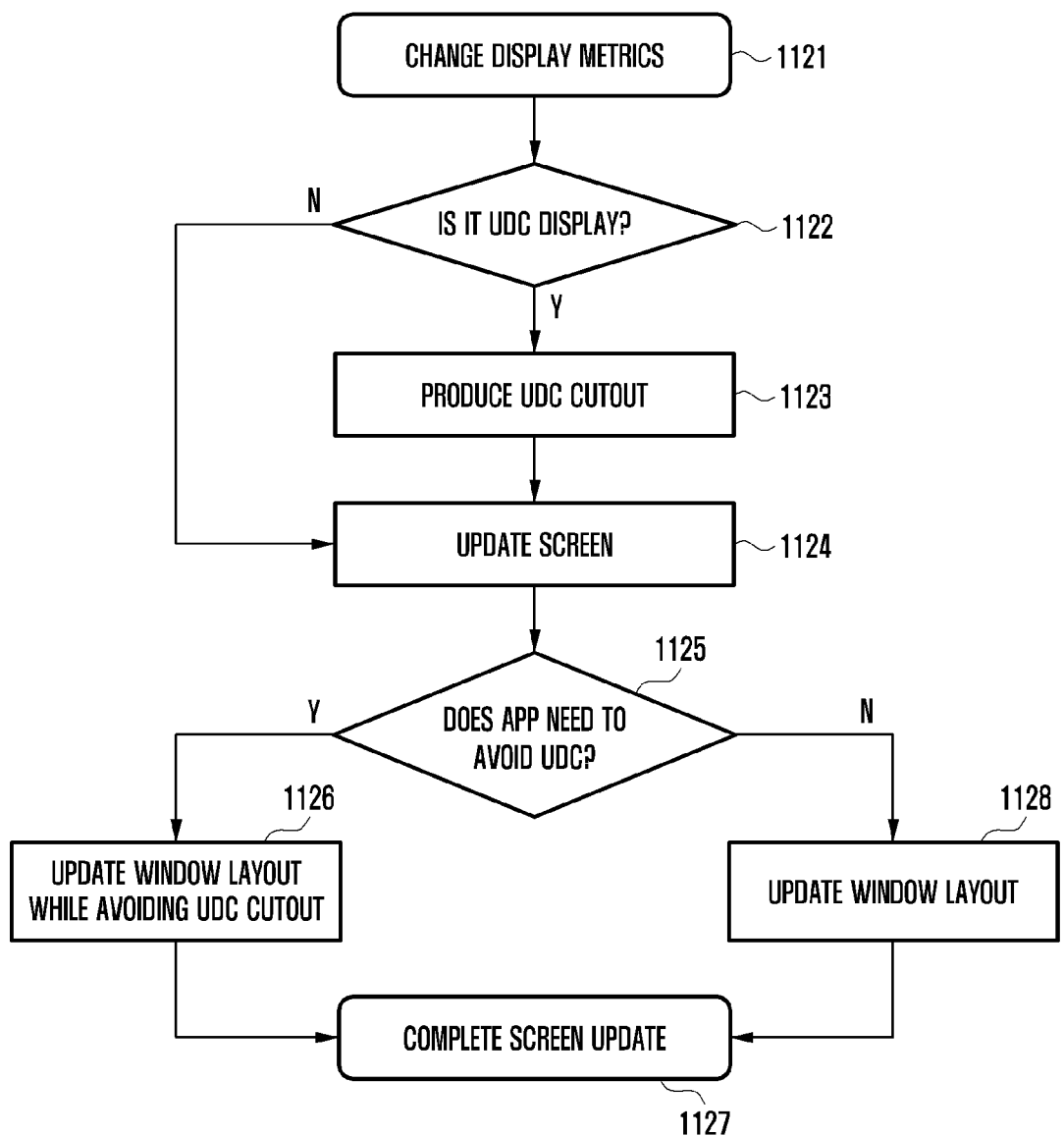
FIG. 11B is a diagram illustrating a method of operating an electronic device in the case where avoidance of a UDC is applied to an electronic device according to an embodiment of the disclosure.

FIG. 11B is a diagram illustrating an operation method in the case where avoidance of a UDC is applied to an electronic device according to an embodiment of the disclosure.

Figure 12:
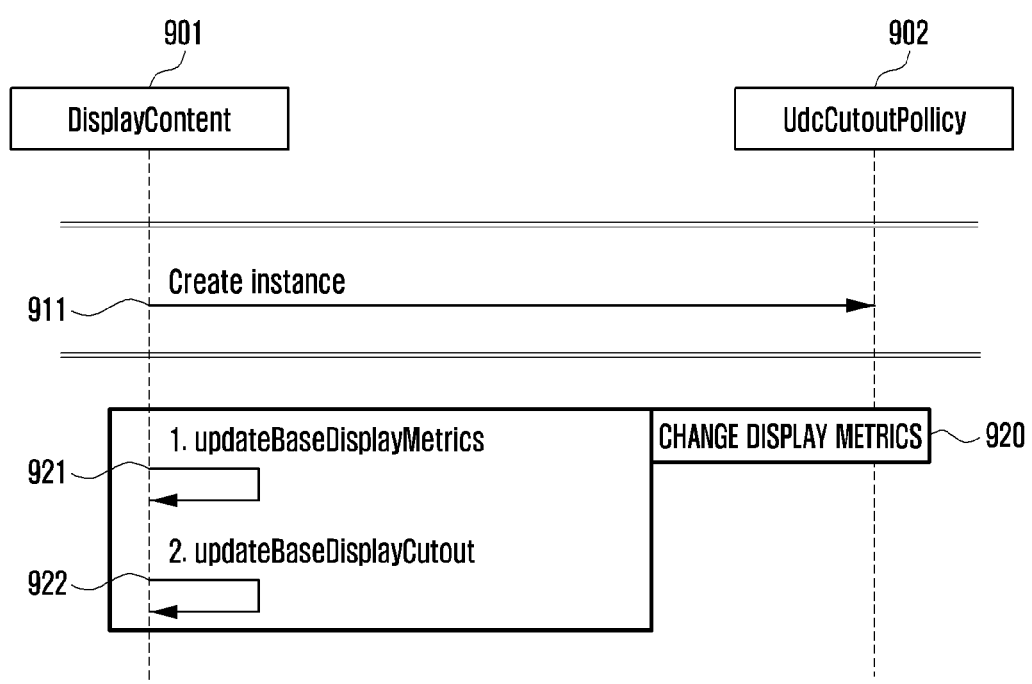
FIG. 12 is a diagram illustrating an operation of receiving display metrics state information according to an embodiment of the disclosure.

FIG. 12 is a diagram illustrating an operation of receiving display metrics state information according to an embodiment of the disclosure.

FIG. 13 is a diagram illustrating a UDC cutout based on display metrics information according to an embodiment of the disclosure.

Referring to FIG. 12, a description of the same content as that in FIG. 9 may be omitted. For example, the display content controller 901 and the UDC cutout policy controller 902 in FIG. 12 may be the same as the display content controller 901 and the UDC cutout policy controller 902 in FIG. 9. In addition, operation 911, operation 921, and operation 922 may be the same as operation 911, operation 921, and operation 922 in FIG. 9. In an embodiment, operation 920 in FIG. 12 is related to operations 921 and 922 and may be intended to process display metrics information. For example, in operation 920, the processor (e.g., the processor 120 in FIG. 1) may update display metrics information.

Referring to FIGS. 11B, 12, and 13, in operation 1121 (e.g., the operation 912 in FIG. 9), the processor (e.g., the processor 120 in FIG. 1) may receive display metrics information. In addition, the processor (e.g., the processor 120 in FIG. 1) may receive a change in the display metrics information. For example, the processor (e.g., the processor 120 in FIG. 1) may receive information on whether or not the state of a display (e.g., the display 410 in FIG. 4 or the display 501 in FIG. 5) has been changed.

In operation 1122, the processor (e.g., the processor 120 in FIG. 1) may determine whether or not there is a UDC (e.g., the camera module 510 in FIG. 5), based on the display metrics information.

For example, as a result of the determination in operation 1122, if the display is not a UDC display, a screen may be updated in operation 1124 regardless of the UDC. As a result of the determination in operation 1122, if the display is a UDC display, operation 1123 may be performed.

In an embodiment, if there is a UDC (e.g., the camera module 510 in FIG. 5), based on the display metrics information, the processor (e.g., the processor 120 in FIG. 1), in operation 1123, may produce a cutout (e.g., the cutout 720 in FIGS. 7 and 8) of a UDC (e.g., the camera module 510 in FIG. 5), based on the display metrics information. For example, as shown in FIGS. 13 and 14, the processor (e.g., the processor 120 in FIG. 1) may produce a cutout (e.g., the cutout 720 in FIGS. 7 and 8) of the UDC.

Figure 14:
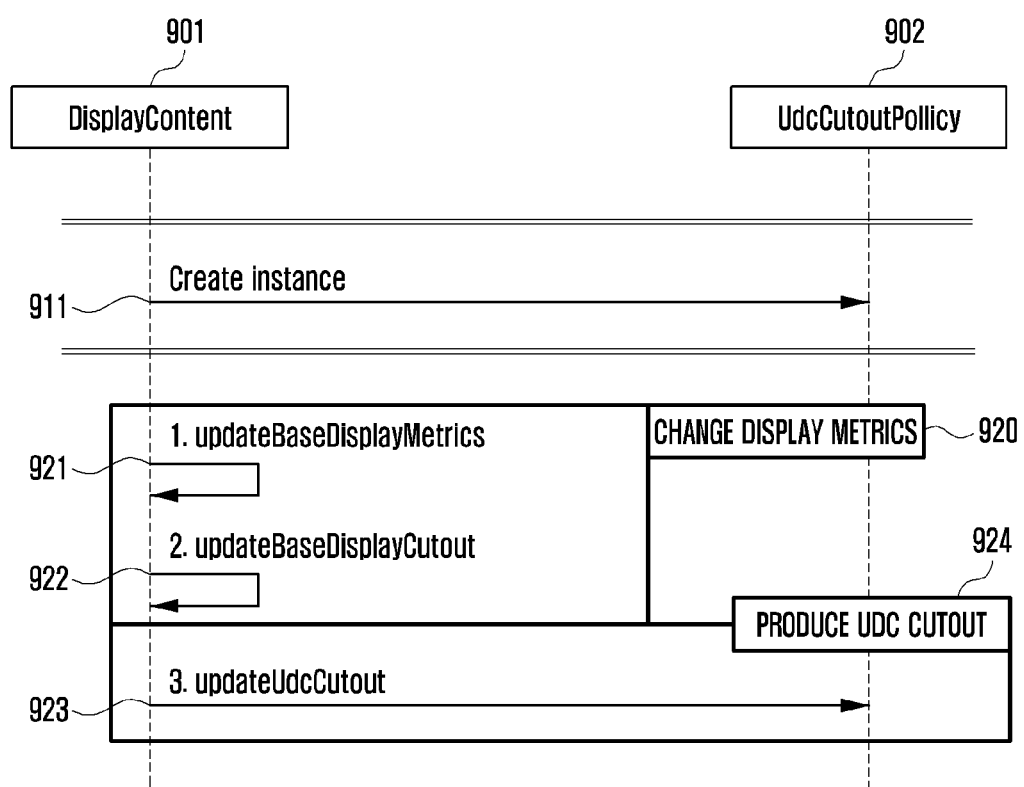
FIG. 14 is a diagram illustrating production of a cutout for a UDC when it is determined that a UDC exists according to an embodiment of the disclosure.

FIG. 14 is a diagram illustrating production of a cutout for a UDC when it is determined that a UDC exists according to an embodiment of the disclosure.

Referring to FIG. 14, in operation 924, a cutout 1310 of the UDC may be produced based on the arrangement of the camera module 1300. The cutout 1310 of the UDC may be updated depending on the shape of the electronic device 900.

In an embodiment, the cutout of the UDC may be configured (produced, or updated) in various forms. For example, the cutout 1310 of the UDC is not limited to the embodiment illustrated in FIG. 13, and the cutout 1310 of the UDC may be configured in a circular shape or a polygonal shape. In addition, the cutout of the UDC may be configured asymmetrically with respect to a lens of the camera module. For example, based on the optical axis (not shown) of the lens, the cutout of the UDC on the left and the cutout of the UDC on the right may be configured to have different shapes. The disclosure is not limited thereto, and the shapes thereof on the upper side and the lower side may be differently configured.

According to another embodiment, in the case where a plurality of camera modules is provided, the cutout 1310 of the UDC may be configured to correspond to the respective camera modules. For example, a cutout of a first UDC corresponding to a first camera module and a cutout of a second UDC corresponding to a second camera module may be configured. In an embodiment, a conflict avoidance operation (e.g., the operation 1050 in FIG. 10) may be performed for the cutout of the UDC between the cutout of the first UDC and the cutout of the second UDC.

In an embodiment, an area corresponding to the field of view (FOV) of a camera module (e.g., the camera module 205 in FIG. 2A, the camera module disposed in the sensor area 324 in FIG. 3A, or the camera module 510 in FIG. 5) may be configured as a cutout of the UDC. For example, the gray area shown in FIG. 13 may be configured as a cutout of the UDC, and the gray area may be configured to be greater than or equal to the field of view of the camera module.

Figure 15:
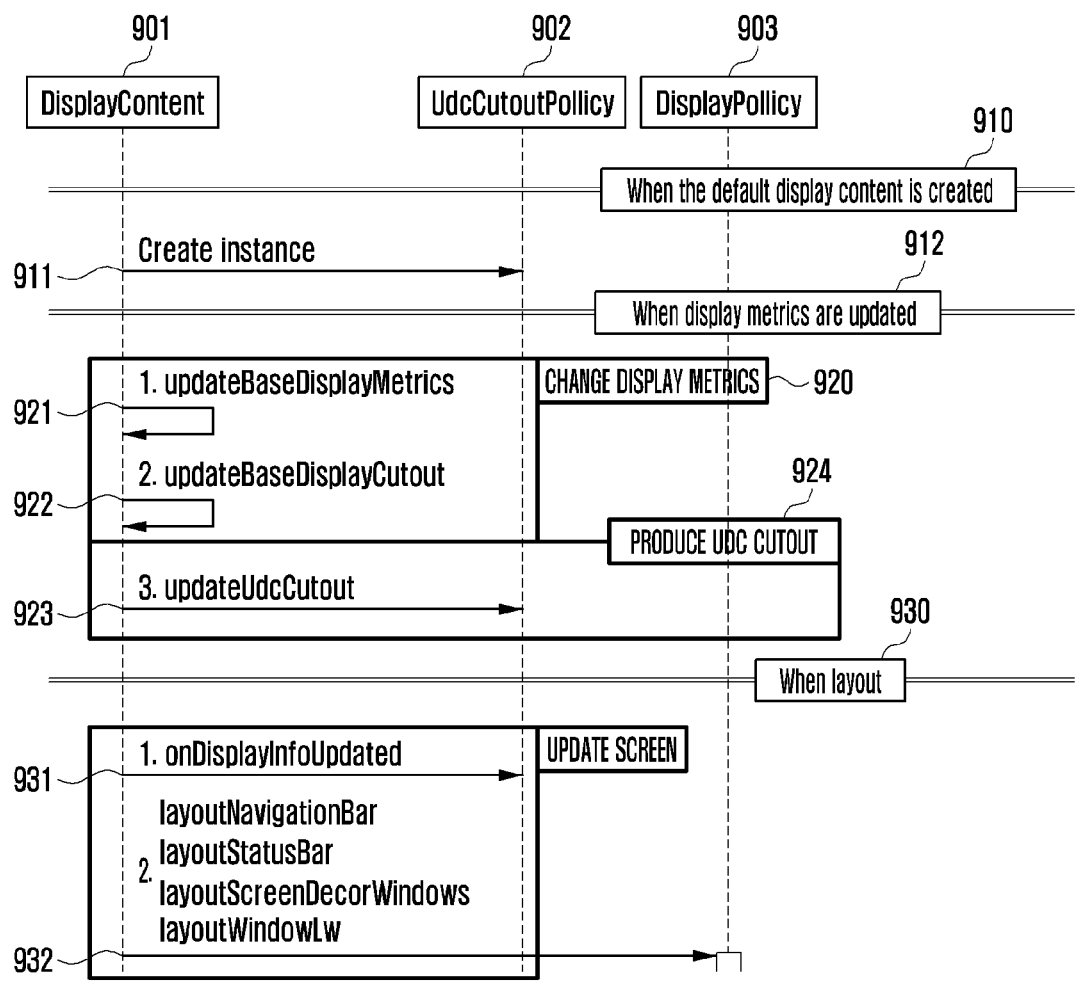
FIG. 15 is a diagram illustrating updating of a screen based on a change in display metrics information according to an embodiment of the disclosure.

FIG. 15 is a diagram illustrating updating of a screen based on a change in display metrics information according to an embodiment of the disclosure. In the description of FIG. 15, a description of the same content as that in FIG. 9 may be omitted.

Referring to FIGS. 11A and 15 together, in operation 1124, the processor (e.g., the processor 120 in FIG. 1) may update a screen displayed on a display (e.g., the display 410 in FIG. 4 or the display 501 in FIG. 5) according to a change in the state of the display (e.g., the display 410 in FIG. 4 or the display 501 in FIG. 5) and a cutout (e.g., the cutout 720 in FIGS. 7 and 8).

For example, the processor (e.g., the processor 120 in FIG. 1) may update the screen, based on display metrics information. The screen of an application may be updated according to a change in the size of the display (e.g., the display 410 in FIG. 4 or the display 501 in FIG. 5) and the position of a camera hole. The processor (e.g., the processor 120 in FIG. 1) may update the layout of a navigation bar of the application, based on the metrics information. The processor (e.g., the processor 120 in FIG. 1) may update the layout of a status bar of the application, based on the metrics information.

In operation 1125, the processor (e.g., the processor 120 in FIG. 1) may determine whether or not a running application needs to avoid a cutout (e.g., the cutout 720 in FIGS. 7 and 8). For example, the processor (e.g., the processor 120 in FIG. 1) may determine whether icons (e.g., the icons 730 in FIG. 7 and/or a user interface (e.g., the user interface 740 in FIG. 8)) of an application is allowed or is not allowed to conflict with a cutout (e.g., the cutout 720 in FIGS. 7 and 8) of the UDC.

As a result of the determination in operation 1125, if a conflict between the cutout (e.g., the cutout 720 in FIGS. 7 and 8) of the UDC and the icons (e.g., the icons 730 in FIG. 7 and/or the user interface (e.g., the user interface 740 in FIG. 8)) of the application is not allowed, in operation 1126, the processor (e.g., the processor 120 in FIG. 1) may update the window layout of the application to avoid the cutout (e.g., the cutout 720 in FIGS. 7 and 8) of the UDC.

For example, the window layout may be updated in operation 1126 and/or operation 1128. It is possible to determine the position of the window and the size of the window and dispose the same on the screen. For example, a notification bar may be arranged with 80 px at the top of the screen, a navigation bar may be arranged with 126 px at the bottom thereof, and the application may be arranged in the size of the remaining space of the screen.

On the other hand, as a result of the determination in operation 1125, if a conflict between the cutout (e.g., the cutout 720 in FIGS. 7 and 8) of the UDC and the icons (e.g., the icons 730 in FIG. 7 and/or the user interface (e.g., the user interface 740 in FIG. 8)) of the application is allowed, in operation 1128, the processor (e.g., the processor 120 in FIG. 1) may update the window layout of the application, regardless of the cutout (e.g., the cutout 720 in FIGS. 7 and 8) of the UDC.

Subsequently, in operation 1127, the processor (e.g., the processor 120 in FIG. 1) may complete the screen update.

Figure 16:
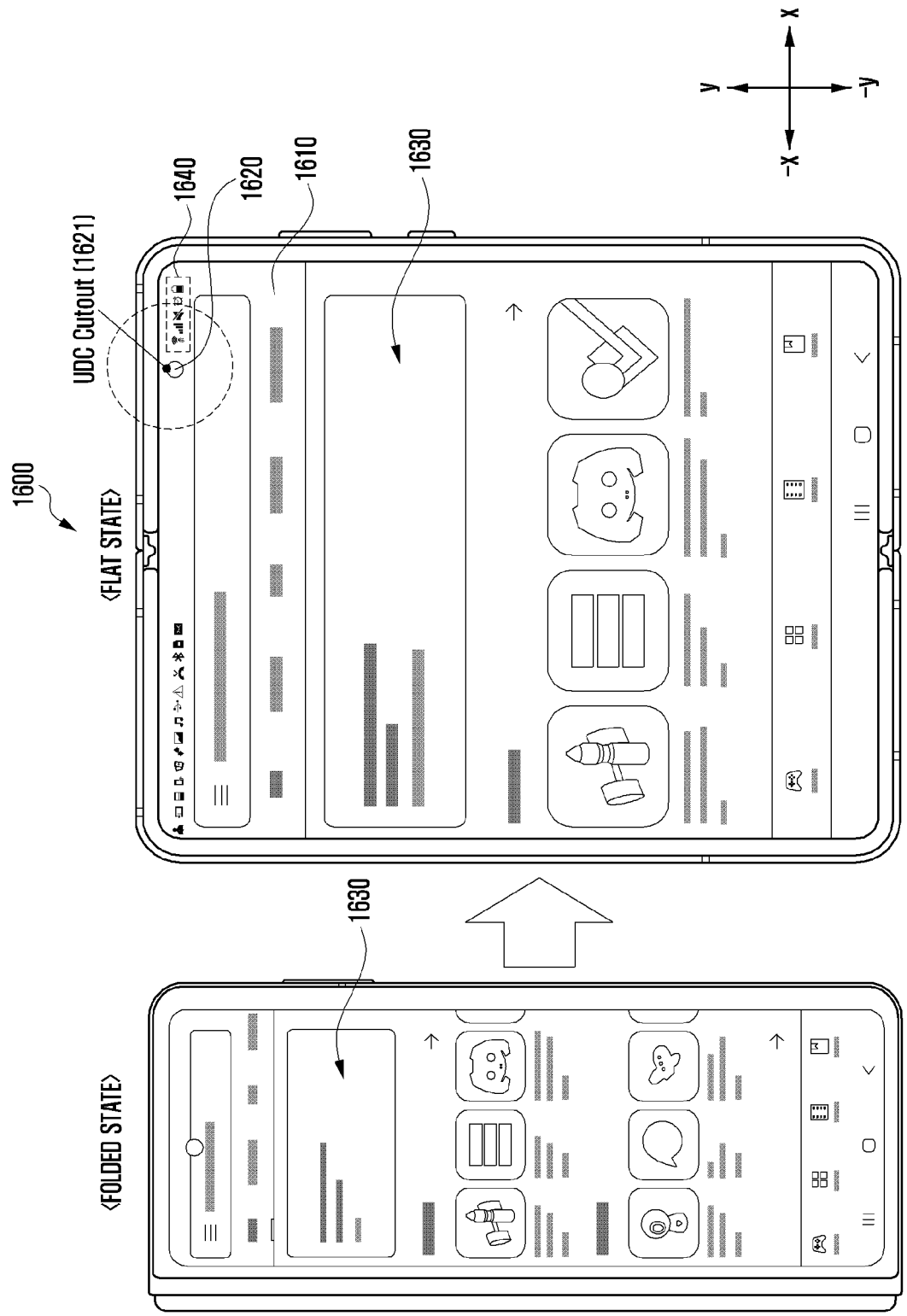
FIG. 16 is a diagram illustrating that the layout of an application is updated to avoid a cutout of a UDC according to an embodiment of the disclosure.

FIG. 16 is a diagram illustrating updating of the layout of an application to avoid a cutout of a UDC according to an embodiment of the disclosure.

Referring to FIG. 16, an electronic device 1600 according to various embodiments of the disclosure may include a display 1610 and a camera module (e.g., the camera module 510 in FIG. 5) disposed under (e.g., below) the display 1610.

In an embodiment, the electronic device 1600 may switch from a second state (e.g., a folded state or a closed state) to a first state (e.g., a flat state or an open state), so that the size of the display 1610 may change. As the size of the display 1610 changes, display metrics information may be changed. The processor (e.g., the processor 120 in FIG. 1) may configure the position where the camera module (e.g., the camera module 510 in FIG. 5) is disposed as a UDC 1620, based on the change in the display metrics information, and produce a cutout 1621 of the UDC 1620. The processor (e.g., the processor 120 in FIG. 1) may update the window of an application 1630 displayed on the display 1610 so as to avoid the cutout 1621 of the UDC 1620. For example, the processor (e.g., the processor 120 in FIG. 1) may update a screen by changing the coordinates of icons 1640 of the application 1630 such that the icons 1640 do not conflict with the cutout 1621 of the UDC 1620.

Figure 17:
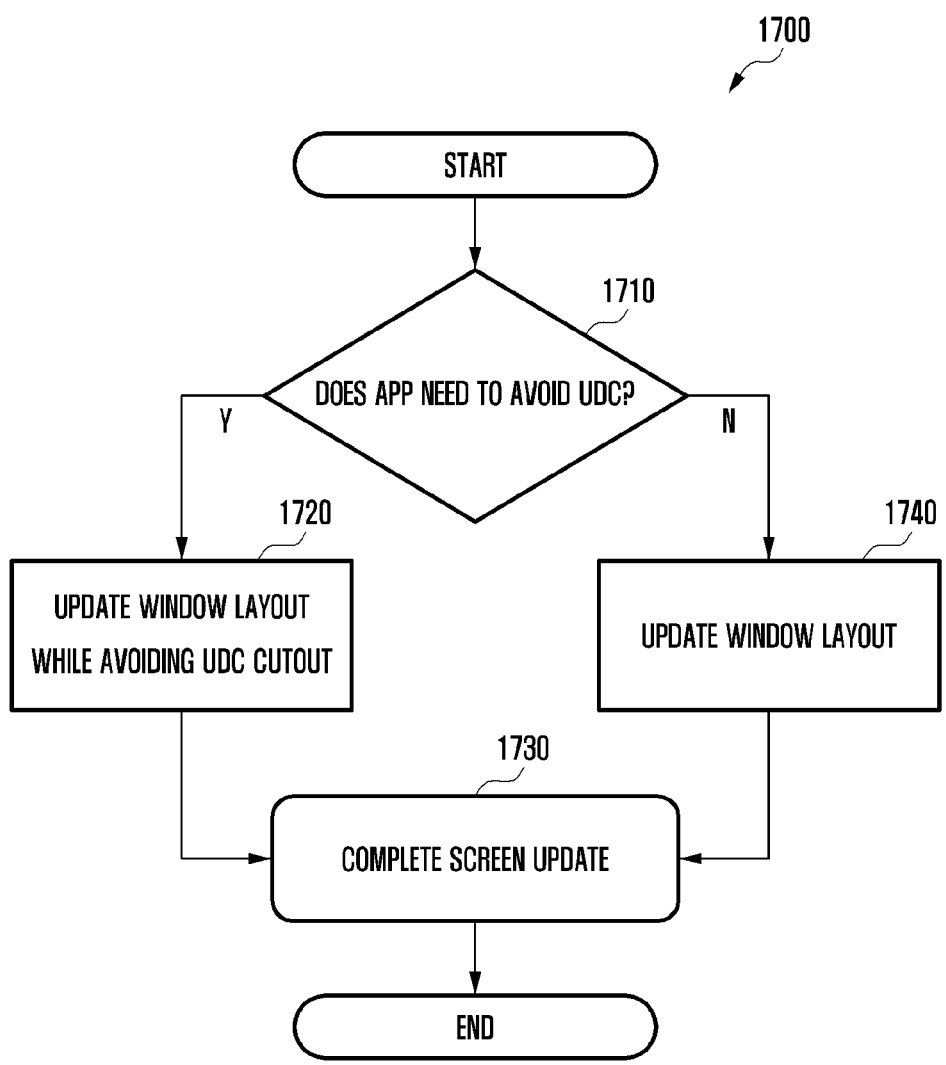
FIG. 17 is a diagram illustrating an operation method of determining avoidance of a cutout of a UDC and displaying a screen according to an embodiment of the disclosure.

FIG. 17 is a diagram 1700 illustrating an operation method of determining avoidance of a cutout of a UDC and displaying a screen according to an embodiment of the disclosure.

Referring to FIG. 17, in operation 1710, a processor (e.g., the processor 120 in FIG. 1) of an electronic device (e.g., the electronic device 101 in FIG. 1, the electronic device 200 in FIGS. 2A and 2B, or the electronic device 300 in FIGS. 3A and 3B) may determine whether or not an application to be executed needs to avoid a cutout (e.g., the cutout 1621 in FIG. 16) of a UDC (e.g., the UDC 1620 in FIG. 16).

In an embodiment, in the case where an application of the electronic device is configured to require avoidance of a cutout (e.g., the cutout 1621 in FIG. 16), the processor (e.g., the processor 120 in FIG. 1) may determine that the application to be executed needs to avoid a cutout (e.g., the cutout 1621 in FIG. 16).

In another embodiment, if an initial setting value of the electronic device (e.g., the electronic device 101 in FIG. 1, the electronic device 200 in FIGS. 2A and 2B, or the electronic device 300 in FIGS. 3A and 3B) is configured to indicate that avoidance of a cutout (e.g., the cutout 1621 in FIG. 16) is required, the processor (e.g., the processor 120 in FIG. 1) may determine that the application to be executed needs to avoid a cutout (e.g., the cutout 1621 in FIG. 16).

In an embodiment, if it is configured that avoidance of a cutout (e.g., the cutout 1621 in FIG. 16) is required by a user setting, the processor (e.g., the processor 120 in FIG. 1) may determine that the application to be executed needs to avoid a cutout (e.g., the cutout 1621 in FIG. 16).

In an embodiment, if a third-party application to be executed in an electronic device (e.g., the electronic device 101 in FIG. 1, the electronic device 200 in FIGS. 2A and 2B, or the electronic device 300 in FIGS. 3A and 3B) needs to avoid a cutout (e.g., the cutout 1621 in FIG. 16), the processor (e.g., the processor 120 in FIG. 1) may determine that the application to be executed needs to avoid a cutout (e.g., the cutout 1621 in FIG. 16).

As a result of the determination in operation 1710, if the processor (e.g., the processor 120 in FIG. 1) determines that the application needs to avoid of a cutout (e.g., the cutout 1621 in FIG. 16) of a UDC (e.g., the UDC 1620 in FIG. 16), in operation 1720, the processor (e.g., the processor 120 in FIG. 1) may update the layout of a window of the application so as to avoid the cutout (e.g., the cutout 1621 in FIG. 16) of the UDC 1620.

As a result of the determination in operation 1710, if the application does not need to avoid the cutout (e.g., the cutout 1621 in FIG. 16) of the UDC (e.g., the UDC 1620 in FIG. 16), in operation 1740, the processor (e.g., the processor 120 in FIG. 1) may update the layout of a window of the application, regardless of the cutout (e.g., the cutout 1621 in FIG. 16) of the UDC 1620.

Subsequently, in operation 1730, the processor (e.g., the processor 120 in FIG. 1) may complete the screen update.

Figure 18:
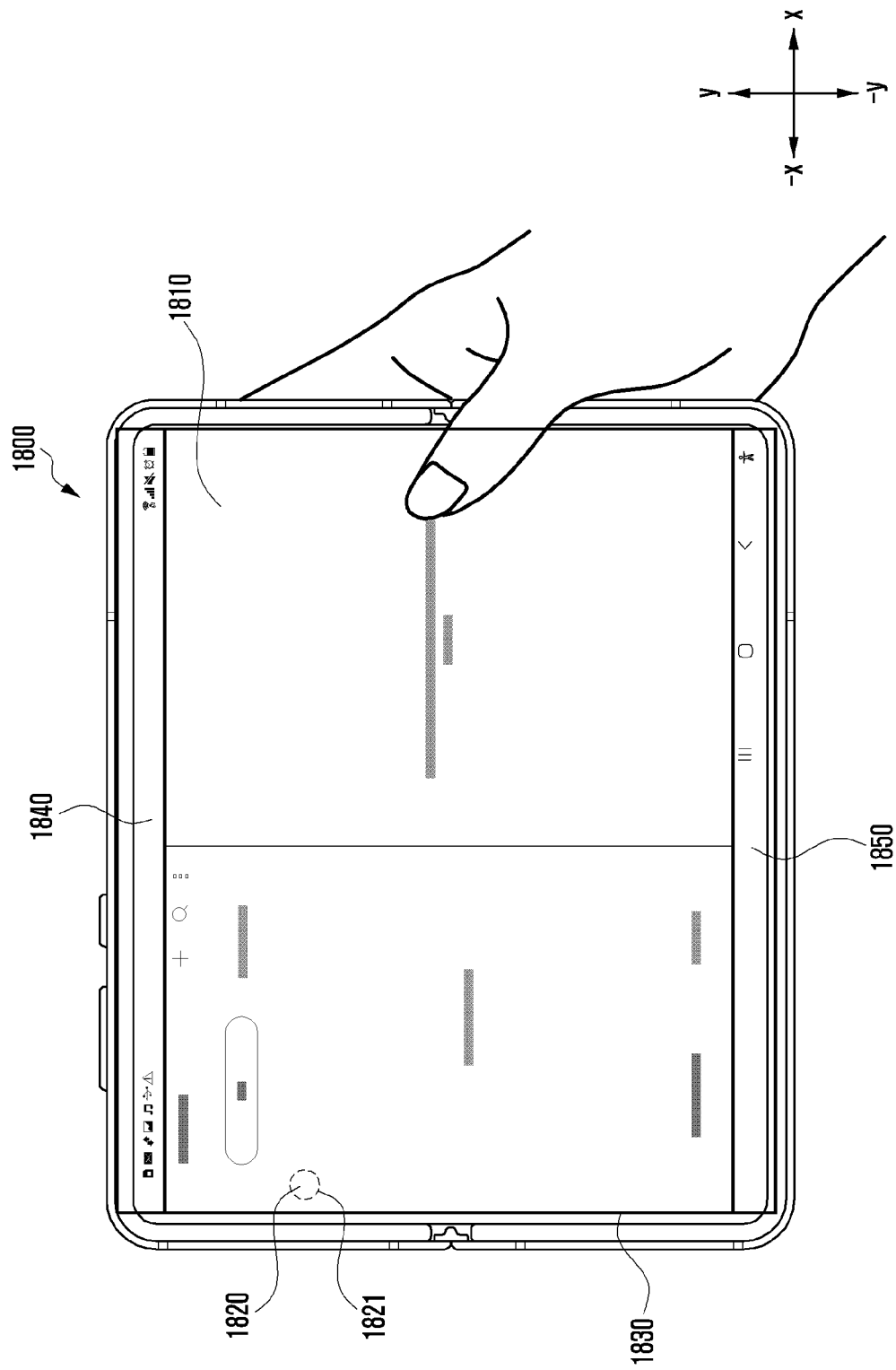
FIG. 18 is a diagram illustrating avoidance of a UDC cutout by applying padding to an application window according to an embodiment of the disclosure.

FIG. 18 is a diagram illustrating avoidance of a UDC cutout by applying padding to a window of an application according to an embodiment of the disclosure.

Referring to FIG. 18, an electronic device 1800 according to various embodiments of the disclosure may include a display 1810 and a camera module (e.g., the camera module 510 in FIG. 5) disposed under (e.g., below) the display 1810.

In an embodiment, the electronic device 1800 may switch from a second state (e.g., a folded state or a closed state) to a first state (e.g., a flat state or an open state), so that the size of the display 1810 may change. As the size of the display 1810 changes, display metrics information may be changed.

In another embodiment, if the electronic device 1800 switches from a landscape mode to a portrait mode or from a portrait mode to a landscape mode, the display metrics information may be changed.

The processor (e.g., the processor 120 in FIG. 1) may configure the position where the camera module (e.g., the camera module 510 in FIG. 5) is disposed as a UDC 1820, based on the change of the display metrics information, and produce a cutout 1821 of the UDC 1820. The processor (e.g., the processor 120 in FIG. 1) may update a window of an application 1830 displayed on the display 1810 so as to avoid the cutout 1821 of the UDC 1820.

In an embodiment, the application 1830 may lay out a status bar 1840 and a navigation bar 1850. For example, the application 1830 may lay out the status bar 1840 at the top of the display 1810 and lay out the navigation bar 1850 at the bottom thereof.

In an embodiment, the processor (e.g., the processor 120 in FIG. 1) may apply padding to the application 1830 such that the status bar 1840 and the navigation bar 1850 do not conflict with the cutout 1821 of the UDC 1820. For example, icons and/or a user interface may be displayed on the status bar 1840 and the navigation bar 1850, and padding may be given to the application 1830 such that the icons and/or the user interface of the application 1830 does not conflict with the cutout 1821. For example, the distance between the icons and/or the objects displayed on the user interface may be increased in the status bar 1840 and the navigation bar 1850.

In an embodiment, the UDC 1820 may also be positioned in the areas of the status bar 1840 and/or navigation bar 1850. In the case where the UDC 1820 is positioned in the areas of the status bar 1840 and/or navigation bar 1850, the cutout 1821 of the UDC 1820 may also be produced in the areas of the status bar 1840 and/or navigation bar 1850.

Figure 19:
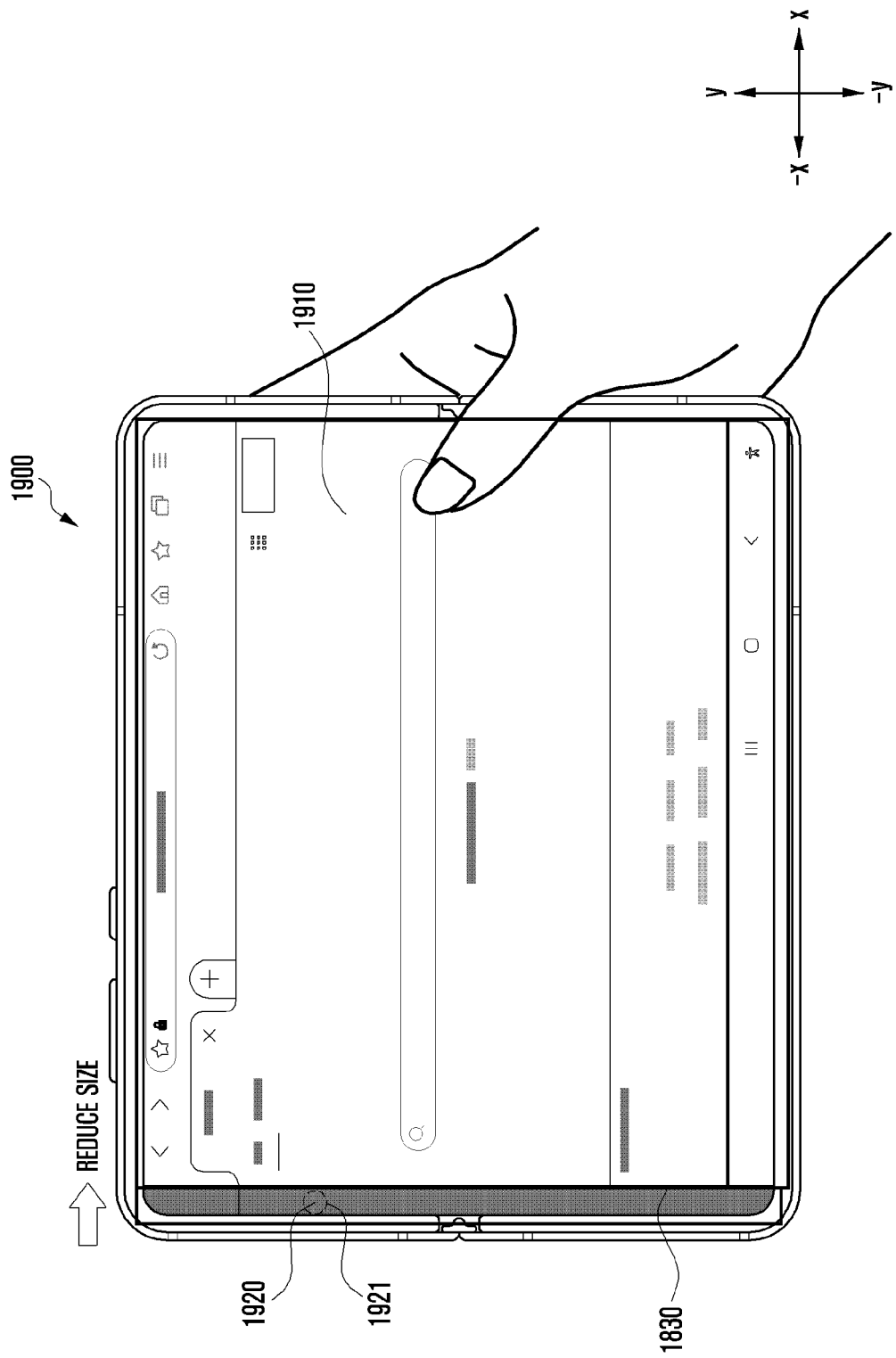
FIG. 19 is a diagram illustrating avoidance of a UDC cutout by reducing the window size of an application according to an embodiment of the disclosure.

FIG. 19 is a diagram illustrating avoidance of a UDC cutout by reducing a window size of an application according to an embodiment of the disclosure.

Referring to FIG. 19, an electronic device 1900 according to various embodiments of the disclosure may include a display 1910 and a camera module (e.g., the camera module 510 in FIG. 5) disposed under (e.g., below) the display 1910.

In an embodiment, the electronic device 1900 may switch from a second state (e.g., a folded state or a closed state) to a first state (e.g., a flat state or an open state), so that the size of the display 1910 may change. As the size of the display 1910 changes, display metrics information may be changed.

In another embodiment, if the electronic device 1900 switches from a landscape mode to a portrait mode or from a portrait mode to a landscape mode, the display metrics information may be changed.

The processor (e.g., the processor 120 in FIG. 1) may configure the position where the camera module (e.g., the camera module 510 in FIG. 5) is disposed as a UDC 1920, based on the change of the display metrics information, and produce a cutout 1921 of the UDC 1920. The processor (e.g., the processor 120 in FIG. 1) may update a window of an application 1930 displayed on the display 1910 so as to avoid the cutout 1921 of the UDC 1920.

In an embodiment, the processor (e.g., the processor 120 in FIG. 1) may reduce the size of the application 1930 in a first direction (e.g., the x-axis direction) or a second direction (e.g., the −x-axis direction), thereby preventing a conflict between an object of the application 1930 and the cutout 1921 of the UDC 1920. The processor (e.g., the processor 120 in FIG. 1) may cause a black screen to be displayed in the portion where the size of the application 1930 is reduced.

Figure 20:
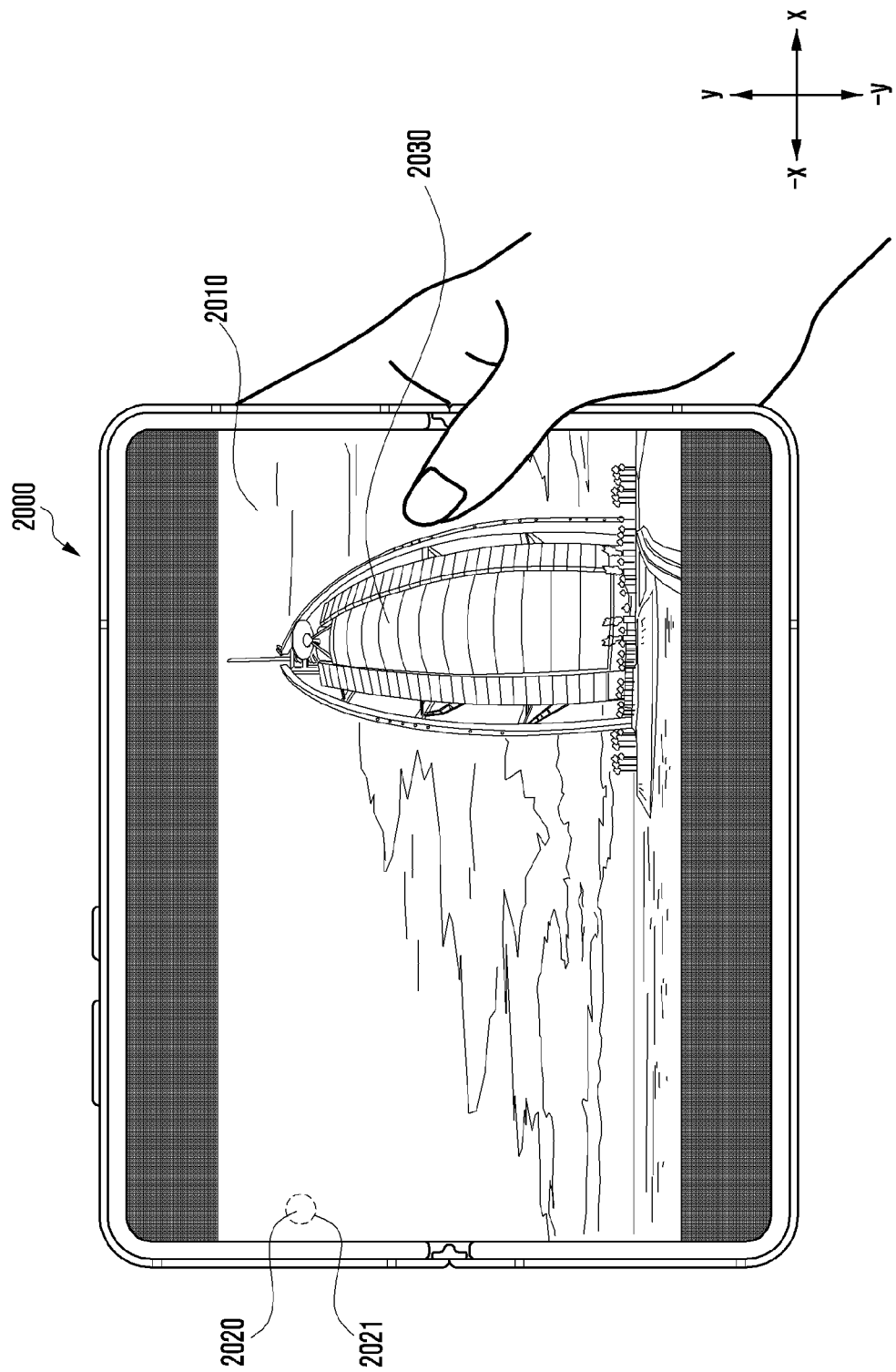
FIG. 20 is a diagram illustrating display of a screen without changing the layout of an application when avoidance of a conflict with a UDC cutout is not required according to an embodiment of the disclosure.

FIG. 20 is a diagram illustrating display of a screen without changing the layout of an application when avoidance of a conflict with a UDC cutout is not required according to an embodiment of the disclosure.

Figure 21:
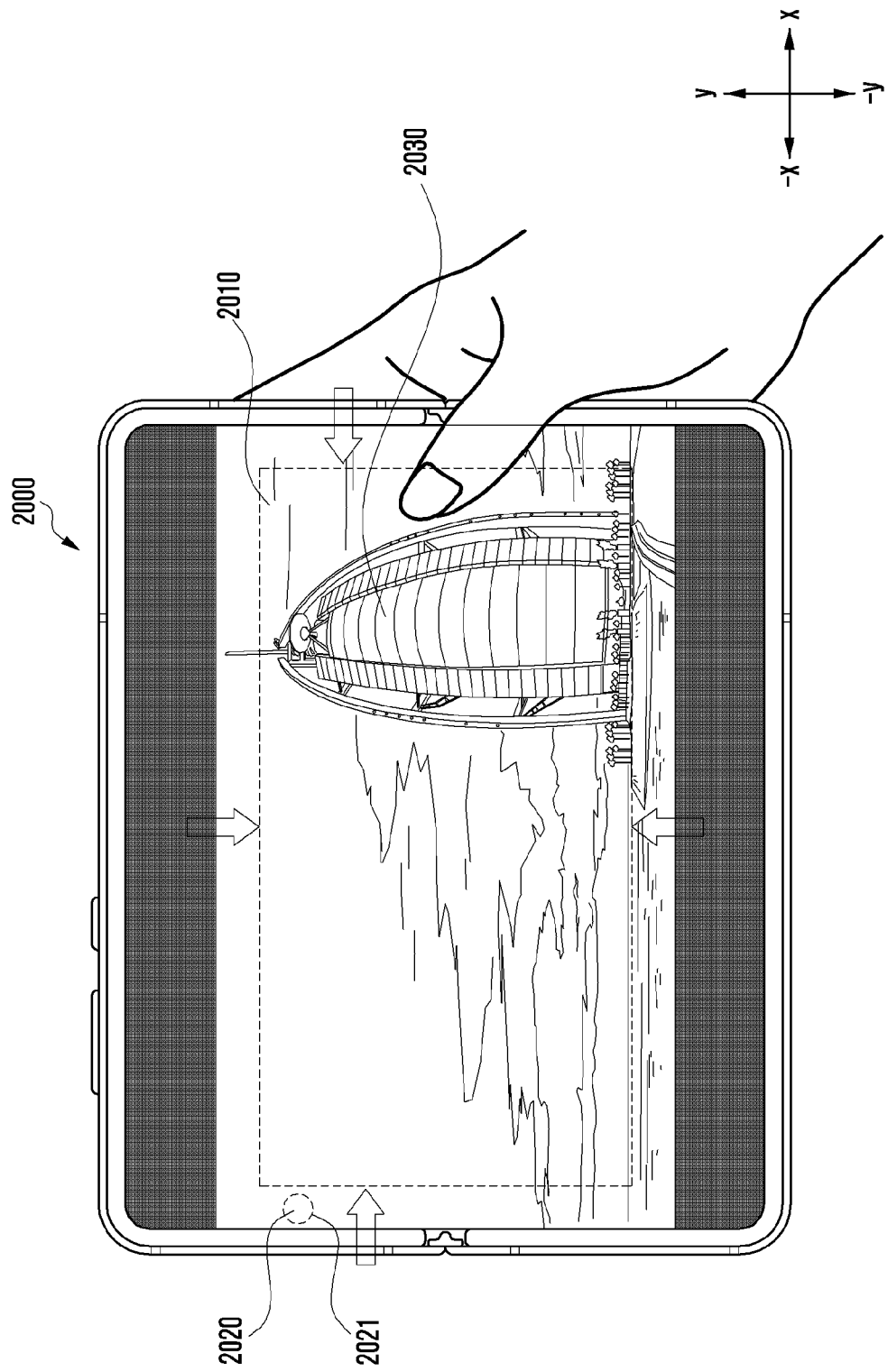
FIG. 21 is a diagram illustrating avoidance of a UDC cutout by reducing the application size according to an embodiment of the disclosure.

FIG. 21 is a diagram illustrating avoidance of a UDC cutout by reducing an application size according to an embodiment of the disclosure.

Referring to FIGS. 20 and 21, an electronic device 2000 according to various embodiments of the disclosure may include a display 2010 and a camera module (e.g., the camera module 510 in FIG. 5) disposed under (e.g., below) the display 2010.

In an embodiment, the electronic device 2000 may switch from a second state (e.g., a folded state or a closed state) to a first state (e.g., a flat state or an open state), so that the size of the display 2010 may change. As the size of the display 2010 changes, display metrics information may be changed.

In another embodiment, if the electronic device 2000 switches from a landscape mode to a portrait mode or from a portrait mode to a landscape mode, the display metrics information may be changed.

The processor (e.g., the processor 120 in FIG. 1) may configure the position where the camera module (e.g., the camera module 510 in FIG. 5) is disposed as a UDC 2020, based on the change of the display metrics information, and produce a cutout 2021 of the UDC 2020. The processor (e.g., the processor 120 in FIG. 1) may determine whether or not an application 2030 to be executed is allowed to conflict with the cutout 2021 of the UDC 2020.

For example, in the case where the application 2030 of the electronic device 2000 is configured to require avoidance of the cutout 2021, the processor (e.g., the processor 120 in FIG. 1) may determine that the application 2030 to be executed needs to avoid the cutout 2021.

In an embodiment, if the electronic device 2000 is configured to require avoidance of the cutout 2021, the processor (e.g., the processor 120 in FIG. 1) may determine that the application 2030 to be executed needs to avoid the cutout 2021.

In an embodiment, if it is configured that avoidance of the cutout 2021 is required by a user setting, the processor (e.g., the processor 120 in FIG. 1) may determine that the application 2030 to be executed needs to avoid the cutout 2021.

For example, if it is determined that the application 2030 to be executed does not need to avoid the cutout 2021, the processor (e.g., the processor 120 in FIG. 1) may update and display a window of the application 2030, regardless of the cutout 2021, as shown in FIG. 20.

For example, if the application 2030 to be executed is determined to need to avoid the cutout 2021, the processor (e.g., the processor 120 in FIG. 1) may update the window of the application 2030 so as to avoid the cutout 2021 of the UDC 2020 as shown in FIG. 21. For example, the processor (e.g., the processor 120 in FIG. 1) may reduce the size of the window of the application 2030 to be displayed on the display 2010.

Figure 22:
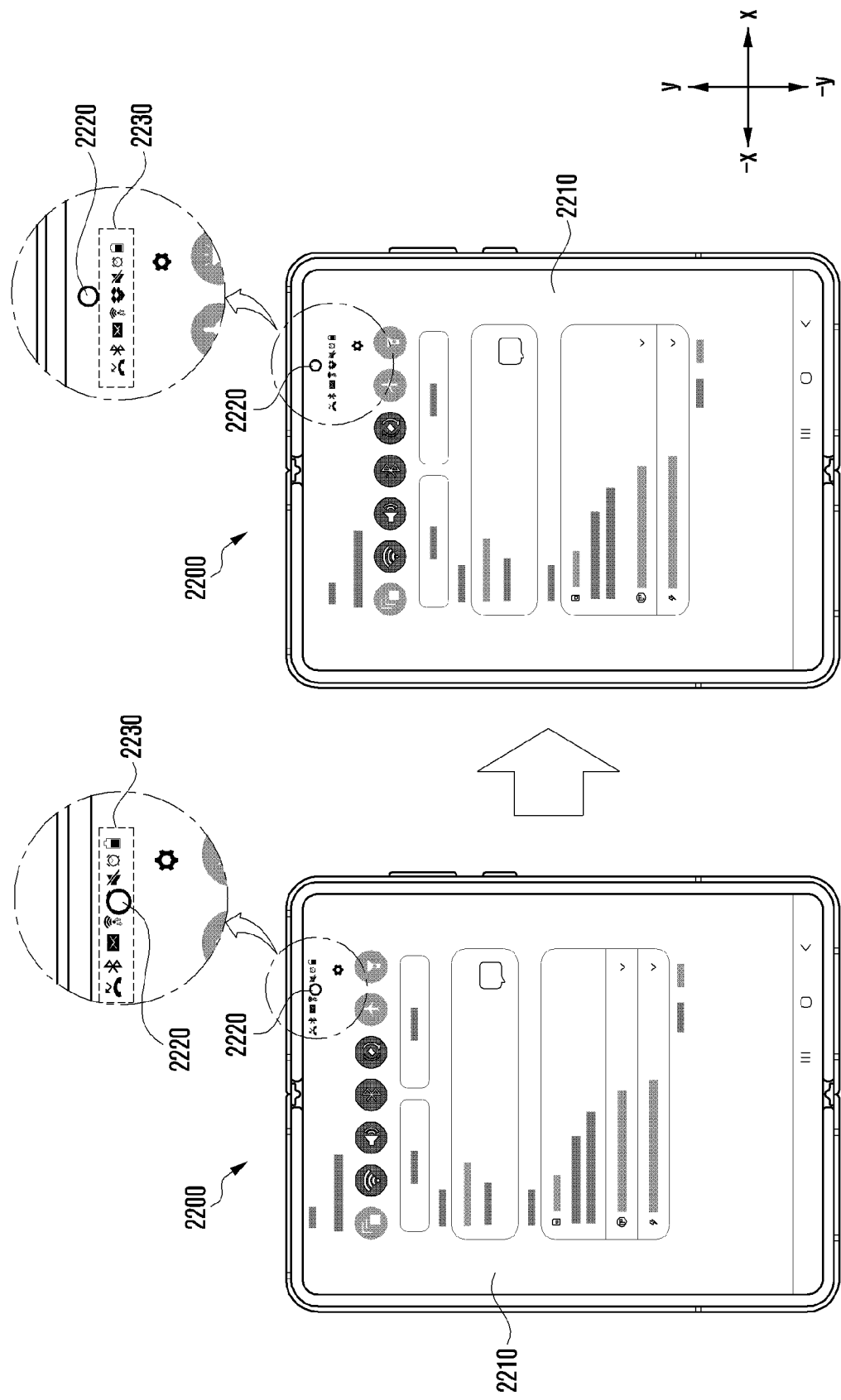
FIG. 22 is a diagram illustrating avoiding a conflict with a UDC cutout by moving the coordinates of an icon of an application according to an embodiment of the disclosure.

FIG. 22 is a diagram illustrating avoidance of a conflict with a UDC cutout by moving the coordinates of an icon of an application according to an embodiment of the disclosure.

Referring to FIG. 22, an electronic device 2200 according to various embodiments of the disclosure may include a display 2210 and a camera module (e.g., the camera module 510 in FIG. 5) disposed under (e.g., below) the display 2210.

In an embodiment, as the state of the display 2210 of the electronic device 2200 changes, display metrics information may be changed.

In another embodiment, the electronic device 2200 may switch from a second state (e.g., a folded state or a closed state) to a first state (e.g., a flat state or an open state), so that the size of the display 2210 may change. As the state of the display 2210 changes, display metrics information may be changed.

In an embodiment, if the electronic device 2200 switches from a landscape mode to a portrait mode or from a portrait mode to a landscape mode, the display metrics information may be changed.

The processor (e.g., the processor 120 in FIG. 1) may determine whether or not icons 2230 of an application to be executed need to avoid a conflict with a cutout 2220 of a UDC. If the icons 2230 of the application need to avoid a conflict with the cutout 2220 of the UDC, the processor (e.g., the processor 120 in FIG. 1) may update display positions of the icons 2230 displayed on the display 2210 so as to avoid the cutout 2220 of the UDC. For example, the processor (e.g., the processor 120 in FIG. 1) may adjust the coordinates (dx, dy) of the icons 2230 (e.g., move the coordinates in the second direction (e.g., the −y-axis direction)) to be displayed on the display 2210. Accordingly, it is possible to avoid a conflict between the cutout 2220 of the UDC and the icons 2230.

Figure 23:
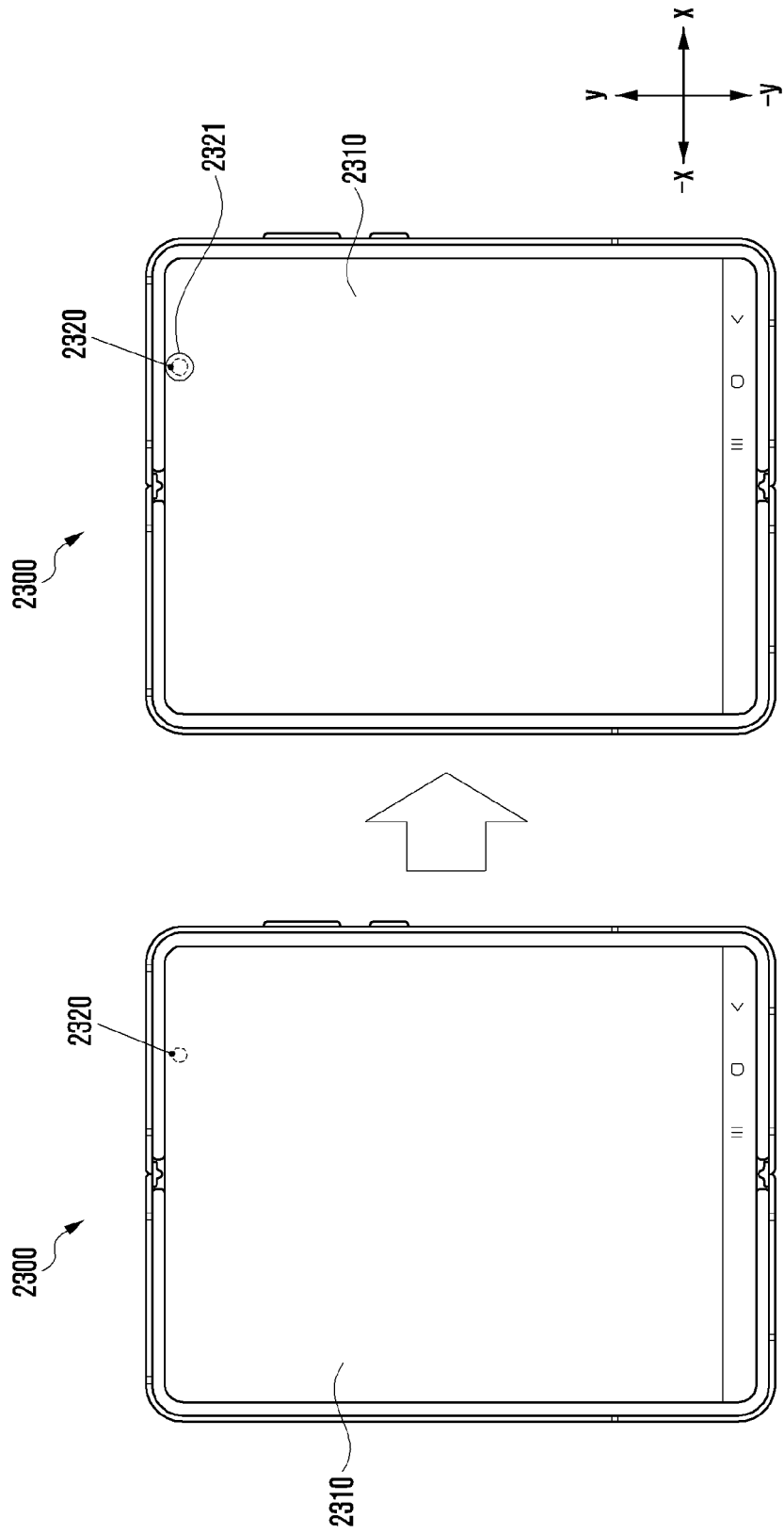
FIG. 23 is a diagram illustrating visually displaying a UDC cutout on a display, based on UDC coordinates according to an embodiment of the disclosure.

FIG. 23 is a diagram illustrating visually displaying a UDC cutout on a display, based on UDC coordinates according to an embodiment of the disclosure.

Referring to FIG. 23, an electronic device 2300 according to various embodiments of the disclosure may include a display 2310 and a camera module (e.g., the camera module 510 in FIG. 5) disposed under (e.g., below) the display 2310. An electronic device in the under-display camera type does not have a physical camera hole, but may produce a cutout 2321 of a UDC 2320, thereby display the same visually.

In an embodiment, the processor (e.g., the processor 120 in FIG. 1) may detect the position of a UDC 2320, based on display metrics information, and produce a cutout 2321 of the UDC 2320, based on the position of the UDC 2320. The processor (e.g., the processor 120 in FIG. 1) may display the cutout 2321 of the UDC on the display 2310 to be visible.

Figure 24A:
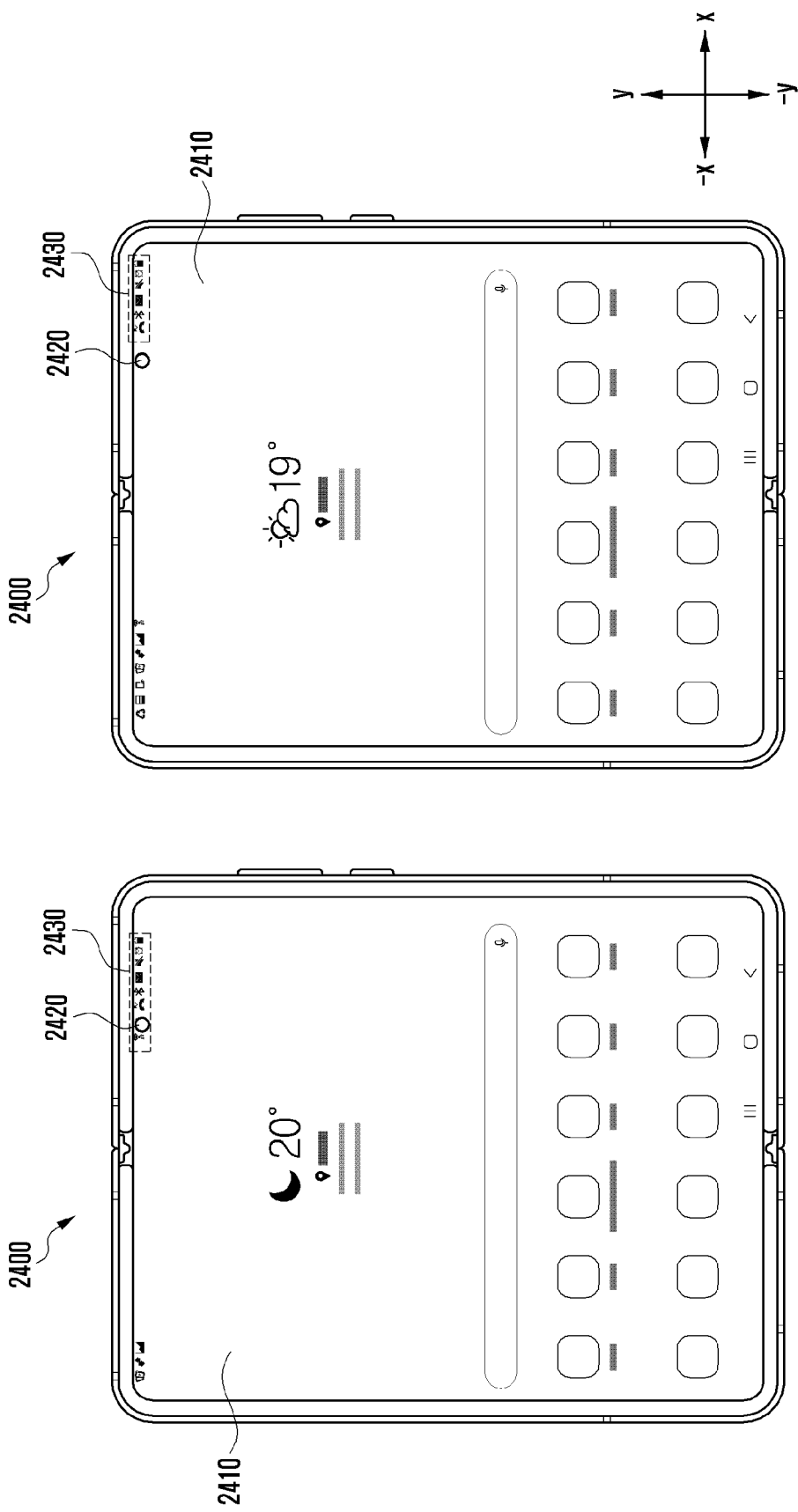
FIG. 24A is a diagram illustrating a method of moving the coordinates of an icon of an application in order to avoid a conflict between a UDC cutout and the icon of the application according to an embodiment of the disclosure.

FIG. 24A is a diagram illustrating a method of moving the coordinates of an icon of an application in order to avoid a conflict between a UDC cutout and the icon of an application according to an embodiment of the disclosure.

Figure 24B:
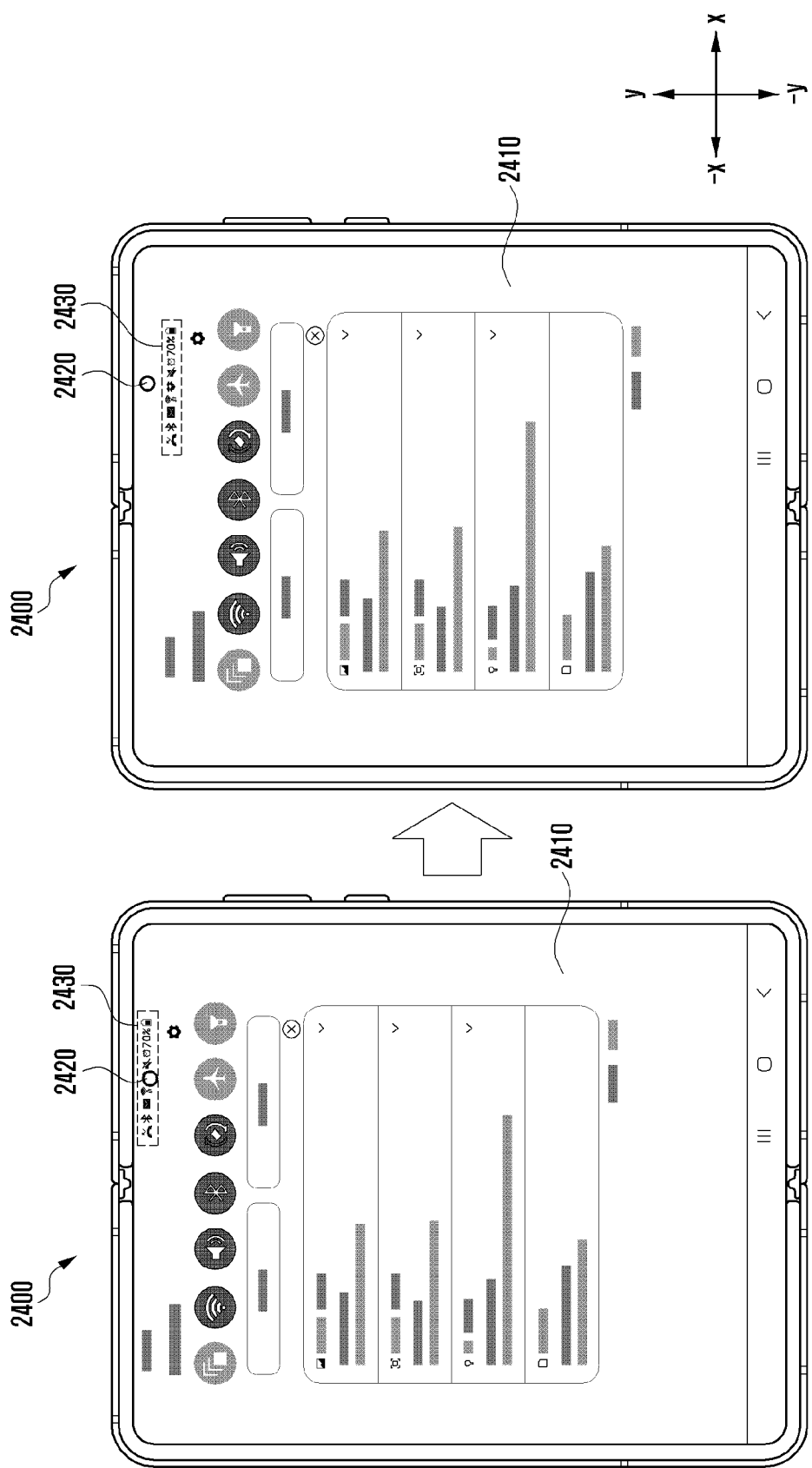
FIG. 24B is a diagram illustrating a method of moving the coordinates of an icon of an application in order to avoid a conflict between a UDC cutout and the icon of the application according to an embodiment of the disclosure.

FIG. 24B is a diagram illustrating a method of moving the coordinates of an icon of an application in order to avoid a conflict between a UDC cutout and the icon of an application according to an embodiment of the disclosure.

Referring to FIGS. 24A and 24B, an electronic device 2400 according to various embodiments of the disclosure may include a display 2410 and a camera module (e.g., the camera module 510 in FIG. 5) disposed under (e.g., below) the display 2410.

In an embodiment, the processor (e.g., the processor 120 in FIG. 1) may produce a UDC area 2420, based on display metrics information. The processor (e.g., the processor 120 in FIG. 1) may determine whether or not icons 2430 of an application to be executed need to avoid a conflict with the UDC area 2420. If the icons 2430 of the application need to avoid a conflict with the UDC area 2420, the processor (e.g., the processor 120 in FIG. 1) may update display positions of the icons 2430 displayed on the display 2410 so as to avoid the UDC area 2420.

For example, referring to FIG. 24A, the processor (e.g., the processor 120 in FIG. 1) may adjust the coordinates (dx, dy) of the icons 2430 in a first direction (e.g., the x-axis direction) perpendicular to the lengthwise direction of the display 2410, thereby displaying the icons 2430 on the display 2410. Accordingly, it is possible to avoid a conflict between the UDC area 2420 and the icons 2430.

For example, referring to FIG. 24B, the processor (e.g., the processor 120 in FIG. 1) may adjust the coordinates (dx, dy) of the icons 2430 in a second direction (e.g., the −y-axis direction) parallel to the lengthwise direction of the display 2410, thereby displaying the icons 2430 on the display 2410. Accordingly, it is possible to avoid a conflict between the UDC area 2420 and the icons 2430.

Figure 25:
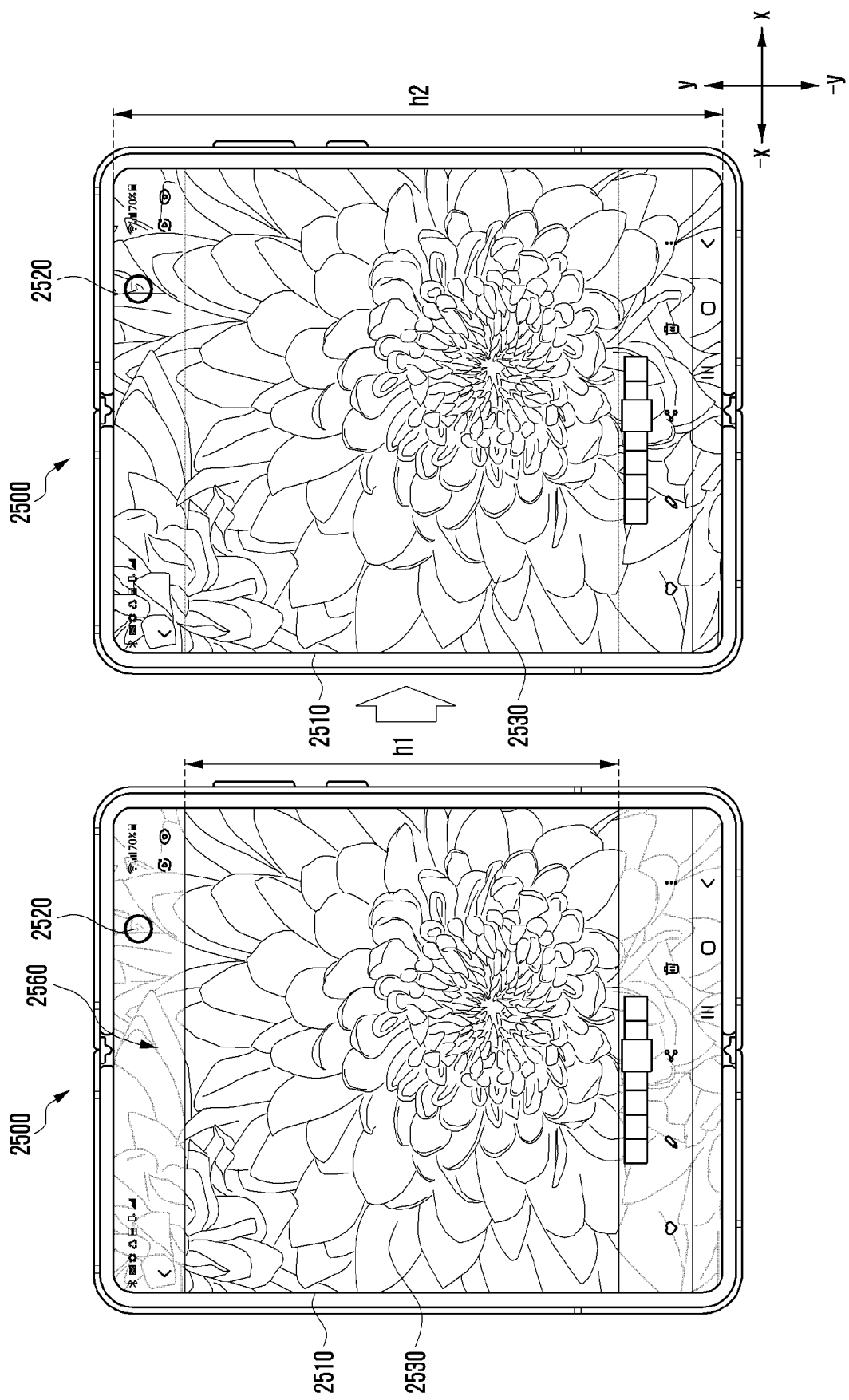
FIG. 25 is a diagram illustrating an operation method when a gallery view application is executed according to an embodiment of the disclosure.

FIG. 25 is a diagram illustrating an operation method when a gallery view application is executed according to an embodiment of the disclosure.

Referring to FIG. 25, an electronic device 2500 according to various embodiments of the disclosure may include a display 2510 and a camera module (e.g., the camera module 510 in FIG. 5) disposed under (e.g., below) the display 2510.

In an embodiment, the processor (e.g., the processor 120 in FIG. 1) may produce a UDC area 2520, based on display metrics information. The processor (e.g., the processor 120 in FIG. 1) may determine whether or not an application 2530 (e.g., a gallery view application) to be executed needs to avoid a conflict with the UDC area 2520.

For example, a control user interface 2560 of the application 2530 (e.g., a gallery view application) may be displayed in white wallpaper, which may cause a problem in that pixels of the UDC area 2520 are clearly viewed. If the application 2530 (e.g., a gallery view application) does not need to avoid a conflict with the UDC area 2520, the transparency of the control user interface of the application 2530 (e.g., a gallery view application) may be increased such that the wallpaper is clearly visible, thereby reducing the visibility of the UDC area 2520. For example, when the control user interface 2560 of the application 2530 (e.g., a gallery view application) is displayed to be opaque (e.g., in white wallpaper), a portion corresponding to a first width h1 in the entire area h2 of the wallpaper may be displayed clearly, and the remaining portions thereof may be displayed to be blurry. The entire area h2 of the wallpaper may be clearly displayed by increasing the transparency of the control user interface 2560 of the application 2530 (e.g., a gallery view application).

As another example, if the application 2530 (e.g., a gallery view application) does not need to avoid a conflict with the UDC area 2520, the processor (e.g., the processor 120 in FIG. 1) may adjust a window size of the application 2530 (e.g., a gallery view application) such that the screen displayed in the application 2530 (e.g., a gallery view application) overlaps the UDC area 2520.

Figure 26:
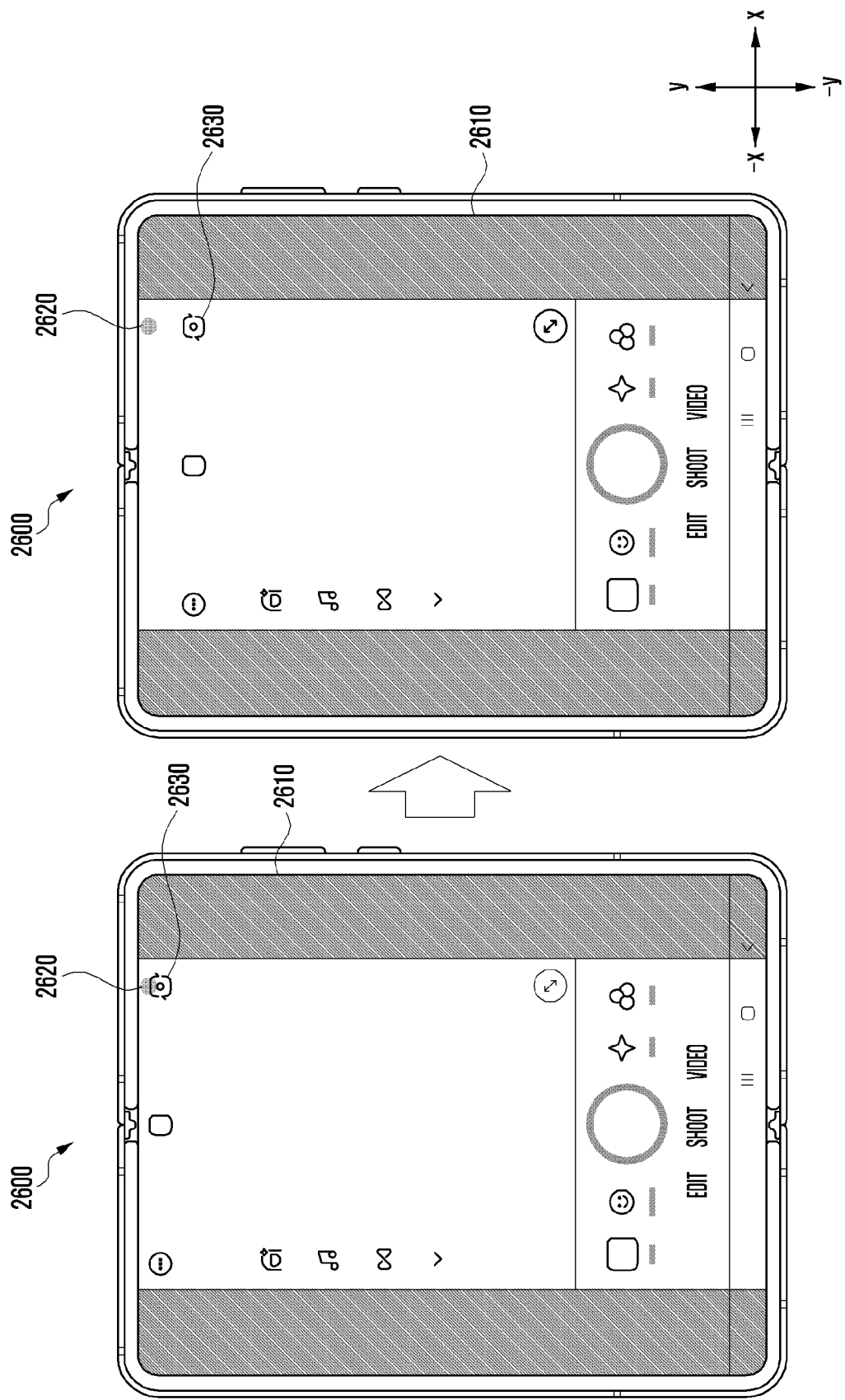
FIG. 26 is a diagram illustrating an operation method when a camera application is executed according to an embodiment of the disclosure.

FIG. 26 is a diagram illustrating an operation method when a camera application is executed according to an embodiment of the disclosure.

Referring to FIG. 26, an electronic device 2600 according to various embodiments of the disclosure may include a display 2610 and a camera module (e.g., the camera module 510 in FIG. 5) disposed under (e.g., below) the display 2610.

In an embodiment, the processor (e.g., the processor 120 in FIG. 1) may produce a UDC area 2620, based on display metrics information. The processor (e.g., the processor 120 in FIG. 1) may determine whether or not a camera application (e.g., a third-party camera application or a SODA application camera) to be executed is allowed to conflict with the UDC area 2620.

For example, if the UDC area 2620 and a third-party camera application (e.g., a SODA application camera) need to avoid a conflict with each other, the processor (e.g., the processor 120 in FIG. 1) may adjust the coordinates (dx, dy) of a user interface 2630 of the third-party camera application (e.g., a SODA application camera) in a second direction (e.g., the −y-axis direction) and display the user interface 2630 on the display 2610 such that the UDC area 2620 and the user interface 2630 do not conflict with each other. Accordingly, it is possible to avoid a conflict between the UDC area 2620 and the user interface 2630 of the third-party camera application.

As another example, the processor (e.g., the processor 120 in FIG. 1) may adjust the coordinates (dx, dy) of the user interface 2630 of the third-party camera application (e.g., a SODA application camera) in a third direction (e.g., the −x-axis direction) and display the user interface 2630 on the display 2610 such that the UDC area 2620 and the user interface 2630 do not conflict with each other. Accordingly, it is possible to avoid a conflict between the UDC area 2620 and the user interface 2630 of the camera application.

Figure 27:
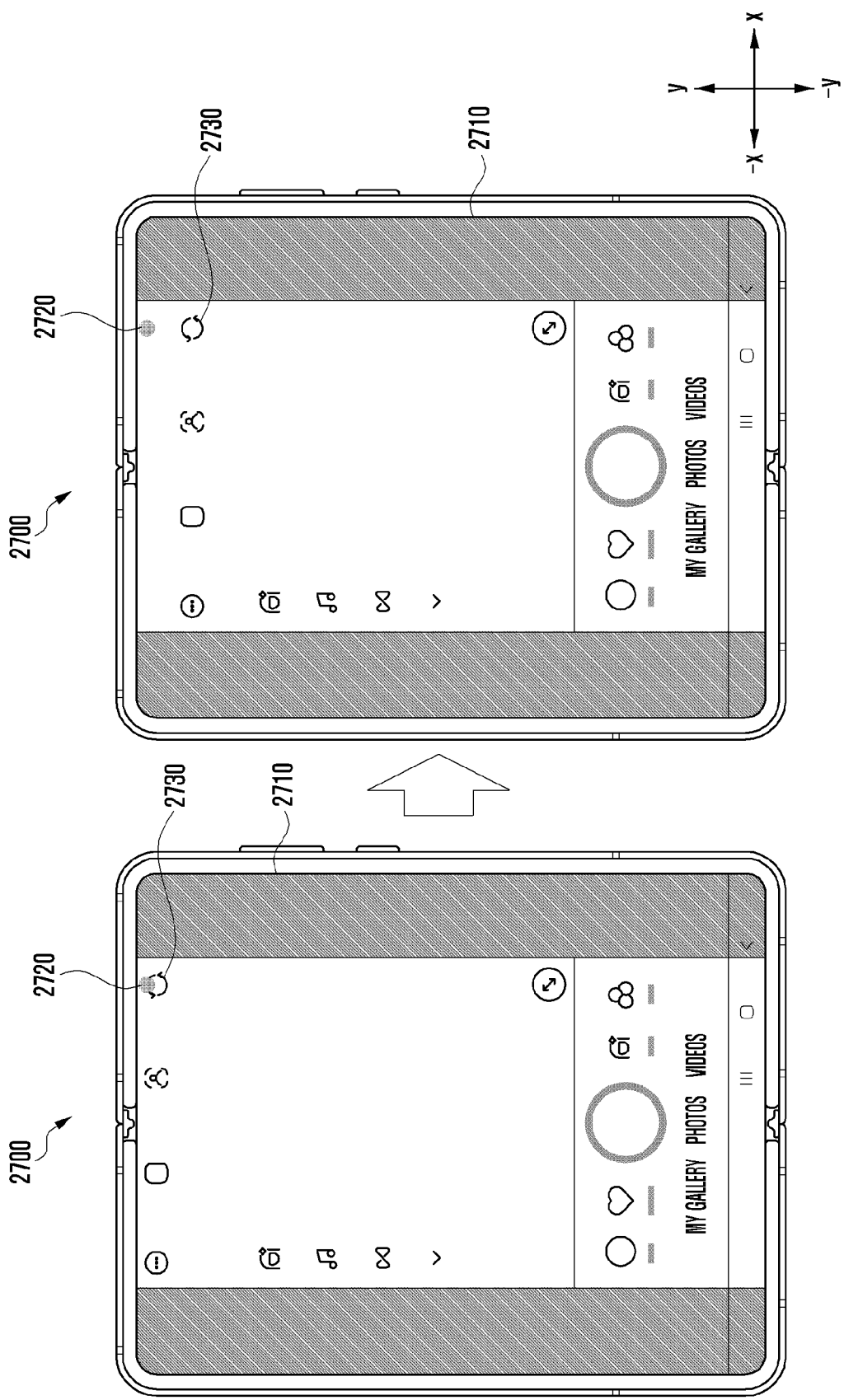
FIG. 27 is a diagram illustrating an operation method when another camera application is executed according to an embodiment of the disclosure.

FIG. 27 is a diagram illustrating an operation method when another camera application is executed according to an embodiment of the disclosure.

Referring to FIG. 27, an electronic device 2700 according to various embodiments of the disclosure may include a display 2710 and a camera module (e.g., the camera module 510 in FIG. 5) disposed under (e.g., below) the display 2710.

In an embodiment, the processor (e.g., the processor 120 in FIG. 1) may produce a UDC area 2720, based on display metrics information. The processor (e.g., the processor 120 in FIG. 1) may determine whether or not another camera application (e.g., a SNOW application camera) to be executed is allowed to conflict with the UDC area 2720.

For example, if the UDC area 2720 and another camera application (e.g., a SNOW application) need to avoid a conflict with each other, the processor (e.g., the processor 120 in FIG. 1) may adjust the coordinates (dx, dy) of a user interface 2730 of another camera application (e.g., a SNOW application) in a second direction (e.g., the −y-axis direction) and display the user interface 2730 on the display 2710 such that the UDC area 2720 and the user interface 2730 do not conflict with each other. Accordingly, it is possible to avoid a conflict between the UDC area 2720 and the user interface 2730 of another camera application (e.g., a SNOW application).

As another example, the processor (e.g., the processor 120 in FIG. 1) may adjust the coordinates (dx, dy) of the user interface 2730 of another camera application (e.g., a SNOW application) in a third direction (e.g., the −x-axis direction) and display the user interface 2730 on the display 2710 such that the UDC area 2720 and the user interface 2730 do not conflict with each other. Accordingly, it is possible to avoid a conflict between the UDC area 2720 and the user interface 2730 of another camera application (e.g., a SNOW application camera).

Figure 28:
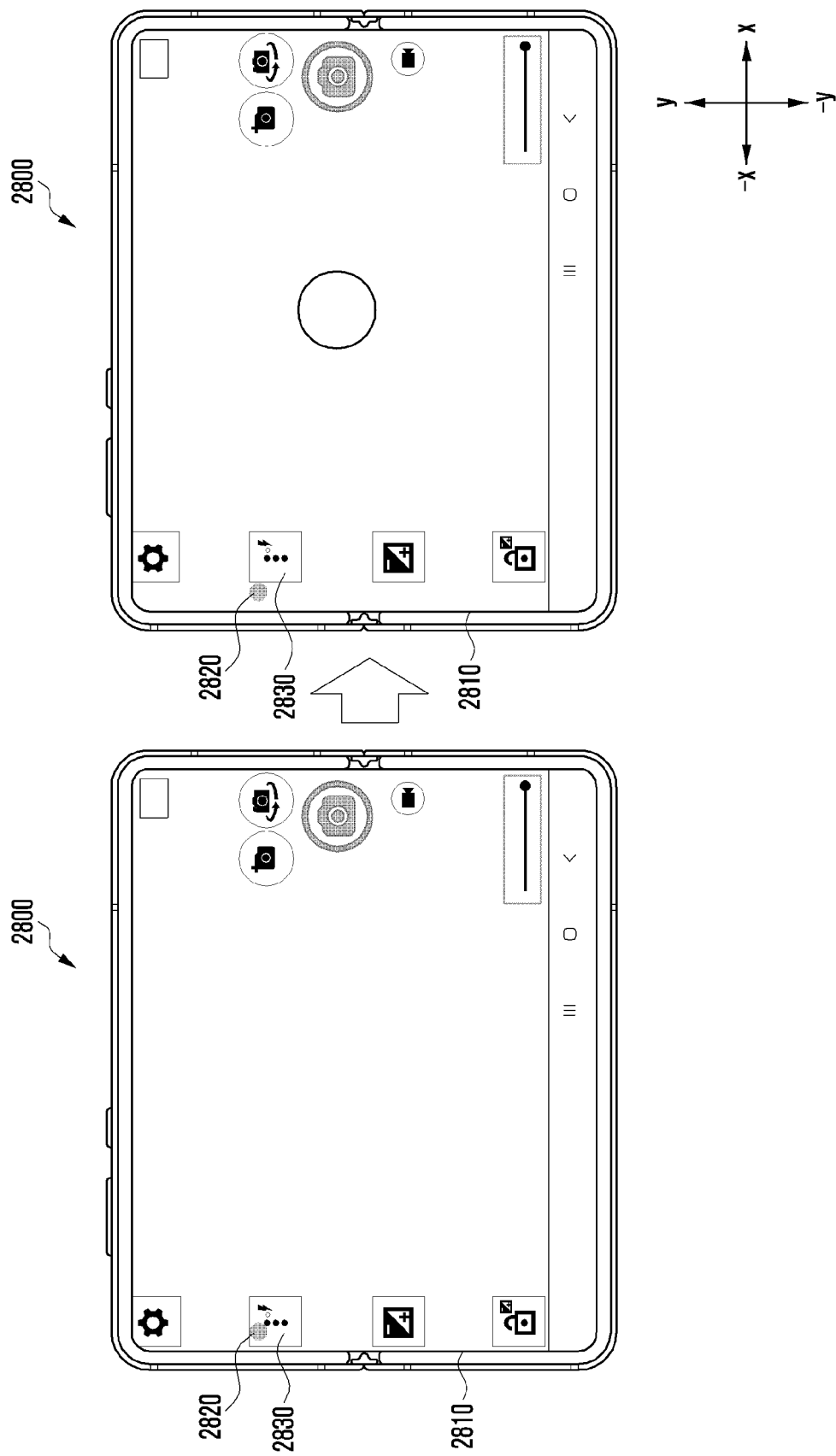
FIG. 28 is a diagram illustrating an operation method when another camera application is executed according to an embodiment of the disclosure.

FIG. 28 is a diagram illustrating an operation method when another camera application is executed according to an embodiment of the disclosure.

Referring to FIG. 28, an electronic device 2800 according to various embodiments of the disclosure may include a display 2810 and a camera module (e.g., the camera module 510 in FIG. 5) disposed under (e.g., below) the display 2810.

In an embodiment, the processor (e.g., the processor 120 in FIG. 1) may produce a UDC area 2820, based on display metrics information. The processor (e.g., the processor 120 in FIG. 1) may determine whether or not another camera application (e.g., an open camera application) to be executed is allowed to conflict with the UDC area 2820.

For example, if the UDC area 2820 and another camera application (e.g., an open camera application) need to avoid a conflict with each other, the processor (e.g., the processor 120 in FIG. 1) may adjust the coordinates (dx, dy) of a user interface 2830 of another camera application (e.g., an open camera application) in a second direction (e.g., the −y-axis direction) and display the user interface 2830 on the display 2810 such that the UDC area 2820 and the user interface 2830 do not conflict with each other. Accordingly, it is possible to avoid a conflict between the UDC area 2820 and the user interface 2830 of another camera application (e.g., an open camera application).

As another example, the processor (e.g., the processor 120 in FIG. 1) may adjust the coordinates (dx, dy) of the user interface 2830 of another camera application (e.g., an open camera application) in a third direction (e.g., the −x-axis direction) and display the user interface 2830 on the display 2810 such that the UDC area 2820 and the user interface 2830 do not conflict with each other. Accordingly, it is possible to avoid a conflict between the UDC area 2820 and the user interface 2830 of another camera application (e.g., an open camera application).

Figure 29:
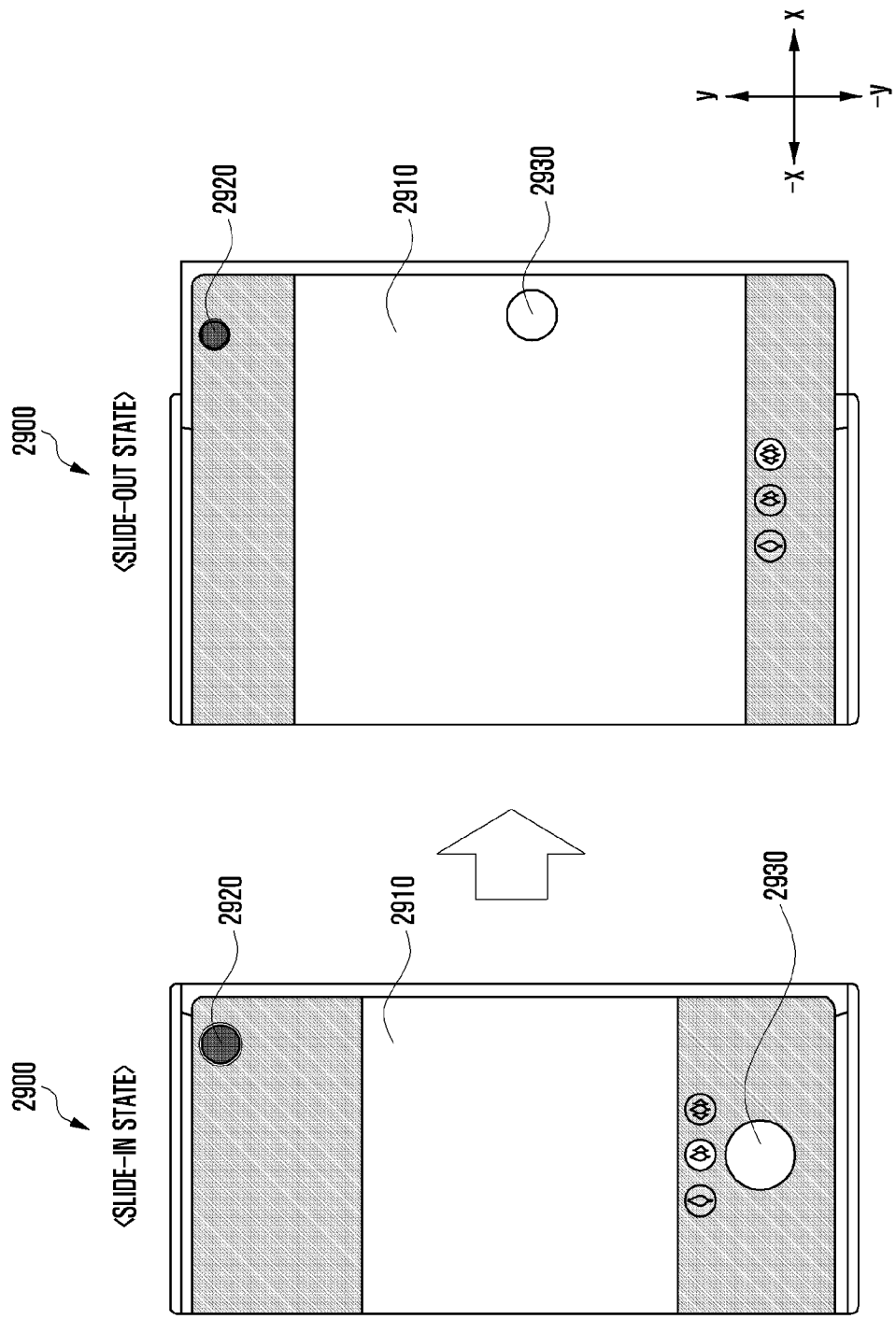
FIG. 29 is a diagram illustrating that avoidance of a UDC cutout is applied to an electronic device in which the size of a display is changed in a slide manner according to an embodiment of the disclosure.

FIG. 29 is a diagram illustrating that avoidance of a UDC cutout is applied to an electronic device in which the size of a display is changed in a slide manner according to an embodiment of the disclosure.

Referring to FIG. 29, an electronic device 2900 according to various embodiments of the disclosure may include a display 2910 and a camera module (e.g., the camera module 510 in FIG. 5) disposed under (e.g., below) the display 2910.

In an embodiment, the electronic device 2900 according to various embodiments of the disclosure may be a slidable electronic device. The display 2910 may be configured as a flexible display of which the size is reduced in a first state (e.g., a slide-in state or a retracted state) and increased in a second state (e.g., a slide-out state or a pull-out state). If the electronic device 2900 switches from the first state (e.g., a slide-in state or a retracted state) to the second state (e.g., a slide-out state or a pulled-out state), display metrics information may be changed.

In another embodiment, the processor (e.g., the processor 120 in FIG. 1) may produce a UDC area 2920, based on the change of the display metrics information. The processor (e.g., the processor 120 in FIG. 1) may change the position of a user interface 2930 (e.g., a shooting button) of an application (e.g., a camera application) to be executed, based on the change of the metrics information. For example, the processor (e.g., the processor 120 in FIG. 1) may adjust the coordinates (dx, dy) of the user interface 2930 of the application (e.g., a camera application) such that the UDC area 2920 and the user interface 2930 of the application (e.g., a camera application) do not conflict with each other. The processor (e.g., the processor 120 in FIG. 1) may change the user interface of the application (e.g., a camera application) to be executed, based on the change of the display metrics information. For example, if the state switches from a slide-in state (e.g., the left figure in FIG. 29) to a slide-out state (e.g., the right figure in FIG. 29), the user interface of the application may be expanded based on the expansion of the display. For example, a user interface that at least partially overlaps the UDC area 2920 in the slide-in state (e.g., the left figure in FIG. 29) may be provided. According to various embodiments, the processor (e.g., the processor 120 in FIG. 1) may change the user interface of the application to be executed such that the user interface and the UDC area 2920 do not conflict with each other in the slide-out state (e.g., the right figure in FIG. 29). For example, if avoidance of a UDC is not required, a designated screen (e.g., a preview screen) of an application (e.g., a camera application) may be displayed so as to overlap the UDC area 2920, and, according to the disclosure, if avoidance of a UDC is required, a designated screen (e.g., a preview screen) of an application (e.g., a camera application) may be displayed so as not to overlap the UDC area 2920. For example, in the slide-out state (e.g., the right figure in FIG. 29), a reduced designated screen (e.g., a preview screen) may be displayed so as not to overlap the UDC area 2920 in the second direction (e.g., the y/−y-axis direction) of the electronic device 2900.

In an embodiment, when a camera is used in a slidable electronic device, if the screen is widened by a slide, content of an application may be rearranged to conflict with the UDC. Therefore, in the disclosure, it is possible not to block a specific user interface of an application in the slidable electronic device when using a camera.

In an embodiment, the processor (e.g., the processor 120 in FIG. 1) of the electronic device 2900 may change the user interface of an application to be executed, based on a change in the display metrics information, and visually display the UDC area 2920. For example, the processor (e.g., the processor 120 in FIG. 1) may determine whether or not a user interface of an application (e.g., a camera application) and the UDC area 2920 conflict with each other, based on a change in the display metrics information (e.g., a change from a slide-in state to a slide-out state). If it is determined that the user interface of the application (e.g., a camera application) conflicts with the UDC area 2920, the processor (e.g., the processor 120 in FIG. 1) may change a visual effect corresponding to the UDC area 2920. For example, the processor (e.g., the processor 120 in FIG. 1) may display the UDC area 2920 overlapping the user interface of the application to be visually distinct, or may not temporarily provide a visually distinct display of the UDC area 2920. For example, the processor (e.g., the processor 120 in FIG. 1) of the electronic device 2900 may provide visual displays (e.g., figures, text, colors, etc.) when an application provides a designated screen (e.g., a preview screen), and may not provide visual displays when another designated screen (e.g., a gallery screen) is provided.

According to an embodiment, the processor (e.g., the processor 120 in FIG. 1) of the electronic device 2900 may determine a visual display of the UDC area 2920, based on whether or not a user input is received for a running application. For example, if a user input (e.g., a button input for performing a function) occurs in a running application, the processor (e.g., the processor 120 in FIG. 1) may display the UDC area 2920 to be visually distinguished, and, if no user input occurs, the UDC area 2920 may not be visually provided.

Figure 30:
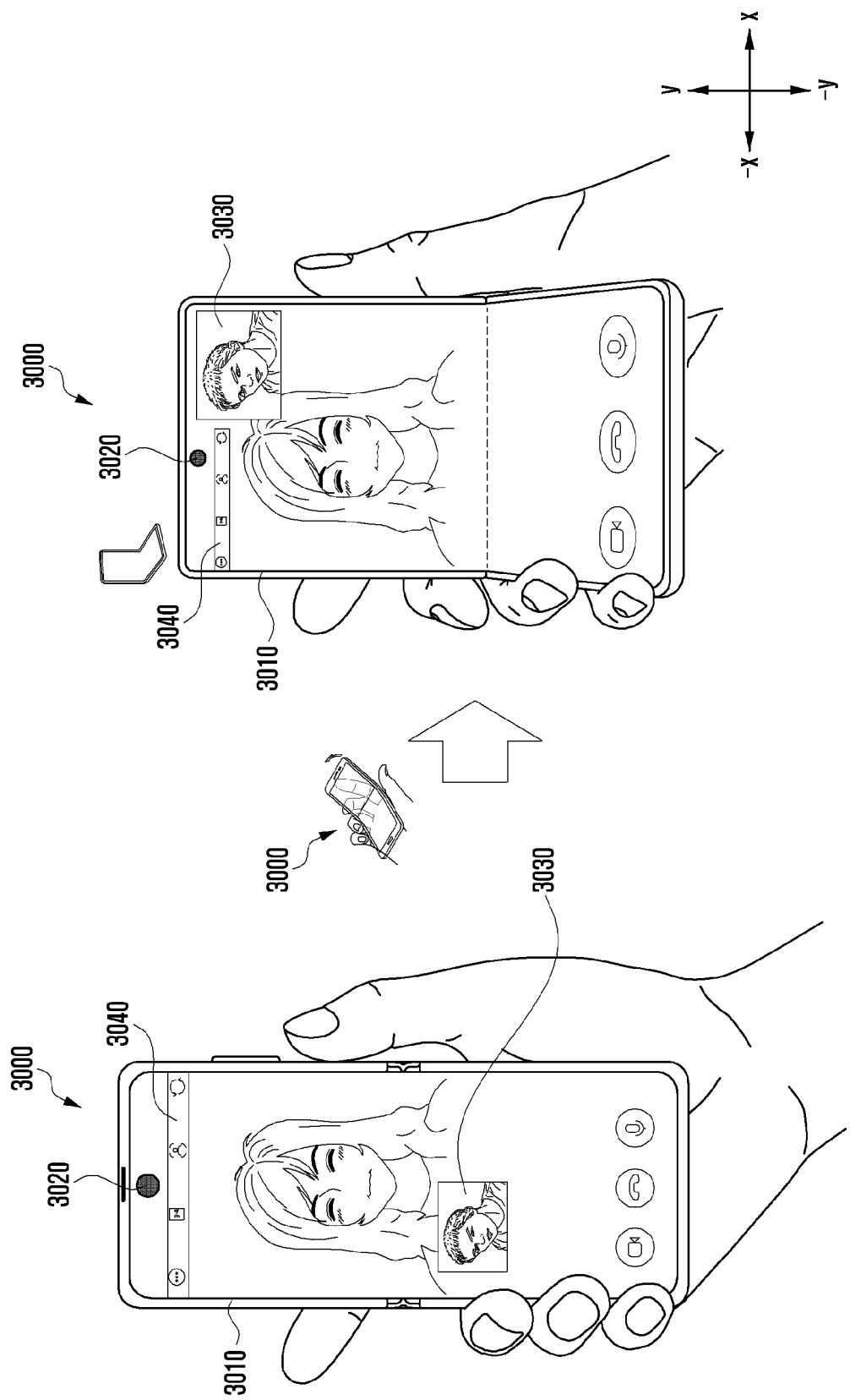
FIG. 30 is a diagram illustrating that avoidance of a UDC cutout is applied to an electronic device in which a display is folded and unfolded in a vertical direction (e.g., a y-axis direction) according to an embodiment of the disclosure.

FIG. 30 is a diagram illustrating that avoidance of a UDC cutout is applied to an electronic device in which a display is folded and unfolded in a vertical direction (e.g., the y-axis direction) according to an embodiment of the disclosure.

Referring to FIG. 30, an electronic device 3000 according to various embodiments of the disclosure may include a display 3010 and a camera module (e.g., the camera module 510 in FIG. 5) disposed under (e.g., below) the display 3010.

In an embodiment, the electronic device 3000 according to various embodiments of the disclosure may be a flip-type electronic device capable of being folded or unfolded in a vertical direction (e.g., the y-axis direction). The display 3010 may be in a first state (e.g., a closed state), a second state (e.g., a vertical state), and a third state (e.g., a flat state). Display metrics information may be changed according to a change in the state of the display 3010.

In another embodiment, the processor (e.g., the processor 120 in FIG. 1) may produce a UDC area 3020, based on the change of the display metrics information. The processor (e.g., the processor 120 in FIG. 1) may change the position of a user interface 3040 of an executed application (e.g., a camera application), based on the change in the metrics information. For example, the processor (e.g., the processor 120 in FIG. 1) may adjust the coordinates (dx, dy) of the user interface 3040 of the application (e.g., a camera application) such that the UDC area 3020 and the user interface 3040 of the application (e.g., a camera application) do not conflict with each other. In addition, the processor (e.g., the processor 120 in FIG. 1) may adjust the coordinates (dx, dy) of a selfie view area 3030 of the application (e.g., a camera application). Here, the processor (e.g., the processor 120 in FIG. 1) may adjust the coordinates (dx, dy) of the selfie view area 3030 such that the UDC area 3020 and the selfie view area 3030 do not conflict with each other.

Figure 31:
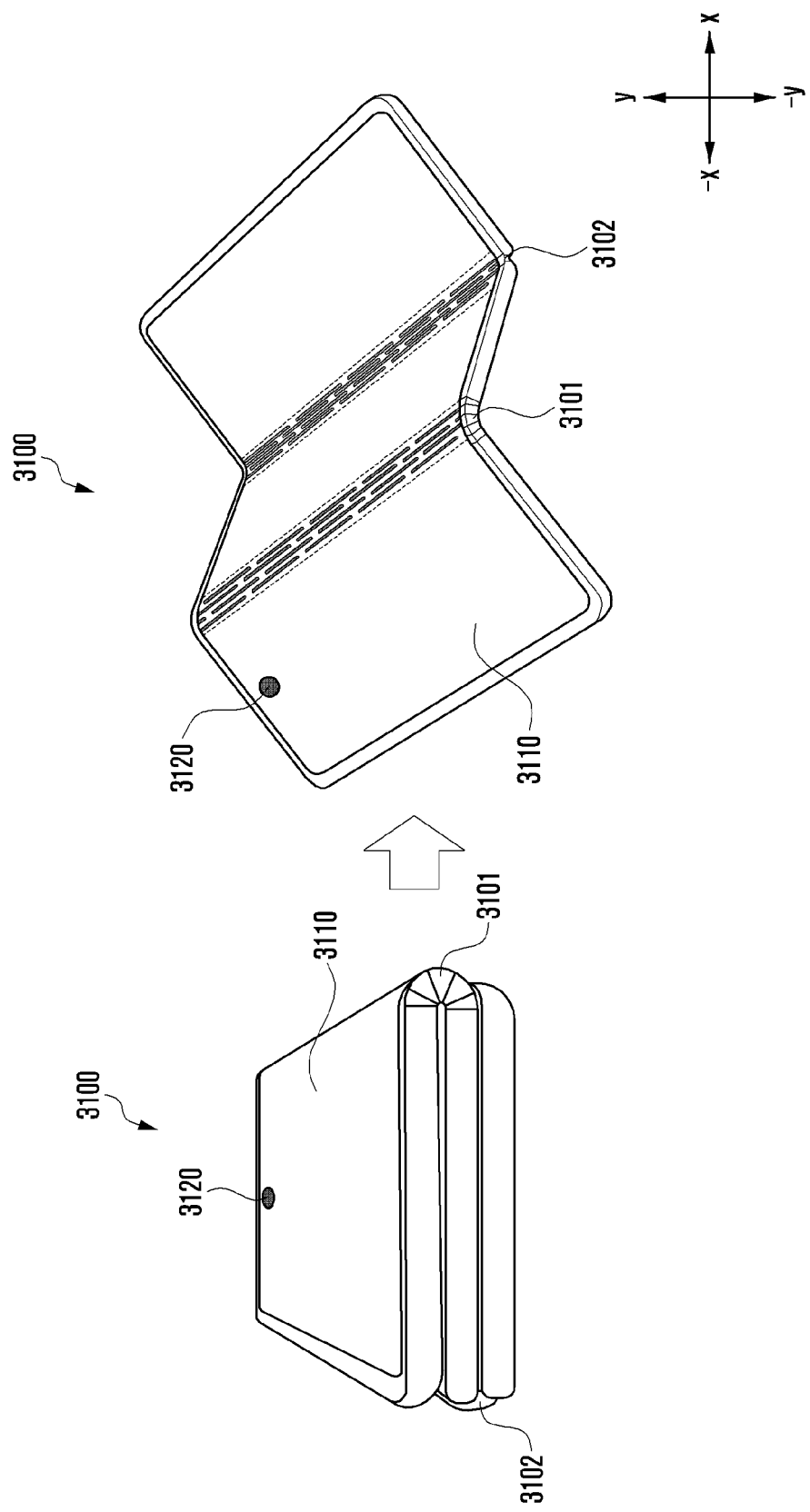
FIG. 31 is a diagram illustrating that avoidance of a UDC cutout is applied to an electronic device including a plurality of folding areas (e.g., a plurality of hinges and folding axes) according to an embodiment of the disclosure.

FIG. 31 is a diagram illustrating that avoidance of a UDC cutout is applied to an electronic device including a plurality of folding areas (e.g., a plurality of hinges and folding axes) according to an embodiment of the disclosure.

Referring to FIG. 31, an electronic device 3100 according to various embodiments of the disclosure may include a display 3110 and a camera module (e.g., the camera module 510 in FIG. 5) disposed under (e.g., below) the display 3110.

In an embodiment, the electronic device 3100 according to various embodiments of the disclosure may include a plurality of folding areas 3101 and 3102 (e.g., a plurality of hinges and folding axes). For example, the electronic device 3100 may include two hinge modules and two folding areas respectively corresponding to the two hinge modules, and in this case, the electronic device may be folded in the form of the letter Z in alphabet. For example, the electronic device 3100 may include three hinge modules and three folding areas respectively corresponding to the three hinge modules, and in this case, the electronic device may be folded in the form of the letter W in alphabet.

In another embodiment, display metrics information may be changed according to a change in the state of the display 3110.

The processor (e.g., the processor 120 in FIG. 1) may produce a UDC area 3120, based on the change of the display metrics information. The processor (e.g., the processor 120 in FIG. 1) may change a window of an executed application, based on the change in the metrics information, such that the window of the application and the UDC area 3120 do not conflict with each other.

An electronic device (e.g., the electronic device 200 in FIGS. 2A and 2B, the electronic device 300 in FIGS. 3A and 3B, the electronic device 400 in FIG. 4, the electronic device 500 in FIG. 5, the electronic device 600 in FIG. 6, the electronic device 700 in FIG. 7, the electronic device 900 in FIG. 9, the electronic device 1600 in FIG. 16, the electronic device 1800 in FIG. 18, the electronic device 1900 in FIG. 19, the electronic device 2000 in FIG. 20, the electronic device 2200 in FIG. 22, the electronic device 2400 in FIGS. 24A and 24B, the electronic device 2500 in FIG. 25, the electronic device 2600 in FIG. 26, the electronic device 2700 in FIG. 27, the electronic device 2800 in FIG. 28, the electronic device 2900 in FIG. 29, the electronic device 3000 in FIG. 30, or the electronic device 3100 in FIG. 31) according to various embodiments of the disclosure may include a display (e.g., the display 410 in FIG. 4, the display 501 in FIG. 5, or the display 710 in FIG. 7), a camera module (e.g., the camera module 510 in FIG. 5 or the camera module 1300 in FIG. 13) disposed under the display 410, 501, or 710, a processor (e.g., the processor 120 in FIG. 1) configured to control the display 410, 501, or 710 and the camera module 510 or 1300, and a memory (e.g., the memory 130 in FIG. 1) operably connected to the processor 120. The memory 130 may store instructions that, when executed, cause the processor 120 to receive display 410, 501, or 710 metrics information that is changed according to the state of the display 410, 501, or 710, produce an under-display 410, 501, or 710 camera area corresponding to a position of the camera module 510 or 1300, based on the changed display 410, 501, or 710 metrics information, produce a logical cutout (e.g., the cutout 720 in FIGS. 7 and 8, the cutout 1621 in FIG. 16, the cutout 1821 in FIG. 18, the cutout 1921 in FIG. 19, the cutout 2021 in FIG. 20, or the cutout 2220 in FIG. 22) of the under-display 410, 501, or 710 camera area, and update the layout of an application (e.g., the application 1630 in FIG. 16, the application 1830 in FIG. 18, the application 1930 in FIG. 19, the application 2030 in FIG. 20, or the application 2530 in FIG. 25) to be executed, based on the cutout 720, 1621, 1821, 1921, 2021, or 2220.

According to an embodiment, it is possible to determine whether or not the cutout 720, 1621, 1821, 1921, 2021, or 2220 of the under-display 410, 501, or 710 camera area and an icon and/or a user interface 740, 2630, 2730, 2830, 2930, or 3040 of the application 1630, 1830, 1930, 2030, or 2530 are allowed to conflict with each other. The layout of the application 1630, 1830, 1930, 2030, or 2530 may be updated according to whether the cutout 720, 1621, 1821, 1921, 2021, or 2220 of the under-display 410, 501, or 710 camera area and the icon and/or the user interface 740, 2630, 2730, 2830, 2930, or 3040 of the application 1630, 1830, 1930, 2030, or 2530 are allowed to conflict with each other.

According to an embodiment, if it is determined that the icon and/or the user interface 740, 2630, 2730, 2830, 2930, or 3040 of the application 1630, 1830, 1930, 2030, or 2530 needs to avoid a conflict with the cutout 720, 1621, 1821, 1921, 2021, or 2220, the positions of the icon and/or the user interface 740, 2630, 2730, 2830, 2930, or 3040 of the application 1630, 1830, 1930, 2030, or 2530 may be changed so as to avoid a conflict with the cutout 720, 1621, 1821, 1921, 2021, or 2220.

According to an embodiment, the coordinates of the icon and/or the user interface 740, 2630, 2730, 2830, 2930, or 3040 of the application 1630, 1830, 1930, 2030, or 2530 may be adjusted in a first direction perpendicular to the lengthwise direction of the display 410, 501, or 710, thereby changing the position where the icon and/or the user interface (e.g., the user interface 740 in FIG. 7, the user interface 2630 in FIG. 26, the user interface 2730 in FIG. 27, the user interface 2830 in FIG. 28, the user interface 2930 in FIG. 29, or the user interface 3040 in FIG. 30) of the application 1630, 1830, 1930, 2030, or 2530 are displayed.

According to an embodiment, the coordinates of the icon and/or the user interface 740, 2630, 2730, 2830, 2930, or 3040 of the application 1630, 1830, 1930, 2030, or 2530 may be adjusted in a second direction parallel to the lengthwise direction of the display 410, 501, or 710, thereby changing the position where the icon and/or the user interface 740, 2630, 2730, 2830, 2930, or 3040 of the application 1630, 1830, 1930, 2030, or 2530 are displayed.

According to an embodiment, if it is determined that the icon and/or the user interface 740, 2630, 2730, 2830, 2930, or 3040 of the application 1630, 1830, 1930, 2030, or 2530 needs to avoid a conflict with the cutout 720, 1621, 1821, 1921, 2021, or 2220, the size of a window of the application 1630, 1830, 1930, 2030, or 2530 may be changed so as to avoid a conflict with the cutout 720, 1621, 1821, 1921, 2021, or 2220.

According to an embodiment, in the case where the application 1630, 1830, 1930, 2030, or 2530 is configured to avoid a conflict with the cutout 720, 1621, 1821, 1921, 2021, or 2220, the processor 120 may update the layout of the application 1630, 1830, 1930, 2030, or 2530 so as to avoid a conflict with the cutout 720, 1621, 1821, 1921, 2021, or 2220, based on the configuration of the application 1630, 1830, 1930, 2030, or 2530.

According to an embodiment, in the case where an initial setting value of the electronic device 200, 300, 400, 500, 700, 900, 1600, 1800, 1900, 2000, 2200, 2400, 2500, 2600, 2700, 2800, 2900, 3000, or 3100 is configured to avoid a conflict between the cutout 720, 1621, 1821, 1921, 2021, or 2220 and the application 1630, 1830, 1930, 2030, or 2530. The layout of the application 1630, 1830, 1930, 2030, or 2530 may be updated, based on the initial setting value, so as to avoid a conflict with the cutout 720, 1621, 1821, 1921, 2021, or 2220.

According to an embodiment, if it is configured to avoid a conflict between the cutout 720, 1621, 1821, 1921, 2021, or 2220 and the application 1630, 1830, 1930, 2030, or 2530 by a user setting, the layout of the application 1630, 1830, 1930, 2030, or 2530 may be updated, based on the user setting, so as to avoid a conflict with the cutout 720, 1621, 1821, 1921, 2021, or 2220.

According to an embodiment, if it is determined that the icon and/or the user interface 740, 2630, 2730, 2830, 2930, or 3040 of the application 1630, 1830, 1930, 2030, or 2530 is allowed to conflict with the cutout 720, 1621, 1821, 1921, 2021, or 2220, the layout of the application 1630, 1830, 1930, 2030, or 2530 may be updated, regardless of the cutout 720, 1621, 1821, 1921, 2021, or 2220.

According to an embodiment, transparency of the icon and/or the user interface 740, 2630, 2730, 2830, 2930, or 3040 of the application 1630, 1830, 1930, 2030, or 2530 may be increased in order for wallpaper to be clearly viewed.

According to an embodiment, the cutout 720, 1621, 1821, 1921, 2021, or 2220 of the under-display 410, 501, or 710 camera area may be displayed on the display 410, 501, or 710 so as to be visible.

In a method of operating an electronic device 200, 300, 400, 500, 700, 900, 1600, 1800, 1900, 2000, 2200, 2400, 2500, 2600, 2700, 2800, 2900, 3000, or 3100 in which at least one camera module 510 or 1300 is disposed under a display 410, 501, or 710 according to various embodiments of the disclosure, display 410, 501, or 710 metrics information that is changed according to the state of the display 410, 501, or 710 may be received. An under-display 410, 501, or 710 camera area corresponding to a position of the camera module 510 or 1300 may be produced based on the changed display 410, 501, or 710 metrics information. A logical cutout 720, 1621, 1821, 1921, 2021, or 2220 of the under-display 410, 501, or 710 camera area may be produced. The layout of an application 1630, 1830, 1930, 2030, or 2530 to be executed may be updated based on the cutout 720, 1621, 1821, 1921, 2021, or 2220.

According to an embodiment, it may be determined whether or not the cutout 720, 1621, 1821, 1921, 2021, or 2220 of the under-display 410, 501, or 710 camera area and an icon and/or a user interface 740, 2630, 2730, 2830, 2930, or 3040 of the application 1630, 1830, 1930, 2030, or 2530 are allowed to conflict with each other. The layout of the application 1630, 1830, 1930, 2030, or 2530 may be updated according to whether the cutout 720, 1621, 1821, 1921, 2021, or 2220 of the under-display 410, 501, or 710 camera area and the icon and/or the user interface 740, 2630, 2730, 2830, 2930, or 3040 of the application 1630, 1830, 1930, 2030, or 2530 are allowed to conflict with each other According to an embodiment, if it is determined that the icon and/or the user interface 740, 2630, 2730, 2830, 2930, or 3040 of the application 1630, 1830, 1930, 2030, or 2530 needs to avoid a conflict with the cutout 720, 1621, 1821, 1921, 2021, or 2220, the position of the icon and/or the user interface 740, 2630, 2730, 2830, 2930, or 3040 of the application 1630, 1830, 1930, 2030, or 2530 may be changed so as to avoid a conflict with the cutout 720, 1621, 1821, 1921, 2021, or 2220.

According to an embodiment, the coordinates of the icon and/or the user interface 740, 2630, 2730, 2830, 2930, or 3040 of the application 1630, 1830, 1930, 2030, or 2530 may be adjusted in a first direction perpendicular to the lengthwise direction of the display 410, 501, or 710, thereby changing the position where the icon and/or the user interface 740, 2630, 2730, 2830, 2930, or 3040 of the application 1630, 1830, 1930, 2030, or 2530 is displayed.

According to an embodiment, the coordinates of the icon and/or the user interface 740, 2630, 2730, 2830, 2930, or 3040 of the application 1630, 1830, 1930, 2030, or 2530 may be adjusted in a second direction parallel to the lengthwise direction of the display 410, 501, or 710, thereby changing the position where the icon and/or the user interface 740, 2630, 2730, 2830, 2930, or 3040 of the application 1630, 1830, 1930, 2030, or 2530 is displayed.

According to an embodiment, if it is determined that the icon and/or the user interface 740, 2630, 2730, 2830, 2930, or 3040 of the application 1630, 1830, 1930, 2030, or 2530 needs to avoid a conflict with the cutout 720, 1621, 1821, 1921, 2021, or 2220, the size of a window of the application 1630, 1830, 1930, 2030, or 2530 may be changed so as to avoid a conflict with the cutout 720, 1621, 1821, 1921, 2021, or 2220.

According to an embodiment, if it is determined that the icon and/or the user interface 740, 2630, 2730, 2830, 2930, or 3040 of the application 1630, 1830, 1930, 2030, or 2530 is allowed to conflict with the cutout 720, 1621, 1821, 1921, 2021, or 2220, the layout of the application 1630, 1830, 1930, 2030, or 2530 may be updated, regardless of the cutout 720, 1621, 1821, 1921, 2021, or 2220.

According to an embodiment, transparency of the icon and/or the user interface 740, 2630, 2730, 2830, 2930, or 3040 of the application 1630, 1830, 1930, 2030, or 2530 may be increased in order for wallpaper to be clearly viewed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a foldable display disposed on a first surface of the foldable electronic device and disposed to be visible when the foldable electronic device is unfolded;
   a sub-display disposed on a second surface of the foldable electronic device opposite to the first surface and disposed to be visible when foldable electronic device is folded or unfolded;
   an under-display camera disposed under the foldable display;
   memory, including one or more storage media, storing instructions; and
   at least one processor including processing circuitry,
   wherein the instructions, when executed by the at least one processor individually or collectively, cause the foldable electronic device to:
      when the foldable electronic device is in a folded state, display an execution screen of an application on the sub-display,
      when a state of the foldable electronic device is changed from the folded state to an unfolded state, identify display metrics information for displaying the execution screen of the application on the foldable display, the display metrics information including information on a size of the foldable display, and a presence of a logical cutout in the foldable display,
      configure an under-display camera area corresponding to a position of the under-display camera, based on the display metrics information,
      generate the logical cutout of the under-display camera area,
      update a layout of the application to be executed, based on the logical cutout,
      reduce a size of the execution screen of the application, and
      display, on the foldable display in the unfolded state, the execution screen having a reduced size such that the execution screen does not overlap the under-display camera area.

2. The foldable electronic device according to claim 1, wherein the instructions, when executed by the at least one processor individually or collectively, further cause the foldable electronic device to determine whether or not the logical cutout of the under-display camera area and at least one of an icon or a user interface of the application are allowed to conflict with each other is determined, and
   wherein the layout of the application is updated according to whether or not the logical cutout of the under-display camera area and the at least one of the icon or the user interface of the application are allowed to conflict with each other.

3. The foldable electronic device according to claim 2, wherein the instructions, when executed by the at least one processor individually or collectively, further cause the foldable electronic device to, in case that the at least one of the icon or the user interface of the application is determined to need to avoid a conflict with the logical cutout, the position of the at least one of the icon or the user interface of the application is changed so as to avoid a conflict with the logical cutout.

4. The foldable electronic device according to claim 3, wherein the instructions, when executed by the at least one processor individually or collectively, further cause the foldable electronic device to determine whether coordinates of the at least one of the icon or the user interface of the application are adjusted in a first direction perpendicular to a lengthwise direction of the foldable display, thereby changing the position where the at least one of the icon or the user interface of the application is displayed.

5. The foldable electronic device according to claim 3, wherein the instructions, when executed by the at least one processor individually or collectively, further cause the foldable electronic device to determine whether coordinates of the at least one of the icon or the user interface of the application are adjusted in a second direction parallel to a lengthwise direction of the foldable display, thereby changing the position where the at least one of the icon or the user interface of the application is displayed.

6. The foldable electronic device according to claim 2, wherein the instructions, when executed by the at least one processor individually or collectively, further cause the foldable electronic device to, in case that the at least one of the icon or the user interface of the application is determined to need to avoid a conflict with the logical cutout, a size of a window of the application is changed so as to avoid the conflict with the logical cutout.

7. The foldable electronic device according to claim 2, wherein the instructions, when executed by the at least one processor individually or collectively, further cause the foldable electronic device to, in a case where the application is configured to avoid a conflict with the logical cutout, the processor updates the layout of the application so as to avoid the conflict with the logical cutout, based on the configuration of the application.

8. The foldable electronic device according to claim 2, wherein the instructions, when executed by the at least one processor individually or collectively, further cause the foldable electronic device to, in a case where an initial setting value of the electronic device is configured to avoid a conflict between the logical cutout and the application, the layout of the application is updated based on the initial setting value so as to avoid the conflict with the logical cutout.

9. The foldable electronic device according to claim 2, wherein the instructions, when executed by the at least one processor individually or collectively, further cause the foldable electronic device to, in case that a user setting is configured to avoid a conflict between the logical cutout and the application, the layout of the application is updated based on the user setting so as to avoid the conflict with the logical cutout.

10. The foldable electronic device according to claim 9, wherein the instructions, when executed by the at least one processor individually or collectively, further cause the foldable electronic device to determine whether transparency of the at least one of the icon or the user interface of the application is increased in order for wallpaper to be clearly viewed.

11. The foldable electronic device according to claim 2, wherein the instructions, when executed by the at least one processor individually or collectively, further cause the foldable electronic device to, in case that the at least one of the icon or the user interface of the application is determined to be allowed to conflict with the logical cutout, update the layout of the application, regardless of the logical cutout.

12. The foldable electronic device according to claim 1, wherein the instructions, when executed by the at least one processor individually or collectively, further cause the foldable electronic device to determine whether the logical cutout of the under-display camera area is displayed on the foldable display so as to be visible.

13. A method of operating a foldable electronic device, the method comprising:
when the foldable electronic device is in a folded state, displaying an execution screen of an application on a sub-display,
when a state of the foldable electronic device is changed from the folded state to an unfolded state, identifying display metrics information for displaying the execution screen of the application on the foldable display, the display metrics information including information on a size of the foldable display, and a presence of a logical cutout in the foldable display;
configuring an under-display camera area corresponding to a position of the under-display camera, based on the display metrics information;
generating the logical cutout of the under-display camera area;
updating a layout of the application to be executed, based on the logical cutout;
reducing a size of the execution screen of the application; and
displaying, on the foldable display in the unfolded state, the execution screen having a reduced size such that the execution screen does not overlap the under-display camera area.

14. The method of operating the foldable electronic device according to claim 13, further comprising:
determining whether or not the logical cutout of the under-display camera area and at least one of an icon or a user interface of the application are allowed to conflict with each other; and
updating the layout of the application according to whether the logical cutout of the under-display camera area and the at least one of the icon or the user interface of the application are allowed to conflict with each other.

15. The method of operating the foldable electronic device according to claim 14, further comprising, in case that the at least one of the icon or the user interface of the application is determined to need to avoid a conflict with the logical cutout, changing the position of the at least one of the icon or the user interface of the application so as to avoid the conflict with the logical cutout.

16. The method of operating the foldable electronic device according to claim 15, further comprising adjusting coordinates of the at least one of the icon or the user interface of the application in a first direction perpendicular to a lengthwise direction of the foldable display, thereby changing the position where the at least one of the icon or the user interface of the application is displayed.

17. The method of operating the foldable electronic device according to claim 15, further comprising adjusting coordinates of the at least one of the icon or the user interface of the application in a second direction parallel to a lengthwise direction of the foldable display, thereby changing the position where the at least one of the icon or the user interface of the application is displayed.

18. The method of operating the foldable electronic device according to claim 14, further comprising, in case that the at least one of the icon or the user interface of the application is determined to need to avoid a conflict with the logical cutout, changing a size of a window of the application so as to avoid the conflict with the logical cutout.

19. The method of operating the foldable electronic device according to claim 14, further comprising, in case that the at least one of the icon or the user interface of the application is determined to be allowed to conflict with the logical cutout, updating the layout of the application, regardless of the logical cutout.

20. The method of operating the foldable electronic device according to claim 19, further comprising increasing transparency of the at least one of the icon or the user interface of the application in order for wallpaper to be clearly viewed.

* * * * *